(12) United States Patent
    Chen

(10) Patent No.: US 11,323,566 B2
(45) Date of Patent: *May 3, 2022

(54) SYSTEMS AND METHODS FOR SMART DIALOGUE COMMUNICATION

(71) Applicant: HITHINK ROYALFLUSH INFORMATION NETWORK CO., LTD., Zhejiang (CN)

(72) Inventor: Ming Chen, Hangzhou (CN)

(73) Assignee: HITHINK ROYALFLUSH INFORMATION NETWORK CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/238,161

(22) Filed: Apr. 22, 2021

(65) Prior Publication Data
US 2021/0258426 A1    Aug. 19, 2021

Related U.S. Application Data

(63) Continuation of application No. 16/889,823, filed on Jun. 2, 2020, now Pat. No. 11,019,207.

(30) Foreign Application Priority Data

Nov. 7, 2019   (CN) .......................... 201911082348.9
Nov. 7, 2019   (CN) .......................... 201911082383.0
(Continued)

(51) Int. Cl.
*H04M 3/51*    (2006.01)
*H04M 3/54*    (2006.01)
(Continued)

(52) U.S. Cl.
CPC ........ *H04M 3/5166* (2013.01); *G06F 16/685* (2019.01); *G06F 16/90332* (2019.01);
(Continued)

(58) Field of Classification Search
CPC ............. H04M 3/5166; H04M 3/4365; H04M 3/5141; H04M 3/527; H04M 3/5335;
(Continued)

(56) References Cited

U.S. PATENT DOCUMENTS 8,868,616 B1 * 10/2014 Otto ...................... G16H 40/67
                                                              707/802
10,455,085 B1   10/2019 Roundy et al.
(Continued)

FOREIGN PATENT DOCUMENTS

CN         103078995 A       5/2013
CN         104462600 A       3/2015
(Continued)

OTHER PUBLICATIONS

First Office Action in Chinese Application No. 201911082387.9 dated Jul. 27, 2020, 22 pages.
(Continued)

*Primary Examiner* — Binh Kien Tieu
(74) *Attorney, Agent, or Firm* — Metis IP LLC

(57) ABSTRACT

Systems and methods for smart dialogue communication are provided. A method may include receiving, from a responder terminal device, a dialogue request configured to request a smart dialogue communication, wherein the dialogue request is associated with an incoming call request that is initiated by a requester via a requester terminal device and satisfies a smart dialogue condition determined by the responder terminal device; performing the smart dialogue communication with the requester terminal device associated with the requester; recording voice information associated with the smart dialogue communication; converting the voice information into the text information; and transmitting the text information to the responder terminal device.

20 Claims, 26 Drawing Sheets

(30) Foreign Application Priority Data

Nov. 7, 2019 (CN) .......................... 201911082387.9
Nov. 7, 2019 (CN) .......................... 201911082413.8
Nov. 7, 2019 (CN) .......................... 201911083330.0

(51) Int. Cl.
| | |
|---|---|
| *G06F 16/9032* | (2019.01) |
| *G06F 40/35* | (2020.01) |
| *G10L 15/26* | (2006.01) |
| *G06F 16/683* | (2019.01) |
| *G06N 3/08* | (2006.01) |
| *G06Q 10/10* | (2012.01) |
| *G10L 15/08* | (2006.01) |
| *G10L 25/63* | (2013.01) |
| *H04M 3/436* | (2006.01) |
| *H04M 3/527* | (2006.01) |
| *H04M 3/533* | (2006.01) |
| *H04W 4/12* | (2009.01) |
| *H04W 4/16* | (2009.01) |
| *G10L 15/14* | (2006.01) |
| *G10L 15/16* | (2006.01) |

(52) U.S. Cl.
CPC .............. *G06F 40/35* (2020.01); *G06N 3/08* (2013.01); *G06Q 10/10* (2013.01); *G10L 15/08* (2013.01); *G10L 15/26* (2013.01); *G10L 25/63* (2013.01); *H04M 3/4365* (2013.01); *H04M 3/5141* (2013.01); *H04M 3/527* (2013.01); *H04M 3/5335* (2013.01); *H04M 3/53341* (2013.01); *H04M 3/541* (2013.01); *H04W 4/12* (2013.01); *H04W 4/16* (2013.01); *G10L 15/142* (2013.01); *G10L 15/16* (2013.01); *G10L 2015/088* (2013.01)

(58) Field of Classification Search
CPC  H04M 3/541; G06F 16/90332; G06F 16/685; G06F 40/35; G06N 3/08; G06Q 10/10; G10L 15/08; G10L 15/26; G10L 25/63; G10L 15/142; G10L 15/16; G10L 2015/088; H04W 4/16
USPC ...................................................... 379/88.16
See application file for complete search history.

(56) References Cited

U.S. PATENT DOCUMENTS

| | | | | |
|---|---|---|---|---|
| 10,701,542 | B2* | 6/2020 | Martin .................... | H04W 4/21 |
| 10,931,607 | B2* | 2/2021 | Johnson, III ............ | G10L 15/22 |
| 11,019,207 | B1* | 5/2021 | Chen ....................... | H04W 4/12 |
| 2005/0085257 | A1* | 4/2005 | Laird ....................... | A61B 5/24 |
| | | | | 455/550.1 |
| 2009/0313019 | A1 | 12/2009 | Kato et al. | |
| 2011/0178797 | A1 | 7/2011 | Markefka et al. | |
| 2014/0179281 | A1 | 6/2014 | Kim et al. | |
| 2014/0273979 | A1 | 9/2014 | Van Os et al. | |
| 2014/0323120 | A1 | 10/2014 | Kim et al. | |
| 2015/0046357 | A1 | 2/2015 | Danson et al. | |
| 2016/0065711 | A1 | 3/2016 | De Carney | |
| 2016/0192166 | A1* | 6/2016 | deCharms ........... | H04L 65/1096 |
| | | | | 348/14.02 |
| 2016/0335138 | A1 | 11/2016 | Surti et al. | |
| 2016/0364606 | A1 | 12/2016 | Conway et al. | |
| 2018/0152558 | A1 | 5/2018 | Chan et al. | |
| 2019/0198040 | A1 | 6/2019 | Xie | |
| 2019/0240113 | A1* | 8/2019 | Velani ....................... | A61J 1/03 |
| 2019/0356750 | A1* | 11/2019 | Dotan-Cohen ....... | G06Q 10/109 |
| 2020/0186482 | A1* | 6/2020 | Johnson, III .......... | H04L 51/046 |
| 2020/0210965 | A1* | 7/2020 | Garber ...................... | G06N 5/04 |
| 2021/0044673 | A1* | 2/2021 | MacGabann .......... | H04L 67/28 |
| 2021/0120394 | A1* | 4/2021 | Martin .................... | H04W 4/21 |
| 2021/0228893 | A1* | 7/2021 | Akram ................. | A61N 1/3925 |
| 2021/0343383 | A1* | 11/2021 | Soza ...................... | G16H 40/20 |

FOREIGN PATENT DOCUMENTS

| | | |
|---|---|---|
| CN | 104580738 A | 4/2015 |
| CN | 105407232 A | 3/2016 |
| CN | 106933807 A | 7/2017 |
| CN | 107135247 A | 9/2017 |
| CN | 107944008 A | 4/2018 |
| CN | 108076204 A | 5/2018 |
| CN | 108989550 A | 12/2018 |
| CN | 109003624 A | 12/2018 |
| CN | 109522392 A | 3/2019 |
| CN | 109672786 A | 4/2019 |
| CN | 109688276 A | 4/2019 |
| CN | 109949071 A | 6/2019 |
| CN | 110010135 A | 7/2019 |
| CN | 110072006 A | 7/2019 |
| CN | 110072019 A | 7/2019 |
| CN | 110113473 A | 8/2019 |
| CN | 110401777 A | 11/2019 |
| JP | 2000184069 A | 6/2000 |
| JP | 2002044258 A | 2/2002 |
| WO | 0147225 A2 | 6/2001 |

OTHER PUBLICATIONS

First Office Action in Chinese Application No. 201911082383.0 dated Sep. 3, 2020, 20 pages.
First Office Action in Chinese Application No. 201911082348.9 dated Sep. 2, 2020, 18 pages.
First Office Action in Chinese Application No. 201911082413.8 dated Sep. 16, 2021, 16 pages.
First Office Action in Chinese Application No. 201911083330.0 dated Feb. 17, 2022, 14 pages.

* cited by examiner

FIG. 13

SYSTEMS AND METHODS FOR SMART DIALOGUE COMMUNICATION

CROSS-REFERENCE TO RELATED APPLICATIONS

This application a continuation of U.S. application Ser. No. 16/889,823 filed on Jun. 2, 2020, which claims priority to Chinese Application No. 201911082387.9, filed on Nov. 7, 2019, Chinese Application No. 201911082383.0, filed on Nov. 7, 2019, Chinese Application No. 201911082413.8, filed on Nov. 7, 2019, Chinese Application No. 201911083330.0, filed on Nov. 7, 2019, and Chinese Application No. 201911082348.9, filed on Nov. 7, 2019, the entire contents of each of which are hereby incorporated by reference.

TECHNICAL FIELD

The present disclosure generally relates to the field of communication technology, and in particular, to systems and methods for smart dialogue communication.

BACKGROUND

With the development of communication technology, users may need more professional, personal, and intelligent communication services. Generally, a user may first preset a transferring number, and an incoming call can be transferred to the transferring number when the user is not convenient to answer the incoming call. However, in some cases, some incoming calls may be missed, for example, when the transferring number is in a no signal environment. Besides, due to information leakage, a user may receive a great amount of harassing calls, which causes inconvenience to the user. Thus, it is desirable to provide systems and/or methods for smart dialogue communication.

SUMMARY

An aspect of the present disclosure introduces a system for smart dialogue communication is provided. The system includes at least one storage device including a set of instructions and at least one processor in communication with the at least one storage device. When executing the set of instructions, the at least one processor is configured to cause the system to perform operations including: receiving, from a responder terminal device, a dialogue request configured to request a smart dialogue communication, wherein the dialogue request is associated with an incoming call request that is initiated by a requester via a requester terminal device and satisfies a smart dialogue condition determined by the responder terminal device; performing the smart dialogue communication with the requester terminal device associated with the requester; recording voice information associated with the smart dialogue communication; converting the voice information into the text information; and transmitting the text information to the responder terminal device.

In some embodiments, the smart dialogue condition is associated with at least one of: whether an incoming call number associated with the incoming call request exists in a contact list of the responder terminal device; whether the incoming call number exists in a blacklist of the responder terminal device; or whether a request time length of the incoming call request exceeds a time threshold.

In some embodiments, the at least one processor is further configured to cause the system to perform operations including: obtaining, from the requester terminal device, one or more first incoming voice messages associated with the smart dialogue communication; determining one or more feature words based on the one or more first incoming voice messages; and determining identity information by matching the one or more feature words in an identity database.

In some embodiments, performing the smart dialogue communication includes: obtaining, from the requester terminal device, one or more second incoming voice messages; converting the one or more second incoming voice messages into one or more incoming text messages; determining text features by performing feature extraction on at least one of the one or more incoming text messages; determining question information associated with the text features by matching the text features in a question knowledge database; obtaining answer information corresponding to the question information by matching the question information in an answer knowledge database; converting the answer information into at least one reply voice message; and transmitting the at least one reply voice message to the requester terminal device.

In some embodiments, the at least one processor is further configured to cause the system to perform operations including: determining sentiment features by performing sentiment analysis on the text information; determining mood features by performing feature extraction on the text information; determining integrated features by integrating the sentiment features and the mood features; determining an emotion type by matching the integrated features in an emotion database; and transmitting the emotion type to the responder terminal device associated with the incoming call request.

In some embodiments, the at least one processor is further configured to cause the system to perform operations including: generating suggestion information based on the emotion type, the suggestion information being associated with whether to respond to the incoming call request; and transmitting the suggestion information to the responder terminal device.

In some embodiments, the at least one processor is further configured to cause the system to perform operations including: determining whether prompt information is received, the prompt information being associated with a reply instruction provided by the responder terminal device; and in response to determining that the prompt information is received, converting the prompt information into a reply voice message; and transmitting the reply voice message to the requester terminal device.

In some embodiments, before performing the smart dialogue communication, the at least one processor is further configured to cause the system to perform operations including: determining whether an answer instruction corresponding to the incoming call request is received from the responder terminal device; and in response to determining that the answer instruction is not received, performing the smart dialogue communication.

In some embodiments, the at least one processor is further configured to cause the system to perform operations including: determining event keywords by performing semantic analysis on the text information; generating schedule information based on the event keywords; and transmitting the schedule information to the responder terminal device associated with the incoming call request for display.

In some embodiments, the determining the event keywords by performing semantic analysis on the text information includes: processing the text information by performing word segmentation and annotation on the text information; determining text features by performing feature extraction on the processed text information using a language model; and determining the event keywords by performing semantic analysis on the text features using a semantic analysis model.

In some embodiments, the determining the event keywords includes: obtaining time information by performing the semantic analysis on the text information; determining whether the time information includes an absolute time; and in response to determining that the time information includes the absolute time, designating the time information as an event time; or in response to determining that the time information includes no absolute time, determining the event time based on the time information and a system time.

In some embodiments, the at least one processor is further configured to cause the system to perform operations including: determining an emergency level of the schedule information according to a level classification rule; determining a reminder time of the schedule information based on the emergency level; and causing the responder terminal device to generate a reminder at the reminder time.

According to another aspect of the present disclosure, a method for smart dialogue communication is provided. The method includes receiving, from a responder terminal device, a dialogue request configured to request a smart dialogue communication, wherein the dialogue request is associated with an incoming call request that is initiated by a requester via a requester terminal device and satisfies a smart dialogue condition determined by the responder terminal device; performing the smart dialogue communication with the requester terminal device associated with the requester; recording voice information associated with the smart dialogue communication; converting the voice information into the text information; and transmitting the text information to the responder terminal device.

According to still another aspect of the present disclosure, a non-transitory computer-readable medium, comprising at least one set of instructions compatible for smart dialogue communication, is provided. When executed by at least one processor of an electrical device, the at least one set of instructions directs the at least one processor to perform a method including receiving, from a responder terminal device, a dialogue request configured to request a smart dialogue communication, wherein the dialogue request is associated with an incoming call request that is initiated by a requester via a requester terminal device and satisfies a smart dialogue condition determined by the responder terminal device; performing the smart dialogue communication with the requester terminal device associated with the requester; recording voice information associated with the smart dialogue communication; converting the voice information into the text information; and transmitting the text information to the responder terminal device.

According to still another aspect of the present disclosure, a system for smart dialogue communication is provided. The system includes at least one storage device including a set of instructions; and at least one processor in communication with the at least one storage device. When executing the set of instructions, the at least one processor is configured to cause the system to perform operations including: performing, based on a dialogue request, a smart dialogue communication with a requester terminal device associated with a requester, the dialogue request being associated with an incoming call request initiated by the requester via the requester terminal device; obtaining real-time dialogue information associated with the smart dialogue communication; transmitting the real-time dialogue information to a responder terminal device; determining whether prompt information is received, the prompt information being associated with a reply instruction provided, based on the real-time dialogue information, by the responder terminal device; and in response to determining that the prompt information is received, converting the prompt information into a reply voice message; and transmitting the reply voice message to the requester terminal device.

According to still another aspect of the present disclosure, a system for smart dialogue communication is provided. The system includes at least one storage device including a set of instructions; and at least one processor in communication with the at least one storage device. When executing the set of instructions, the at least one processor is configured to cause the system to perform operations including: performing, based on a dialogue request, a smart dialogue communication with a requester terminal device associated with a requester, the dialogue request being associated with an incoming call request initiated by the requester via the requester terminal device; obtaining incoming voice messages associated with the smart dialogue communication; converting the incoming voice messages into incoming text messages; determining event keywords by performing semantic analysis on the incoming text messages; generating schedule information based on the event keywords; and transmitting the schedule information to a responder terminal device associated with the incoming call request for display.

According to still another aspect of the present disclosure, a system for smart dialogue communication is provided. The system includes at least one storage device including a set of instructions; and at least one processor in communication with the at least one storage device. When executing the set of instructions, the at least one processor is configured to cause the system to perform operations including: performing, based on a dialogue request, a smart dialogue communication with a requester terminal device associated with a requester, the dialogue request being associated with an incoming call request initiated by the requester via the requester terminal device; obtaining incoming voice messages associated with the smart dialogue communication; converting the incoming voice messages into incoming text messages; determining sentiment features by performing sentiment analysis on the incoming text messages; determining mood features by performing feature extraction on the incoming voice messages; determining integrated features by integrating the sentiment features and the mood features; determining an emotion type by matching the integrated features in an emotion database; and transmitting the emotion type to a responder terminal device associated with the incoming call request.

According to still another aspect of the present disclosure, a system for smart dialogue communication is provided. The system includes at least one storage device including a set of instructions; and at least one processor in communication with the at least one storage device. When executing the set of instructions, the at least one processor is configured to cause the system to perform operations including: receiving an incoming call request initiated by a requester via a requester terminal device; determining whether the incoming call request satisfies a smart dialogue condition; and in response to determining that the incoming call request satisfies the smart dialogue condition, generating, based on the incoming call request, a dialogue request configured to request a smart dialogue communication; causing a smart dialogue communication platform to perform the smart dialogue communication with the requester terminal device associated with the requester by transmitting the dialogue request to the smart dialogue communication platform; receiving, from the smart dialogue communication platform, dialogue information associated with the smart dialogue communication; and outputting the dialogue information; wherein the dialogue information includes text information, and the text information is generated by the smart dialogue communication platform according to a first process including: recording voice information associated with the smart dialogue communication; and converting the voice information into the text information.

According to still another aspect of the present disclosure, a system for smart dialogue communication is provided. The system includes at least one storage device including a set of instructions; and at least one processor in communication with the at least one storage device. When executing the set of instructions, the at least one processor is configured to cause the system to perform operations including: receiving an incoming call request initiated by a requester via a requester terminal device; determining whether the incoming call request satisfies a smart dialogue condition; in response to determining that the incoming call request satisfies the smart dialogue condition, generating, based on the incoming call request, a dialogue request configured to request a smart dialogue communication; causing a smart dialogue communication platform to perform the smart dialogue communication with the requester terminal device associated with the requester by transmitting the dialogue request to the smart dialogue communication platform; and receiving, from the smart dialogue communication platform, identity information of the requester; and outputting the identity information; wherein the identity information is determined by the smart dialogue communication platform according to a first process including: obtaining, from the requester terminal device, one or more incoming voice messages associated with the smart dialogue communication; determining one or more feature words based on the one or more incoming voice messages; and determining the identity information by matching the one or more feature words in an identity database.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein:

FIG. 13 is a schematic diagram illustrating an exemplary system for generating schedule information according to some embodiments of the present disclosure;

DETAILED DESCRIPTION

Figure 1:
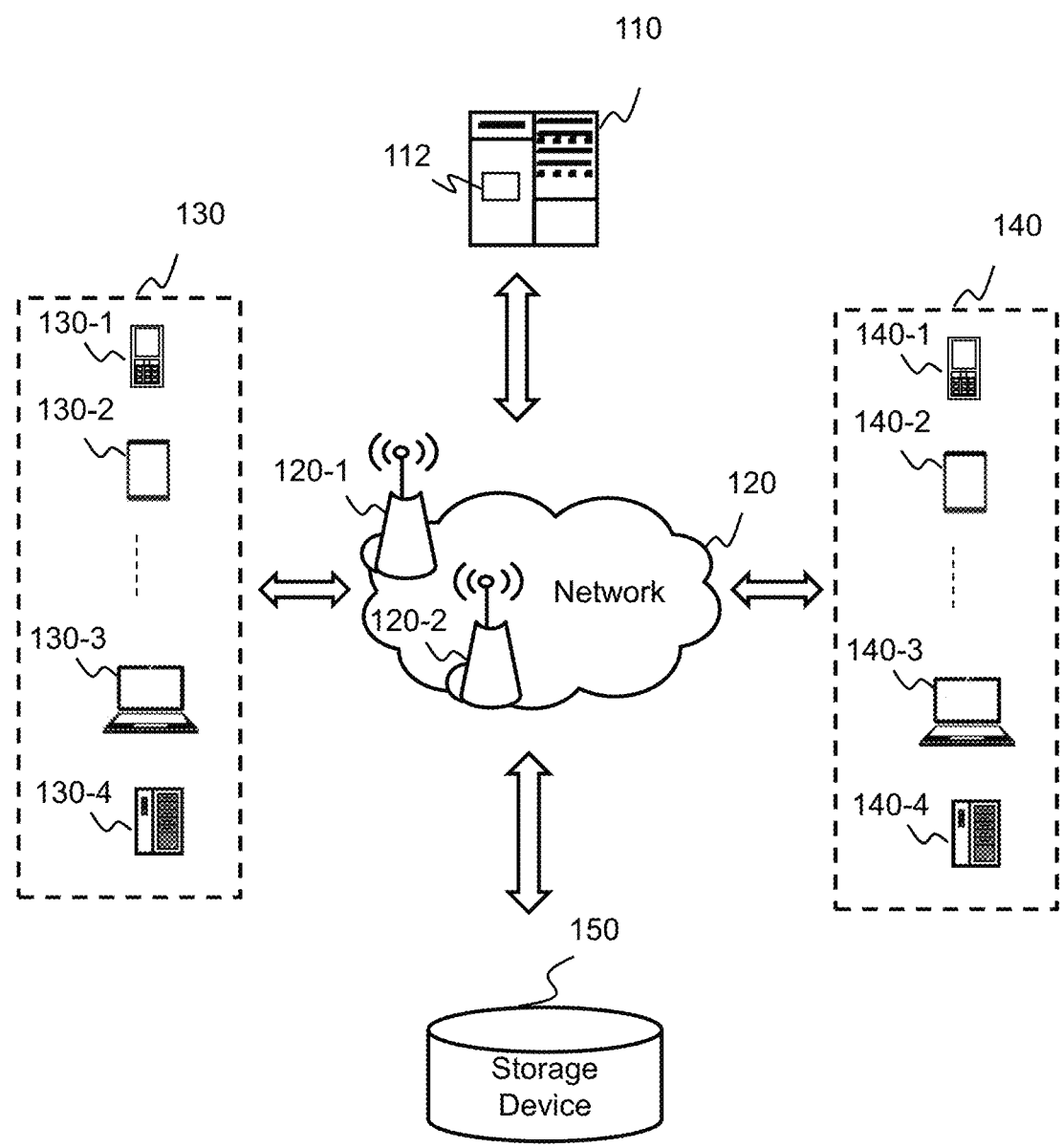
FIG. 1 is a schematic diagram illustrating an exemplary smart dialogue communication system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

The various embodiments of the present disclosure may be applied to different fields, including without limitation to financial and derivatives investment (including without limitation to stocks, bonds, gold, paper gold, silver, foreign currency, precious metals, futures, money funds, etc.), technology (including without limitation to mathematics, physics, chemistry and chemical engineering, biology and biological engineering, electrical engineering, communication systems, internet, internet of things, etc.), politics (including without limitation to politicians, political events, countries, etc.), news (in terms of regions, including without limitation to local news, national news, international news; in terms of the subjects of news, including without limitation to political news, technology news, economic news, social news, meteorological news, etc.). The above description of the fields of applications is merely for example, and should not be understood as the only embodiments. Obviously, those skilled in the art, after understanding the basic principles of the method and system for smart dialogue communication, may modify the form and details of the method and system for various application fields without departing from the principles. Such modifications and variations are still within the scope of the present disclosure described herein.

The present disclosure relates to systems and methods for smart dialogue communication. The systems and methods may receive a dialogue request configured to request a smart dialogue communication from a responder terminal device. The dialogue request may be associated with an incoming call request that is initiated by a requester via a requester terminal device and satisfies a smart dialogue condition determined by the responder terminal device. The smart dialogue condition may be associated with whether an incoming call number associated with the incoming call request exists in a contact list of the responder terminal device; whether the incoming call number exists in a blacklist of the responder terminal device; and/or whether a request time length of the incoming call request exceeds a time threshold. The systems and methods may perform the smart dialogue communication with the requester terminal device associated with the requester, and/or generate dialogue information associated with the smart dialogue communication. The dialogue information may include voice information, text information, etc. In some embodiments, the systems and methods may transmit the dialogue information to the responder terminal device in real-time or intermittently. In some embodiments, information associated with the requester and/or a responder (e.g., a user of the responder terminal device) may be determined based on the dialogue information. Exemplary information may include schedule information, emotion type of the requester, identity information of the requester, or the like. In some embodiments, the systems and methods may provide an interface for the user of the responder terminal device to intervene in the smart dialogue communication.

In one aspect of the present disclosure, a smart dialogue communication platform may obtain real-time dialogue information associated with the smart dialogue communication, and transmit the real-time dialogue information to the responder terminal device, so that the user of the responder terminal device can know or obtain the dialogue information in real-time. Besides, the user can intervene in the smart dialogue communication by sending prompt information to the smart dialogue communication platform, thereby improving the efficiency of the smart dialogue communication, and improving user experiences.

In another aspect of the present disclosure, when the user is not convenient to respond to the incoming call request, the smart dialogue communication platform may perform the smart dialogue communication with the requester terminal device to obtain the incoming voice messages. The smart dialogue communication platform may convert the incoming voice messages into the incoming text messages, and determine the event keywords by performing semantic analysis on the incoming text messages. The smart dialogue communication platform may then generate schedule information based on the event keywords and/or transmit the schedule information to the responder terminal device associated with the incoming call request for display. Therefore, information loss and the missing of important events may be avoided, thereby improving user experiences. In some embodiments, the smart dialogue communication platform may store the schedule information instead of the voice information (or text information) generated during the smart dialogue communication in a storage device associated with the smart dialogue communication platform, or the responder terminal device may store the schedule information instead of the voice information (or text information), thereby saving the storage space of the storage device (e.g., the storage device 150, the ROM 230, the RAM 240, the disk 270, or the storage 390, or an external storage device associated with the smart dialogue communication system 100). By generating the schedule information, the smart dialogue communication platform or the responder terminal device may obtain or identify relatively more effective information during the smart dialogue communication, thereby avoiding information loss (e.g., avoiding missing important events), providing great convenience for incoming call affair processing, and improving the user experiences.

In yet another aspect of the present disclosure, the smart dialogue communication platform may perform the smart dialogue communication with the requester terminal device to obtain the incoming voice messages. The smart dialogue communication platform may convert the incoming voice messages into the incoming text messages. The smart dialogue communication platform may determine sentiment features by performing sentiment analysis on the incoming text messages, and determine mood features by performing feature extraction on the incoming voice messages. The smart dialogue communication platform may determine the integrated features by integrating the sentiment features and the mood features. The smart dialogue communication platform may determine an emotion type by matching the integrated features in an emotion database and transmit the emotion type to the responder terminal device. Thus, the user of the responder terminal device can know the emotion of the requester, and can respond to the incoming call request based on the emotion of the requester. Therefore, user experiences can be improved. In the present disclosure, the smart dialogue communication platform or the responder terminal device may obtain or identify relatively more effective information during the smart dialogue communication (such as determining the emotion type of the requester), thereby making it convenient for the user of the responder terminal device to deal with incoming call affairs based on the obtained information (such as the emotion type of the requester), and improving the user experiences.

In yet another aspect of the present disclosure, the smart dialogue communication may be performed when the user is not convenient to answer the incoming call request (e.g., the user is a deaf mute). In the present disclosure, when an incoming call request is received, the responder terminal device may first determine whether the smart dialogue condition is satisfied. If the smart dialogue condition is satisfied, the smart dialogue communication may be performed, thereby saving the time of the user and improving the response efficiency. Besides, the voice information generated during the smart dialogue communication may be recorded, thereby effectively avoiding information loss (e.g., missing important incoming call request) and greatly improving the user experiences.

In yet another aspect of the present disclosure, the smart dialogue communication may be performed when the user is not convenient to answer the incoming call request. In the present disclosure, when an incoming call request is received, the responder terminal device may first determine whether the smart dialogue condition is satisfied. If the smart dialogue condition is satisfied, the smart dialogue communication may be performed, thereby saving the time of the user and improving the response efficiency. Besides, the identity information of the requester is identified, and the user can decide whether to intervene in the smart dialogue communication, thereby reducing or filtrating harassing calls while not missing important calls, and improving user experiences.

FIG. 1 is a schematic diagram illustrating an exemplary smart dialogue communication system according to some embodiments of the present disclosure. For example, the smart dialogue communication system 100 may include a server 110, a network 120, a requester terminal device 130, a responder terminal device 140, and a storage device 150.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requester terminal device 130, the responder terminal device 140, and/or the storage device 150 via the network 120. As another example, the server 110 may be directly connected to the requester terminal device 130, the responder terminal device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may support or provide a function of a smart dialogue communication platform (e.g., a smart dialogue communication robot) configured to perform a smart dialogue communication with one or more requester terminal devices (e.g., the requester terminal device 130). In some embodiments, the server 110 may include a processing device 112. The processing device 112 may process information and/or data relating to the smart dialogue communication and/or perform one or more functions described in the present disclosure. For example, the processing device 112 may generate dialogue information associated with the smart dialogue communication. In some embodiments, the processing device 112 may include one or more processing devices (e.g., single-core processing device(s) or multi-core processor(s)). Merely by way of example, the processing device 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the smart dialogue communication system 100 (e.g., the server 110, the requester terminal device 130, the responder terminal device 140, and/or the storage device 150) may send information and/or data to other component(s) in the smart dialogue communication system 100 via the network 120. For example, the server 110 may obtain/acquire service request (e.g., a dialogue request) from the requester terminal device 130 or the responder terminal device 140 via the network 120. As another example, the server 110 may transmit dialogue information to the responder terminal device 140 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the smart dialogue communication system 100 may be connected to the network 120 to exchange data and/or information.

In some embodiments, the requester terminal device 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the motor vehicle 130-4 may include an onboard computer, an onboard television, etc. In some embodiments, the responder terminal device 140 may be a device that is similar to, or the same as the requester terminal device 130. For example, the requester terminal device 130 and/or the responder terminal device 140 may include a smart mobile phone. In some embodiments, the requester terminal device 130 may be configured to initiate an incoming call request. The responder terminal device 140 may be configured to determine whether the incoming call request satisfies a smart dialogue condition. In some embodiments, if the incoming call request does not satisfy the smart dialogue condition, the responder terminal device 140 may respond to the incoming call request. In some embodiments, if the incoming call request satisfies the smart dialogue condition, the responder terminal device 140 may generate a dialogue request and/or transmit the dialogue request to the server 110 to request a smart dialogue communication.

The storage device 150 may store data and/or instructions. In some embodiments, the storage device 150 may store data obtained from the requester terminal device 130 and/or the responder terminal device 140. In some embodiments, the storage device 150 may store data and/or instructions that the server 110 may execute or use to perform exemplary methods described in the present disclosure. In some embodiments, storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the smart dialogue communication system 100 (e.g., the server 110, the requester terminal device 130, the responder terminal device 140). One or more components in the smart dialogue communication system 100 may access the data or instructions stored in the storage device 150 via the network 120. In some embodiments, the storage device 150 may be directly connected to or communicate with one or more components in the smart dialogue communication system 100 (e.g., the server 110, the requester terminal device 130, the responder terminal device 140). In some embodiments, the storage device 150 may be part of the server 110.

In some embodiments, one or more components of the smart dialogue communication system 100 (e.g., the server 110, the requester terminal device 130, the responder terminal device 140) may have permission to access the storage device 150. In some embodiments, one or more components of the smart dialogue communication system 100 may read and/or modify information relating to the requester, provider, and/or the public when one or more conditions are met. For example, the server 110 may read and/or modify one or more users' information after a service is completed. As another example, the responder terminal device 140 may access information relating to the requester when receiving a service request from the requester terminal device 130, but the responder terminal device 140 may not modify the relevant information of the requester.

One of ordinary skill in the art would understand that when an element (or component) of the smart dialogue communication system 100 performs, the element may perform through electrical signals and/or electromagnetic signals. For example, when a requester terminal device 130 or a responder terminal device 140 transmits out a service request (e.g., a dialogue request) to the server 110, a processor of the requester terminal device 130 or the responder terminal device 140 may generate an electrical signal encoding the request. The processor of the requester terminal device 130 or the responder terminal device 140 may then transmit the electrical signal to an output port. If the requester terminal device 130 or the responder terminal device 140 communicates with the server 110 via a wired network, the output port may be physically connected to a cable, which further may transmit the electrical signal to an input port of the server 110. If the requester terminal device 130 or the responder terminal device 140 communicates with the server 110 via a wireless network, the output port of the requester terminal device 130 may be one or more antennas, which convert the electrical signal to an electromagnetic signal. Similarly, the requester terminal device 130 or the responder terminal device 140 may receive an instruction and/or dialogue information from the server 110 via electrical signals or electromagnet signals. Within an electronic device, such as the requester terminal device 130, the responder terminal device 140, and/or the server 110, when a processor thereof processes an instruction, transmits out an instruction, and/or performs an action, the instruction and/or action may be conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
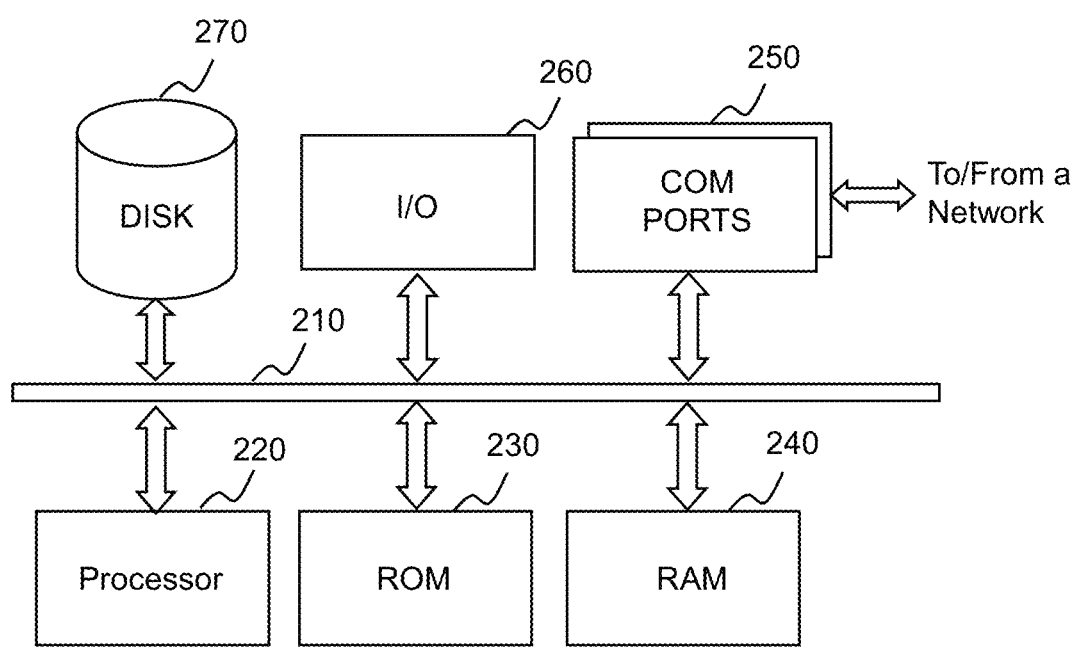
FIG. 2 is a schematic diagram illustrating exemplary hardware and/or software components of a computing device according to some embodiments of the present disclosure.

FIG. 2 is a schematic diagram illustrating exemplary hardware and software components of a computing device according to some embodiments of the present disclosure. In some embodiments, the server 110, the requester terminal device 130, and/or the responder terminal device 140 may be implemented on the computing device 200. For example, the processing device 112 of the server 110 may be implemented on the computing device 200 and configured to perform functions of the processing device 112 disclosed in this disclosure.

The computing device 200 may be a general purpose computer or a special purpose computer, both may be used to implement a smart dialogue communication system (e.g., the smart dialogue communication system 100) for the present disclosure. The computing device 200 may be used to implement any component of the smart dialogue communication system as described herein. For example, the processing device 112 may be implemented on the computing device 200, via its hardware, software program, firmware, or a combination thereof. Although only one such computer is shown, for convenience, the computer functions relating to the smart dialogue communication as described herein may be implemented in a distributed fashion on a number of similar platforms, to distribute the processing load.

The computing device 200, for example, may include a COM port 250 connected to and/or from a network connected thereto to facilitate data communications. The computing device 200 may also include a processor 220, in the form of one or more processors (or CPUs), for executing program instructions. The exemplary computing device may include an internal communication bus 210, different types of program storage units and/or data storage units (e.g., a disk 270, a read only memory (ROM) 230, a random access memory (RAM) 240), various data files applicable to computer processing and/or communication. The exemplary computing device may also include program instructions stored in the ROM 230, RAM 240, and/or any other type of non-transitory storage medium to be executed by the processor 220. The method and/or process of the present disclosure may be implemented as the program instructions. The computer device 200 may also include an I/O device 260 that may support the input and/or output of data flows between the computing device 200 and other components. The computing device 200 may also receive programs and/or data via the communication network.

Merely for illustration, only one CPU and/or processor is described in the computing device 200. However, it should be noted that the computing device 200 in the present disclosure may also include multiple CPUs and/or processors, thus operations and/or method operations that are performed by one CPU and/or processor as described in the present disclosure may also be jointly or separately performed by the multiple CPUs and/or processors. For example, if in the present disclosure the CPU and/or processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 3:
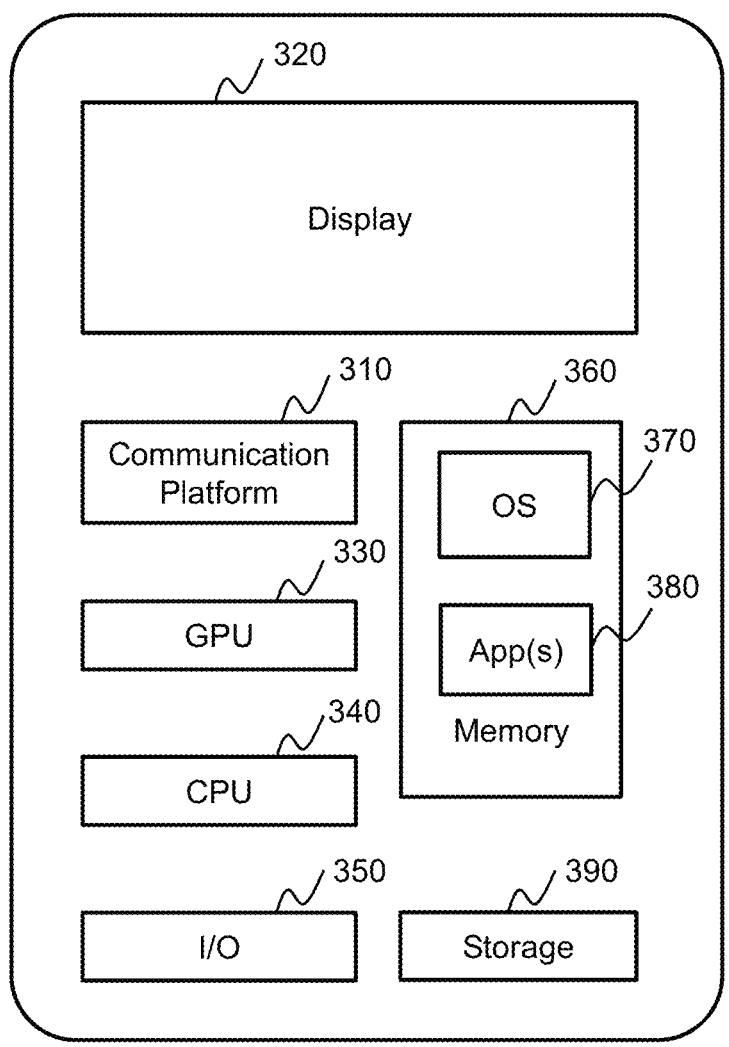
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device according to some embodiments of the present disclosure. In some embodiments, the mobile device 300 may be an exemplary embodiment corresponding to the requester terminal device 130 or the responder terminal device 140. As illustrated in FIG. 3, the mobile device 300 may include a communication platform 310, a display 320, a graphic processing unit (GPU) 330, a central processing unit (CPU) 340, an I/O 350, a memory 360, an operating system (OS) 370, a storage 390. In some embodiments, any other suitable component, including but not limited to a system bus or a controller (not shown), may also be included in the mobile device 300.

In some embodiments, an operating system (OS) 370 (e.g., iOS™, Android™ Windows Phone™, etc.) and one or more applications (apps) 380 may be loaded into the memory 360 from the storage 390 in order to be executed by the CPU 340. The applications 380 may include a browser or any other suitable mobile apps for receiving and/or rendering information relating to smart dialogue communication or other information from the smart dialogue communication system 100. User interactions with the information stream may be achieved via the I/O 350 and provided to the storage device 150, the server 110 and/or other components of the smart dialogue communication system 100.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
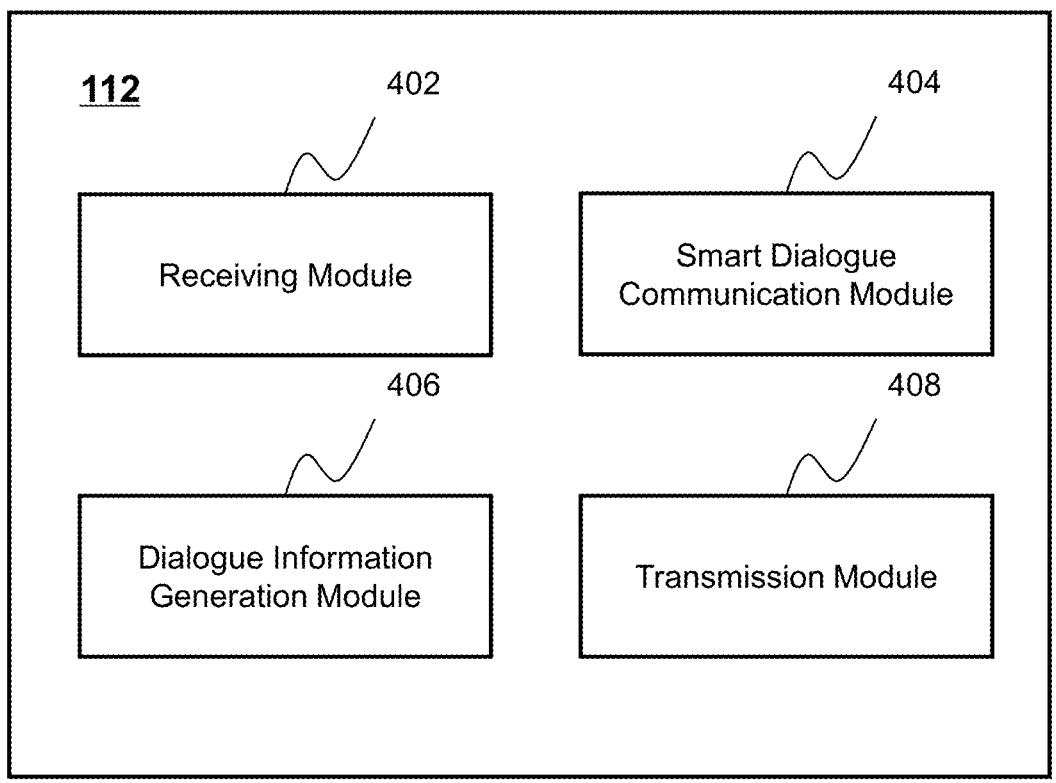
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may be implemented on the computing device (e.g., the processor 220 of the computing device 200) as illustrated in FIG. 2, and/or the CPU 340 as illustrated in FIG. 3. In some embodiments, the processing device 112 may be implemented on a smart dialogue communication platform. The processing device 112 may include a receiving module 402, a smart dialogue communication module 404, a dialogue information generation module 406, and a transmission module 408.

The receiving module 402 may be configured to receive information and/or data from a responder terminal device (e.g., the responder terminal device 140) via a network (e.g., the network 120). In some embodiments, the receiving module 402 may receive a dialogue request from the responder terminal device. The dialogue request may be configured to request a smart dialogue communication and/or be associated with an incoming call request. More descriptions of the dialogue request and/or the incoming call request may be found elsewhere in the present disclosure (e.g., operation 501 of process 500 and the descriptions thereof).

The smart dialogue communication module 404 may be configured to perform a smart dialogue communication with a requester terminal device (e.g., the requester terminal device 130). In some embodiments, the smart dialogue communication may refer to the communication between human (e.g., a requester of the requester terminal device) and a machine (e.g., a smart dialogue communication robot). In some embodiments, the smart dialogue communication may be performed between the smart dialogue communication platform and the requester terminal device. More descriptions regarding the smart dialogue communication may be found elsewhere in the present disclosure (e.g., FIG. 6 and the descriptions thereof).

The dialogue information generation module 406 may be configured to generate dialogue information associated with the smart dialogue communication. In some embodiments, the dialogue information may include voice information, text information, etc. For example, the dialogue information may include voice information relating to or generated during the smart dialogue communication, such as incoming voice messages (e.g., voice messages from the requester terminal device), reply voice messages (e.g., voice messages generated by the smart dialogue communication platform, or voice messages obtained from the responder terminal device, or the like). As another example, the dialogue information may include text information relating to or generated during the smart dialogue communication, such as incoming text messages (e.g., text messages corresponding to the incoming voice messages, or text messages obtained from the requester terminal device, or the like), reply text messages (e.g., text messages corresponding to the reply voice messages, or text messages obtained from the responder terminal device, or the like).

The transmission module 408 may be configured to transmit the dialogue information to the responder terminal device (e.g., the responder terminal device 140). The transmission module 408 may transmit the dialogue information to the responder terminal device in real-time or intermittently. In some embodiments, the transmission module 408 may transmit the dialogue information to the responder terminal device automatically. Alternatively, the transmission module 408 may transmit the dialogue information to the responder terminal device when receiving an instruction (e.g., a check instruction) from the responder terminal device.

The modules in the processing device 112 may be connected to or communicate with each other via a wired connection and/or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, two or more of the modules of the processing device 112 may be combined into a single module. For example, the receiving module 402 and the transmission module 408 may be combined into a single module and configured to perform the functions thereof. As another example, the processing device 112 may include one or more additional modules. For example, the processing device 112 may include a storage module (not shown) configured to store data generated during the smart dialogue communication (e.g., dialogue information).

Figure 5:
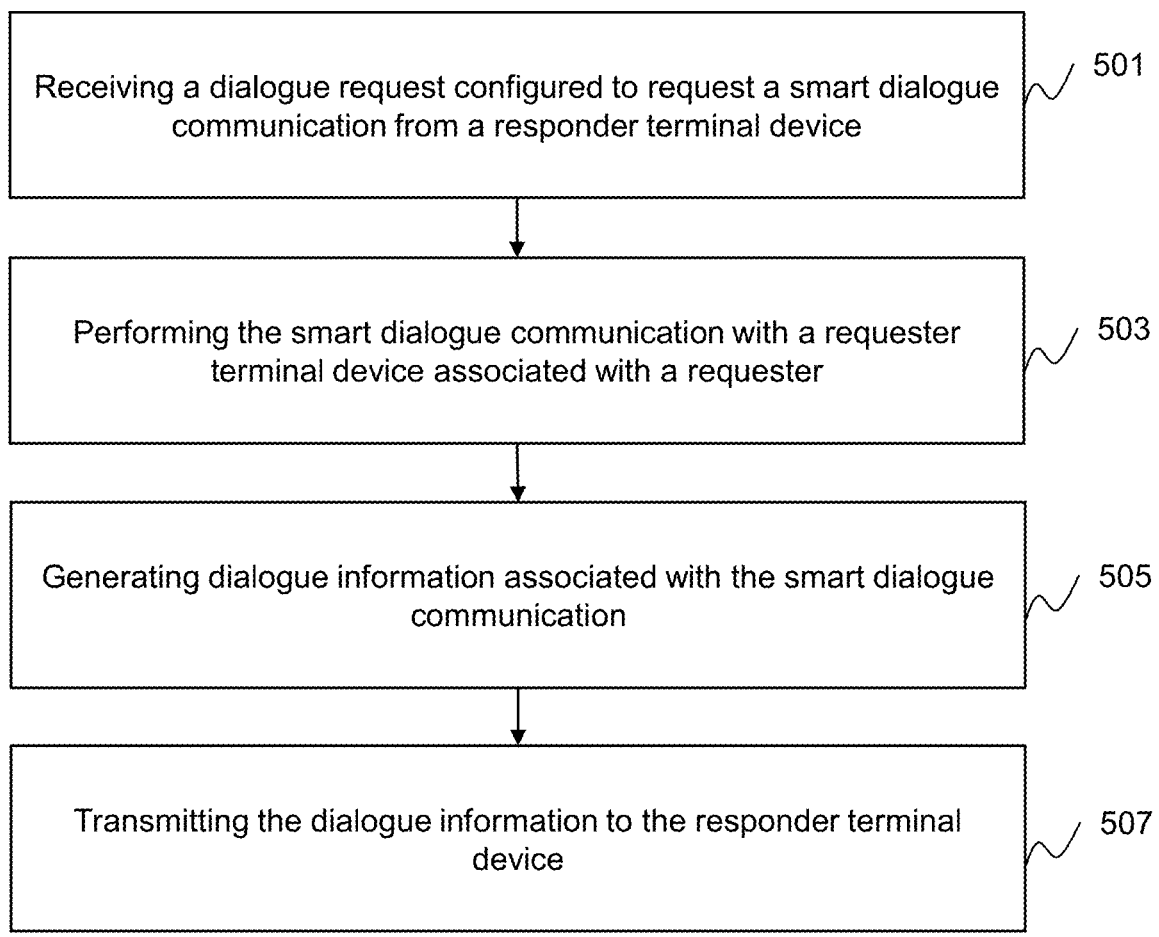
FIG. 5 is a flowchart illustrating an exemplary process for smart dialogue communication according to some embodiments of the present disclosure.

FIG. 5 is a flowchart illustrating an exemplary process for smart dialogue communication according to some embodiments of the present disclosure. At least a portion of process 500 may be implemented on the computing device 200 as illustrated in FIG. 2 or the mobile device 300 as illustrated in FIG. 3. In some embodiments, one or more operations of the process 500 may be implemented in the smart dialogue communication system 100 as illustrated in FIG. 1. In some embodiments, one or more operations in the process 500 may be stored in the storage device 150 and/or the storage (e.g., the ROM 230, the RAM 240, etc.) as a form of instructions, and invoked and/or executed by the server 110 (e.g., the processing device 112 in the server 110 illustrated in FIG. 1, the processor 220 illustrated in FIG. 2, the CPU 340 illustrated in FIG. 3, or one or more modules in the processing device 112 illustrated in FIG. 4). In some embodiments, the instructions may be transmitted in a form of electronic current or electrical signals. The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, process 500 may be implemented on a smart dialogue communication platform.

In 501, the processing device 112 (e.g., the receiving module 402) may receive a dialogue request from a responder terminal device (e.g., the responder terminal device 140). The dialogue request may refer to a request for smart dialogue communication (e.g., with a smart dialogue communication platform). The dialogue request may be configured to request a smart dialogue communication. In some embodiments, the dialogue request may be associated with an incoming call request. The incoming call request may be a request (or an incoming call) for having a conversation with a user of the responder terminal device. In some embodiments, the incoming call request may include information associated with the incoming call, for example, an incoming call time, who initiates the incoming call (or an incoming call number), etc. In some embodiments, the dialogue request may include information associated with the incoming call request and/or the incoming call, for example, an incoming call time, an incoming call number, a wait time for the incoming call request, whether the user of the responder terminal device responds to the incoming call request, etc. In some embodiments, the incoming call request may be initiated by a requester via a requester terminal device (e.g., the requester terminal device 130), and/or further be received by the responder terminal device. The incoming call request may be associated with the requester terminal device that initiates the incoming call request. The incoming call request may also be associated with the responder terminal device that receives the incoming call request. In some embodiments, the responder terminal device may receive the incoming call request from the requester terminal device and/or determine whether the incoming call request satisfies a smart dialogue condition. In some embodiments, the incoming call request may satisfy the smart dialogue condition, and the responder terminal device may generate the dialogue request based on the incoming call request. More descriptions regarding the smart dialogue condition may be found elsewhere in the present disclosure (e.g., FIG. 18 and the descriptions thereof).

In 503, the processing device 112 (e.g., the smart dialogue communication module 404) may perform the smart dialogue communication with the requester terminal device (e.g., the requester terminal device 130) associated with the requester. In some embodiments, the smart dialogue communication (also referred to as human-computer interaction) may refer to the communication between human (e.g., the requester) and a machine (e.g., a smart dialogue communication robot). In some embodiments, the smart dialogue communication may be performed between the smart dialogue communication platform and the requester terminal device. More descriptions regarding the smart dialogue communication may be found elsewhere in the present disclosure (e.g., FIG. 6 and the descriptions thereof).

In 505, the processing device 112 (e.g., the dialogue information generation module 406) may generate dialogue information associated with the smart dialogue communication. In some embodiments, the dialogue information may include voice information, text information, etc. For example, the dialogue information may include voice information relating to or generated during the smart dialogue communication, such as incoming voice messages (e.g., voice messages from the requester terminal device), reply voice messages (e.g., voice messages generated by the smart dialogue communication platform, or voice messages obtained from the responder terminal device, or the like). As another example, the dialogue information may include text information relating to or generated during the smart dialogue communication, such as incoming text messages (e.g., text messages corresponding to the incoming voice messages, or text messages obtained from the requester terminal device, or the like), reply text messages (e.g., text messages corresponding to the reply voice messages, or text messages obtained from the responder terminal device, or the like). In some embodiments, the dialogue information (e.g., voice information or text information) may include question information and/or answer information relating to or generated during the smart dialogue communication. In some embodiments, the question information and/or answer information may be determined, identified, or generated by the smart dialogue communication platform. In some embodiments, the dialogue information may include schedule information, information relating to emotion type of the requester, identity information of the requester, etc. In some embodiments, the schedule information, the information relating to emotion type of the requester, and/or the identity information of the requester may be determined, identified, or generated according to the dialogue information. The schedule information may be a daily (or weekly, or monthly) schedule, for example, things to be done, when, where and/or how the things are to be done. In some embodiments, the schedule information may include a to-do-list. The emotion type of the requester may include an emotion of the requester (e.g., happy, sad, calm, anxious, etc.), a character of the requester (e.g., extroversion, introversion, etc.). The identity information of the requester may refer to an identity of the requester (e.g., a salesman, an estate agent, a deliveryman, etc.). In some embodiments, the identity of the requester may relate to an occupation of the requester, a field of work of the requester, a title of the requester, a company the requester works for, etc. Exemplary schedule information may be determined according to process 1200 illustrated in FIG. 12. Exemplary emotion type of the requester may be determined according to process 1500 illustrated in FIG. 15. Exemplary identity information of the requester may be determined according to process 2100 illustrated in FIG. 21.

In some embodiments, the processing device 112 may directly record the text information and/or the voice information generated during the smart dialogue communication to generate the dialogue information. In some embodiments, the processing device 112 may add a tag to each text message (e.g., an incoming text message, a text message generated by the smart dialogue communication platform, a text message inputted by the responder, etc.) or each voice message (e.g., an incoming voice message, a reply voice message, etc.) to generate the dialogue information. The tag may indicate an initiator of each text message or each voice message (e.g., the requester, the smart dialogue communication platform, the responder). In some embodiments, the processing device 112 may process (e.g., perform a semantic analysis, a feature extraction, etc.) the text information and/or the voice information generated during the smart dialogue communication, and/or generate the dialogue information based on the processed information. In some embodiments, the processing device 112 may generate the dialogue information in real time during the smart dialogue communication. In some embodiments, the processing device 112 may record information associated with the smart dialogue communication, and generate the dialogue information after the smart dialogue communication is terminated.

In 507, the processing device 112 (e.g., the transmission module 408) may transmit the dialogue information to the responder terminal device (e.g., the responder terminal device 140). In some embodiments, the processing device 112 may transmit the dialogue information to the responder terminal device in real-time, so that a user of the responder terminal device can check the dialogue information and/or intervene the smart dialogue communication timely. For example, when the responder terminal device obtains the schedule information, the user of the responder terminal device may decide whether to intervene the smart dialogue communication based on the schedule information. As another example, when the responder terminal device obtains the emotion type of the requester, the user of the responder terminal device may decide whether to intervene the smart dialogue communication based on the emotion type of the requester. Alternatively, the processing device 112 may transmit the dialogue information to the responder terminal device intermittently. For example, the processing device 112 may transmit the dialogue information to the responder terminal device at intervals (e.g., every minute, every five minutes, every ten minutes, etc.). As another example, the processing device 112 may transmit the dialogue information to the responder terminal device when the smart dialogue communication is finished. In some embodiments, the processing device 112 may transmit the dialogue information to the responder terminal device automatically. The user can check the dialogue information via the responder terminal device at the user's convenience. Alternatively, the processing device 112 may transmit the dialogue information to the responder terminal device when receiving an instruction (e.g., a check instruction) from the responder terminal device.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, a storing operation may be added. The storing operation may store the dialogue information and/or other information generated in the process 500 in a storage device (e.g., the storage device 150). In some embodiments, one or more operations in processes 800, 900, 1200, 1500, 1800, and/or 2100 may be added in the process 500.

Figure 6:
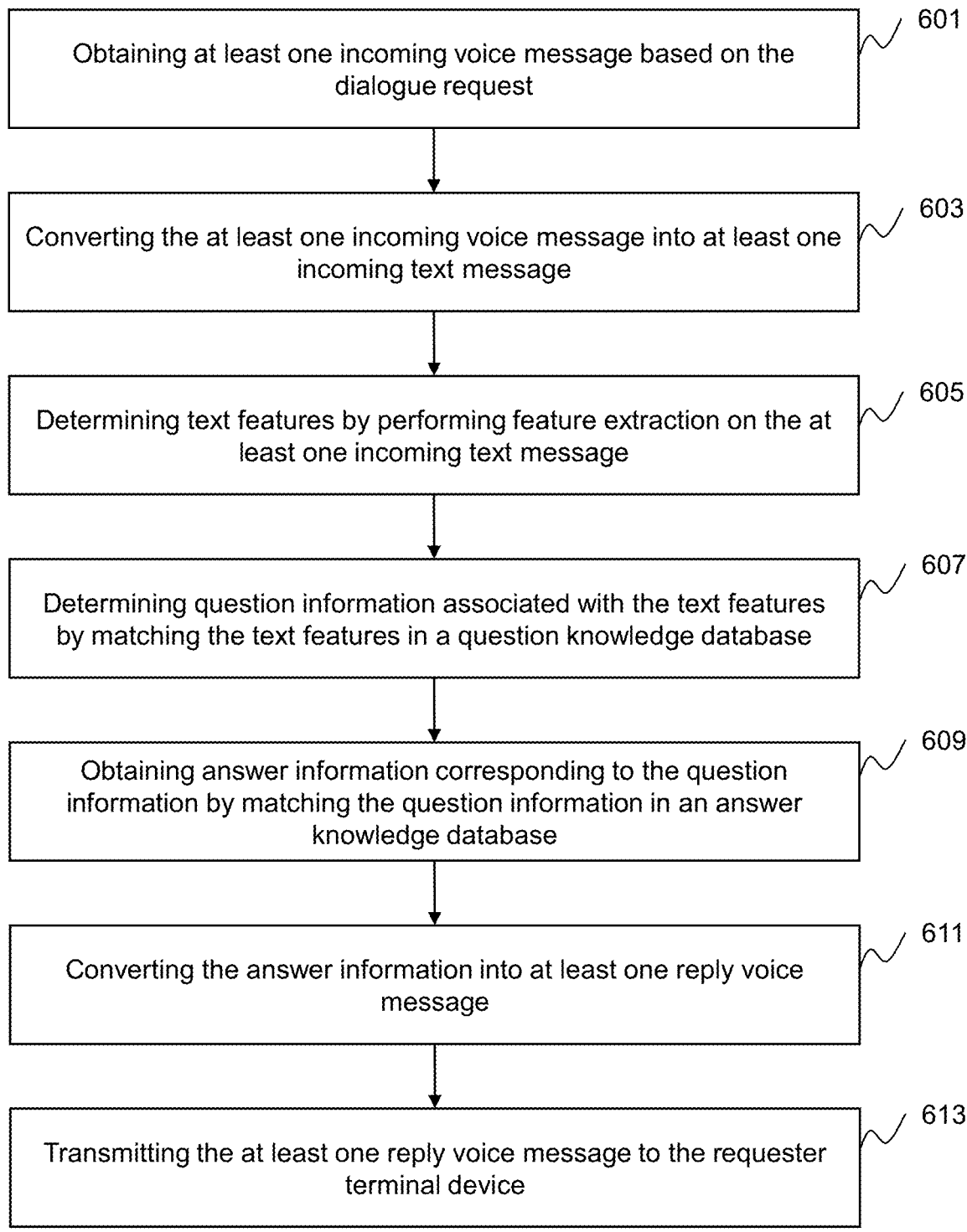
FIG. 6 is a flowchart illustrating an exemplary process for smart dialogue communication according to some embodiments of the present disclosure.

FIG. 6 is a flowchart illustrating an exemplary process for smart dialogue communication according to some embodiments of the present disclosure. The smart dialogue communication may be performed between a smart dialogue communication platform and a requester terminal device (e.g., the requester terminal device 130). In some embodiments, the smart dialogue communication platform may be integrated in or be part of a responder terminal device (e.g., the responder terminal device 140). In such cases, when an incoming call request is received or a dialogue request is generated, the smart dialogue communication may be initiated and/or performed between the requester terminal device and the responder terminal device. Alternatively, the smart dialogue communication platform may be installed, disposed or implemented on a backend system (e.g., a call center of a mobile communication operator). In such cases, if a received incoming call request satisfies a smart dialogue condition (e.g., whether an incoming call number associated with the incoming call request exists in a contact list of the responder terminal device), the smart dialogue communication may be initiated and/or performed between the requester terminal device and the smart dialogue communication platform.

At least a portion of process 600 may be implemented on the computing device 200 as illustrated in FIG. 2 or the mobile device 300 as illustrated in FIG. 3. In some embodiments, one or more operations of the process 600 may be implemented in the smart dialogue communication system 100 as illustrated in FIG. 1. In some embodiments, one or more operations in the process 600 may be stored in the storage device 150 and/or the storage (e.g., the ROM 230, the RAM 240, etc.) as a form of instructions, and invoked and/or executed by the server 110 (e.g., the processing device 112 in the server 110 illustrated in FIG. 1, the processor 220 illustrated in FIG. 2, the CPU 340 illustrated in FIG. 3, or one or more modules in the processing device 112 illustrated in FIG. 4). In some embodiments, the instructions may be transmitted in a form of electronic current or electrical signals. The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, operation 503 illustrated in FIG. 5 may be performed according to the process 600.

In 601, the processing device 112 (e.g., the smart dialogue communication module 404) may obtain at least one incoming voice message based on the dialogue request. In some embodiments, the dialogue request may be associated with an incoming call request initiated by a requester via a requester terminal device (e.g., the requester terminal device 130). In some embodiments, the incoming voice message may include voice message(s) of the requester. In some embodiments, the processing device 112 may obtain the at least one incoming voice message from the requester terminal device via a network (e.g., the network 120). In some embodiments, the requester may speak to the requester terminal device, and the voice of the requester may be converted into the incoming voice message by the requester terminal device. In some embodiments, the processing device 112 may obtain the at least one incoming voice message in real-time or intermittently. For example, the processing device 112 may obtain the incoming voice message once the incoming voice message is generated. As another example, the processing device 112 may obtain the incoming voice message when the requester finishes speaking to the requester terminal device.

In 603, the processing device 112 (e.g., the smart dialogue communication module 404) may convert the at least one incoming voice message into at least one incoming text message. In some embodiments, the processing device 112 may convert the incoming voice message into the incoming text message in real-time or intermittently. For example, the processing device 112 may convert the incoming voice message into the incoming text message when the incoming voice message is obtained. As another example, the processing device 112 may convert the incoming voice message into the incoming text message when the processing device 112 receives an instruction (e.g., text conversion instruction) from the responder terminal device.

In some embodiments, the processing device 112 may convert the at least one incoming voice message into the at least one incoming text message based on a speech recognition technique (also referred to as a speech to text technique). The speech recognition technique may be a high technology that allows machines to convert speech signals (or voice signals) into corresponding text or commands through the process of recognition and understanding. Speech recognition technique may include one or more operations, e.g., feature extraction, pattern matching, and/or model training. The speech recognition technique may use or include a feature parameter matching algorithm, a hidden Markov model (HMM) algorithm, an artificial neural network (ANN) algorithm, or the like, or any combination thereof. In some embodiments, the processing device 112 may convert the incoming voice message into the incoming text message using a speech recognition model, e.g., a Gaussian mixture model and hidden Markov model (GMM-HMM), a PyTorch-Kaldi speech recognition toolkit, etc. In some embodiments, the incoming voice message may be input into the speech recognition model, and the speech recognition model may convert the incoming voice message into the incoming text message and output the incoming text message. Merely by way of example, the speech recognition model may include an acoustic model and/or a language model. The acoustic model may be configured to determine a feature vector of the incoming voice message and determine one or more scores corresponding to one or more acoustic contents according to acoustic characteristics. The acoustic model may determine the acoustic content with the highest score and input the acoustic content with the highest score into the language model. The language model may be configured to determine one or more probabilities that the acoustic content corresponds to one or more text sequences according to a linguistic-related theory and determine the acoustic content with the highest probability as the incoming text message.

In 605, the processing device 112 (e.g., the smart dialogue communication module 404) may determine text features of the at least one incoming text message. In some embodiments, the text features may be configured to express text information with a vector, which may be referred to as text representation. In some embodiments, the text representation may include discrete representation (e.g., a one-hot representation, a multi-hot representation), distributed representation (e.g., a matrix-based representation, a dimension reduction-based representation, a cluster-based representation), neural network-based representation (e.g., continuous bag of words (CBOW), a neural network language model (NNLM), a skip-gram model). In some embodiments, the processing device 112 may perform feature extraction on the at least one incoming text message to determine the text features. In some embodiments, the processing device 112 may process the at least one incoming text message by performing word segmentation and/or annotation on the at least one incoming text message. In some embodiments, the processing device 112 may perform the word segmentation and/or annotation on the at least one incoming text message according to one or more word segmentation algorithms. Exemplary word segmentation algorithms may include a character matching-based word segmentation algorithm (e.g., a maximum matching algorithm, an omi-word segmentation algorithm, a statistical language model algorithm, etc.), a sequence annotation-based word segmentation algorithm (e.g., POS tagging), a deep learning-based word segmentation algorithm (e.g., a hidden Markov model algorithm), or the like, or any combination thereof. In some embodiments, the processing device 112 may process the incoming text message using a THU lexical analyzer for Chinese (THULAC) toolkit. In some embodiments, the processing device 112 may determine the text features of the incoming text message in real-time or intermittently. For example, the processing device 112 may determine the text features when the incoming text message is determined. As another example, the processing device 112 may determine the text features when the processing device 112 receives an instruction (e.g., feature extraction instruction) from the responder terminal device.

In some embodiments, the processing device 112 may determine the text features by performing feature extraction on the at least one processed incoming text message using a language model. The incoming text message may be input into the language model, and the language model may generate the text features of the incoming text message and output the text features. Exemplary language models may include a generalized autoregressive pretraining for language understanding (XLNet) model, a statistical language model (e.g., N-gram), a neural network language model, a recurrent neural network language model, a neural probabilistic language model etc. In some embodiments, the language model may be generated by training a preliminary model using a plurality of training samples. The training process may be performed by the processing device 112 or any other processing device (e.g., an external processing device of the smart dialogue communication system 100). The plurality of training samples may include a plurality of sample text messages and sample text features of the sample text messages. The preliminary model may include a plurality of parameters that need to be adjusted. In some embodiments, the plurality of sample text messages may be inputted into the preliminary model to determine actual output(s). The sample text features of the sample text messages may be determined as desired output(s). The processing device 112 or any other processing device (e.g., an external processing device of the smart dialogue communication system 100) may compare the actual output(s) with the desired output(s) to determine loss function value(s). The loss function value(s) may measure difference(s) between the actual output(s) and the desired output(s). In the training process of the preliminary model, the plurality of parameters may be adjusted to minimize the loss function value(s). In some embodiments, the loss function value(s) and/or the parameters may be updated iteratively in order to obtain minimized loss function value(s). After the loss function value(s) are minimized, a trained language model may be determined according to the adjusted parameters.

In 607, the processing device 112 (e.g., the smart dialogue communication module 404) may determine question information associated with the text features by matching the text features in a question knowledge database. In some embodiments, the question knowledge database may store a plurality of questions (also referred to as candidate questions) or information relating to the questions. In some embodiments, the question knowledge database may be stored in a storage device (e.g., the storage device 150, the ROM 230, the RAM 240, the disk 270, the storage 390, etc.) associated with the smart dialogue communication platform. Alternatively, the question knowledge database may be stored in an external storage device, and the processing device 112 may retrieve the question knowledge database via a network (e.g., the network 120). The question knowledge database may be preset by the smart dialogue communication system 100, or self-defined by a user of the responder terminal device 140. In some embodiments, the processing device 112 may match the text features in the question knowledge database using a first semantic matching model (e.g., a deep structured semantic model (DSSM), a long short term memory deep structured semantic model (LSTM-DSSM), an enhanced LSTM for natural language inference (ESIM), an attention-based convolutional neural network for modeling sentence pairs (ABCNN), etc.). For example, the processing device 112 may input the text features and/or the candidate questions within the question knowledge database into the first semantic matching model. The first semantic matching model may generate and/or output a matching degree between the text features and a (e.g., each) candidate question. In some embodiments, the processing device 112 may determine the question information based on the matching degree(s). For example, the processing device 112 may determine the candidate question having the highest matching degree as the question information.

In 609, the processing device 112 (e.g., the smart dialogue communication module 404) may obtain answer information corresponding to the question information by matching the question information in an answer knowledge database. In some embodiments, the answer knowledge database may store a plurality of answers (also referred to as candidate answers) or information relating to the answers. In some embodiments, the answer knowledge database may be stored in a storage device (e.g., the storage device 150, the ROM 230, the RAM 240, the disk 270, the storage 390, etc.) associated with the smart dialogue communication platform. Alternatively, the answer knowledge database may be stored in an external storage device, and the processing device 112 may retrieve the answer knowledge database via a network (e.g., the network 120). The answer knowledge database may be preset by the smart dialogue communication system 100, or self-defined by a user of the responder terminal device 140. In some embodiments, there may be a one-to-one correspondence between the answers in the answer knowledge database and the questions in the question knowledge database. For example, each question may correspond to an answer. In some embodiments, there may be a one-to-more correspondence between the answers in the answer knowledge database and the questions in the question knowledge database. For example, one or more questions may correspond to an answer. For instance, questions such as "who are you?" "Are you XXX?" may correspond to the same answer such as "I'm a smart assistant of XXX." In some embodiments, there may be a more-to-one correspondence between the answers in the answer knowledge database and the questions in the question knowledge database. For example, a question may correspond to one or more answers. For instance, question such as "Can I speak to XXX?" may correspond to answers such as "XXX is busy now, would you mind leaving a message?" "I'm a smart assistance of XXX, you can leave a message." The processing device 112 may match the question information in the answer knowledge database using a second semantic matching model (e.g., a deep structured semantic model (DSSM), a long short term memory deep structured semantic model (LSTM-DSSM), an enhanced LSTM for natural language inference (ESIM), an attention-based convolutional neural network for modeling sentence pairs (ABCNN), etc.). For example, the processing device 112 may input the question information and/or the candidate answers within the answer knowledge database into the semantic matching model. The semantic matching model may generate and/or output a matching degree between the question information and a (e.g., each) candidate answer. In some embodiments, the processing device 112 may determine the answer information based on the matching degree(s). For example, the processing device 120 may determine the candidate answer having the highest matching degree as the answer information.

In some embodiments, the second semantic matching model may be same as or similar to the first semantic matching model as described in operation 607. For example, the first semantic matching model and the second semantic matching model may both be a deep structured semantic model (DSSM). Alternatively, the second semantic matching model may be different from the first semantic matching model. For example, the first semantic matching model may be a deep structured semantic model (DSSM), and the second semantic matching model may be an attention-based convolutional neural network for modeling sentence pairs (ABCNN). The first semantic matching model may be used to determine a matching degree between the text features and a (e.g., each) candidate question. The input of the first semantic matching model may include the text features and the candidate questions. The output of the first semantic matching model may include a matching degree between the text features and a (e.g., each) candidate question. The second semantic matching model may be used to determine a matching degree between the question information and a (e.g., each) candidate answer. The input of the second semantic matching model may include the question information and the candidate answers. The output of the second semantic matching model may include a matching degree between the question information and a (e.g., each) candidate answer.

In some embodiments, the question knowledge database and the answer knowledge database may be integrated into a single knowledge database. In some embodiments, the integrated knowledge database may include a plurality of question-answer pairs. A question-answer pair may include a candidate question in the question knowledge database and a corresponding candidate answer in the answer knowledge database. In some embodiments, the processing device 112 may directly determine the answer information by retrieving or matching the question information with the question-answer pairs in the integrated knowledge database. In some embodiments, the processing device 112 may directly determine the answer information by retrieving or matching the text features with the question-answer pairs in the integrated knowledge database, and thus, operation 607 may be omitted.

In 611, the processing device 112 (e.g., the smart dialogue communication module 404) may convert the answer information into at least one reply voice message. In some embodiments, the processing device 112 may convert the answer information into the reply voice message using a text to speech technique (e.g., a speech synthesis model). Exemplary speech synthesis models may include a generative model for raw audio (e.g., WaeNet), a parallel wave generation in end-to-end text-to-speech (e.g., ClariNet), a parallel neural text-to-speech (e.g., ParaNet), or the like. In some embodiments, the answer information may be input into the speech synthesis model, the speech synthesis model may generate and/or output the reply voice message.

In 613, the processing device 112 (e.g., the smart dialogue communication module 404) may transmit the at least one reply voice message to the requester terminal device (e.g., the requester terminal device 130). In some embodiments, the processing device 112 may transmit the at least one reply voice message to the requester terminal device via the network (e.g., the network 120). In some embodiments, the processing device 112 may transmit the at least one reply voice message to the requester terminal device using a full-duplex voice interaction technique, which may effectively control the rhythm of the dialogue and implement real-time recovery once the dialogue is interrupted. In some embodiments, after the reply voice message is received by the requester terminal device, the requester terminal device may play the reply voice message to the requester. In some embodiments, the requester of the requester terminal device may respond to the reply voice message, e.g., continuing the smart dialogue communication with the smart dialogue communication platform, finishing or terminating the smart dialogue communication, etc. In some embodiments, if the smart dialogue communication is interrupted for a threshold time period, and/or the requester terminal device does not respond to the smart dialogue communication for a threshold time period, the smart dialogue communication platform may finish or terminate the smart dialogue communication, and/or restart the smart dialogue communication.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, if the requester of the requester terminal device decides to continue the smart dialogue communication, the processing device 112 may repeat the process 600 until the smart dialogue communication is finished or terminated. As another example, the processing device 112 may generate a question-answer record based on the at least one incoming text message, the question information, and the answer information. In some embodiments, the processing device 112 may update the question knowledge database and/or the answer knowledge database based on the question-answer record. In some embodiments, the answer knowledge database may include general answers (e.g., "OK, I know", "What else can I do for you"). If an incoming text message matches with no question information (in the question knowledge database) and/or no answer information (in the answer knowledge database), the processing device 112 may generate the at least one reply voice message based on the general answer(s). In some embodiments, before operation 601, the smart dialogue communication platform may send a prompt information to the requester terminal device to remind the requester that a smart dialogue communication is initiated.

Figure 7:
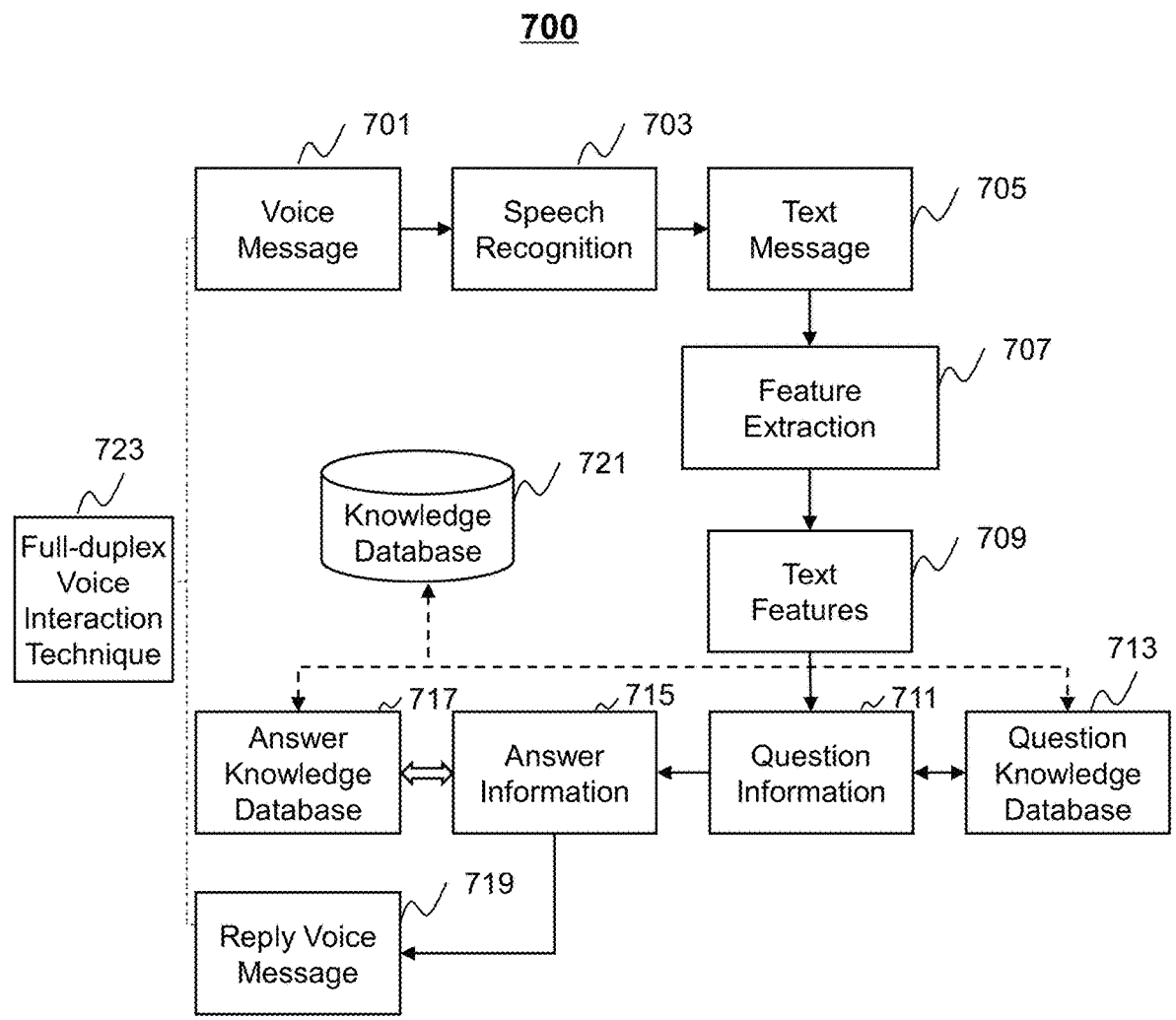
FIG. 7 is a schematic diagram illustrating an exemplary system for smart dialogue communication according to some embodiments of the present disclosure.

FIG. 7 is a schematic diagram illustrating an exemplary system for smart dialogue communication according to some embodiments of the present disclosure. It should be noted that the functions of the system are provided for illustration purposes, and are not intended to limit the scope of the present disclosure. In some embodiments, the system may be implemented as a smart dialogue communication platform.

As shown in FIG. 7, the smart dialogue communication platform (e.g., a smart dialogue communication robot) may receive at least one voice message 701 from a requester terminal device (e.g., the requester terminal device 130) using a full-duplex voice interaction technique 723. The at least one voice message 701 may be converted into at least one incoming text message 705 using a speech recognition model 703 (e.g., a PyTorch-Kaldi speech recognition toolkit). The smart dialogue communication platform may perform feature extraction 707 (e.g., word segmentation, annotation) on the at least one incoming text message 705 to determine text features 709. The smart dialogue communication platform may determine question information 711 associated with the text features 709 by matching the text features in a question knowledge database 713. The smart dialogue communication platform may further obtain answer information 713 corresponding to the question information 715 by matching the question information 715 in an answer knowledge database 717. The smart dialogue communication platform may convert the answer information 715 into at least one reply voice message 719 using a text-to-speech technique. The smart dialogue communication platform may then transmit the at least one reply voice message 719 to the requester terminal device using the full-duplex voice interaction technique 723. In some embodiments, questions in the question knowledge database and answers in the answer knowledge database may form a plurality of question-answer pairs, which may be stored in an integrated knowledge database 721. The knowledge database 721 (e.g., including the question knowledge database 713 and the answer knowledge database 717) may be updated based on the text message, the question information, and/or the answer information. More descriptions regarding the smart dialogue communication may be found elsewhere in the present disclosure (e.g., FIG. 6 and the descriptions thereof).

Figure 8:
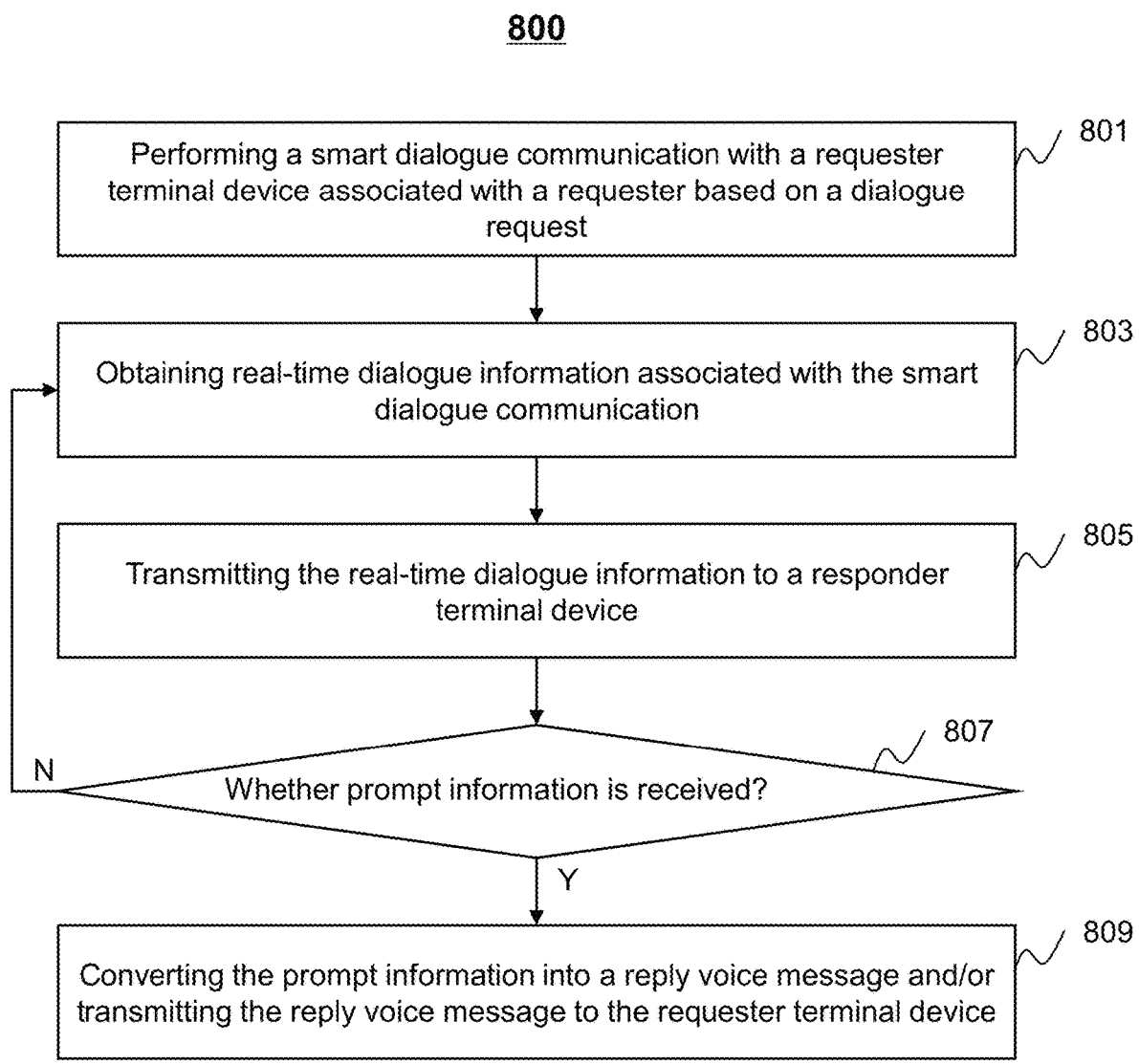
FIG. 8 is a flowchart illustrating an exemplary process for smart dialogue communication according to some embodiments of the present disclosure.

FIG. 8 is a flowchart illustrating an exemplary process for smart dialogue communication according to some embodiments of the present disclosure. At least a portion of process 800 may be implemented on the computing device 200 as illustrated in FIG. 2 or the mobile device 300 as illustrated in FIG. 3. In some embodiments, one or more operations of the process 800 may be implemented in the smart dialogue communication system 100 as illustrated in FIG. 1. In some embodiments, one or more operations in the process 800 may be stored in the storage device 150 and/or the storage (e.g., the ROM 230, the RAM 240, etc.) as a form of instructions, and invoked and/or executed by the server 110 (e.g., the processing device 112 in the server 110 illustrated in FIG. 1, the processor 220 illustrated in FIG. 2, the CPU 340 illustrated in FIG. 3, or one or more modules in the processing device 112 illustrated in FIG. 4). In some embodiments, the instructions may be transmitted in a form of electronic current or electrical signals. The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 801, the processing device 112 (e.g., the smart dialogue communication module 404) may perform a smart dialogue communication with a requester terminal device (e.g., the requester terminal device 130) associated with a requester based on a dialogue request. In some embodiments, the dialogue request may be associated with an incoming call request. In some embodiments, the incoming call request may be initiated by the requester via the requester terminal device. In some embodiments, a responder terminal device may receive the incoming call request from the requester terminal device and/or determine whether the incoming call request satisfies a smart dialogue condition. In some embodiments, the incoming call request may satisfy the smart dialogue condition, and the responder terminal device may generate the dialogue request based on the incoming call request. In some embodiments, the responder terminal device may transmit the dialogue request to the smart dialogue communication platform, and the processing device 112 may perform the smart dialogue communication based on the dialogue request. In some embodiments, the processing device 112 may automatically perform the smart dialogue communication based on the dialogue request.

In some embodiments, before the smart dialogue communication is performed, the processing device 112 may determine whether an answer instruction corresponding to the incoming call request is received from the responder terminal device. In some embodiments, when an incoming call request is received by the responder terminal device, information relating to the incoming call (e.g., the incoming call number, the identity of the requester, etc.) may be displayed on the display device of the responder terminal device. A user of the responder terminal device may decide whether to respond to the incoming call request. If the user decides to respond to the incoming call request, the responder terminal device may generate an answer instruction and/or send the answer instruction to the smart dialogue communication platform, the responder terminal device may not generate the dialogue request, and accordingly, the processing device 112 may not perform the smart dialogue communication. If the user decides not to respond to the incoming call request, the responder terminal device may not generate the answer instruction, or the responder terminal may directly refuse the incoming call request. In some embodiments, the processing device 112 may determine whether the answer instruction is received within a predetermined time period. The predetermined time period may be a default value set by the smart dialogue communication system 100, or may be preset or adjusted by the user of the responder terminal device. In some embodiments, in response to determining that the answer instruction is not received within the predetermined time period (e.g., the user decides not to respond to the incoming call request), the processing device 112 may perform the smart dialogue communication, thereby effectively avoid information loss (e.g., avoid missing incoming call request(s)).

The smart dialogue communication may be performed between the smart dialogue communication platform and the requester terminal device. More descriptions regarding the smart dialogue communication may be found elsewhere in the present disclosure (e.g., FIG. 6 and the descriptions thereof). In some embodiments, the dialogue request may be associated with an incoming call request initiated by the requester via the requester terminal device. The dialogue request may satisfy a smart dialogue condition determined by the responder terminal device. The smart dialogue condition may be preset by the responder terminal device or any other component of the smart dialogue communication system 100. More descriptions of the smart dialogue condition may be found elsewhere in the present disclosure (e.g., FIG. 18 and the relevant descriptions thereof).

In 803, the processing device 112 (e.g., the dialogue information generation module 406) may generate and/or obtain real-time dialogue information associated with the smart dialogue communication. In some embodiments, the dialogue information may include incoming voice messages (e.g., voice messages from the requester) and/or reply voice messages (e.g., voice messages generated by the smart dialogue communication platform). The processing device 112 may record the incoming voice messages and the reply voice messages in real-time and generate the real-time dialogue information. In some embodiments, the dialogue information may include text information. For example, the processing device 112 may record the incoming text message(s), question information associated with the incoming text message(s), and/or answer information corresponding to the question information, and/or generate the real-time dialogue information. More descriptions of the dialogue information, question information, and answer information may be found elsewhere in the present disclosure (e.g., FIGS. 5-6 and descriptions thereof).

In 805, the processing device 112 (e.g., the transmission module 408) may transmit the real-time dialogue information to a responder terminal device (e.g., the responder terminal device 140). In some embodiments, the dialogue information may include voice information. In some embodiments, the processing device 112 may convert the voice information into text information. For example, the processing device 112 may convert the voice information into text information based on a speech recognition technique (also referred to as a speech to text technique). The speech recognition technique may use or include a feature parameter matching algorithm, a hidden Markov model (HMM) algorithm, an artificial neural network (ANN) algorithm, or the like, or any combination thereof. In some embodiments, the processing device 112 may convert the voice information into the text information using a speech recognition model, e.g., a Gaussian mixture model and hidden Markov model (GMM-HMM), a PyTorch-Kaldi speech recognition toolkit, etc. The voice information may be input into the speech recognition model, and the speech recognition model may generate and/or output the text information. The processing device 112 may transmit the text information to the responder terminal device, and/or accordingly, the responder terminal device may display the text information on a display device of the responder terminal device. Alternatively, the processing device 112 may transmit the voice information to the responder terminal device, and/or accordingly, the responder terminal device may broadcast the voice information via a voice player of the responder terminal device. In some embodiments, the processing device 112 may transmit the dialogue information to the responder terminal device 140 in real-time, or intermittently.

In 807, the processing device 112 (e.g., the receiving module 402) may determine whether prompt information is received. The prompt information may be associated with a reply instruction provided by the responder terminal device based on the real-time dialogue information.

In some embodiments, when or after the responder terminal device receives the real-time dialogue information, a user of the responder terminal device may decide whether to intervene in the smart dialogue communication. If the user intervenes in the smart dialogue communication, the user may send, via the responder terminal device, prompt information to the smart dialogue communication platform. Alternatively, if the user decides not to intervene in the smart dialogue communication, the user may not send, via the responder terminal device, prompt information to the smart dialogue communication platform. In some embodiments, the prompt information may refer to information provided by the user via the responder terminal device, and/or be used to intervene in the smart dialogue communication platform (e.g., used to replace the answer information determined by the smart dialogue communication platform, or used to respond to the requester terminal device, etc.). In some embodiments, the prompt information may include text information, voice information, expression information (e.g., emoji), body language information, or the like, or any combination thereof.

In some embodiments, in response to determining that the prompt information is not received, the processing device 112 may proceed to operation 803, or the processing device 112 may continue performing the smart dialogue communication. In 803, the processing device 112 may continue obtaining the real-time dialogue information associated with the smart dialogue communication. Alternatively, in response to determining that the prompt information is received, the processing device 112 may proceed to operation 809. In 809, the processing device 112 (e.g., the smart dialogue communication module 404) may convert the prompt information into a reply voice message. In some embodiments, the processing device 112 (e.g., the transmission module 408) may transmit the reply voice message to the requester terminal device. In some embodiments, the processing device 112 may convert the prompt information into the reply voice message based on a text to speech technique (e.g., a speech synthesis model). The speech synthesis model may include but is not limited to a generative model for raw audio (e.g., WaeNet), a parallel wave generation in end-to-end text-to-speech (e.g., ClariNet), a parallel neural text-to-speech (e.g., ParaNet), or the like. In some embodiments, the prompt information may be input into the speech synthesis model, and the speech synthesis model may generate and/or output the reply voice message. In some embodiments, the processing device 112 may transmit the reply voice message to the requester terminal device using a full-duplex voice interaction technique.

In some embodiments of the present disclosure, the smart dialogue communication platform may transmit the real-time dialogue information to the responder terminal device, so that the user of the responder terminal device can know or obtain the dialogue information in real-time. Besides, the user can intervene in the smart dialogue communication by sending prompt information to the smart dialogue communication platform, which may improve the efficiency of the smart dialogue communication, and improve user experiences.

It should be noted that the above description of the process 800 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, if the user decides to intervene in the smart dialogue communication, the user may send, via the responder terminal device, an instruction to the smart dialogue communication platform to end the smart dialogue communication, and may directly communicate, via the responder terminal device, with the requester terminal device. In some embodiments, the processing device 112 may record the voice information (e.g., the voice information including the incoming voice message(s) and the reply voice message(s)) associated with the smart dialogue communication, and generate a dialogue record based on the voice information. The dialogue record may include information relating to a dialogue process between the requester and the smart dialogue communication platform (and/or the user of the responder terminal device). For example, the dialogue record may include one or more first sentences and/or words said by the requester, and/or one or more second sentences and/or words provided by the dialogue communication platform (and/or the user of the responder terminal device). In some embodiments, the first sentences and/or words and the second sentences and/or words may be presented sequentially according to their appearance in the smart dialogue communication. The dialogue record may be stored in a storage device (e.g., the storage device 150, the ROM 230, the RAM 240, the disk 270, the storage 390, etc.) of the smart dialogue communication platform. In some embodiments, the processing device 112 may transmit the dialogue record to the responder terminal device, so that the user of the responder terminal device can check the dialogue record in real-time, or intermittently. Then, the user can deal with events involved in the dialogue record according to the importance of events, which may improve user experiences. In some embodiments, the dialogue record may be broadcasted via a voice player. Alternatively, the dialogue record may be displayed (e.g., in a form of list) on a display device (e.g., a display device of the responder terminal device).

Figure 9:
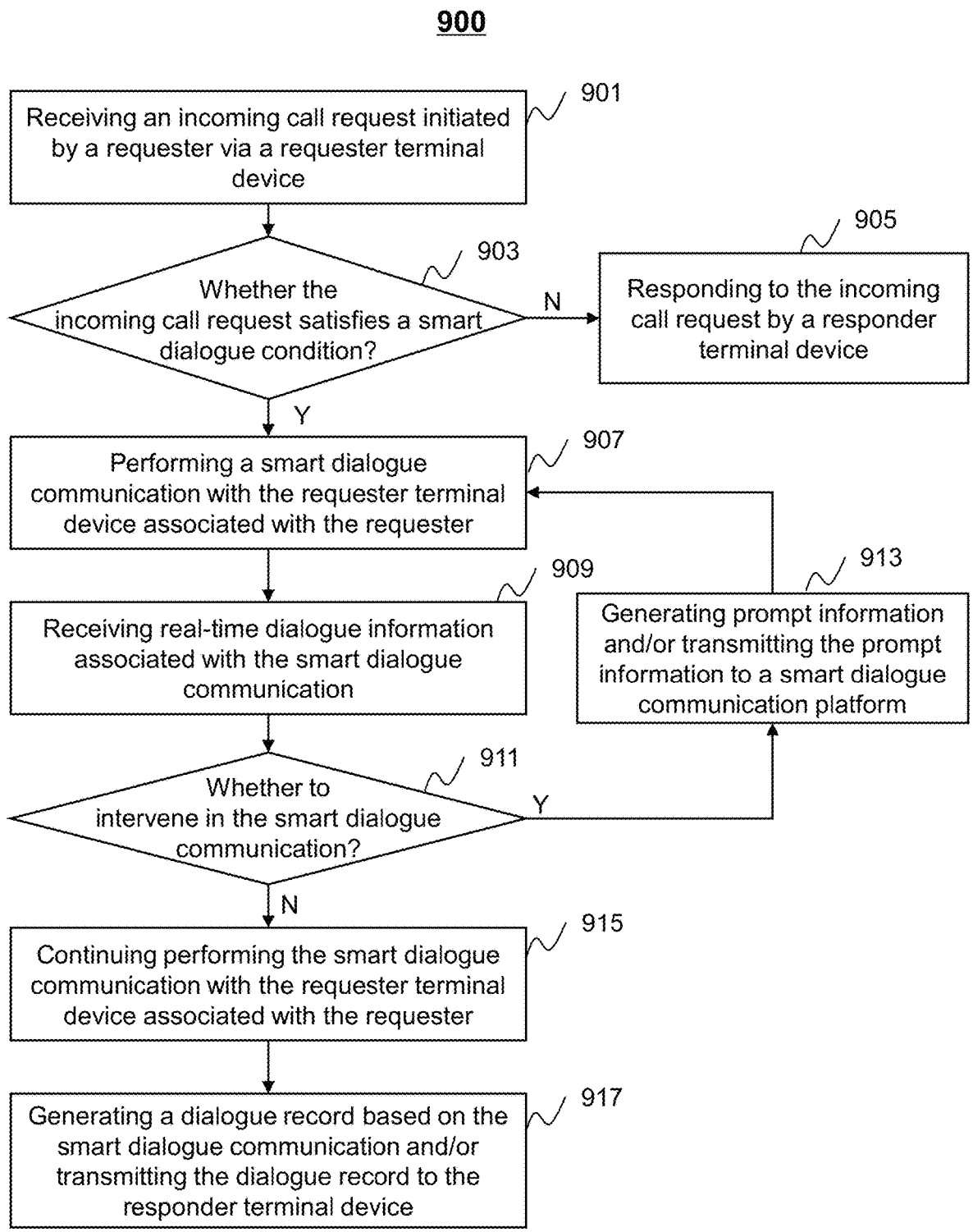
FIG. 9 is a flowchart illustrating an exemplary process for smart dialogue communication according to some embodiments of the present disclosure.

FIG. 9 is a flowchart illustrating an exemplary process for smart dialogue communication according to some embodiments of the present disclosure. At least a portion of process 900 may be implemented on the computing device 200 as illustrated in FIG. 2 or the mobile device 300 as illustrated in FIG. 3. In some embodiments, one or more operations of the process 900 may be implemented in the smart dialogue communication system 100 as illustrated in FIG. 1. In some embodiments, one or more operations in the process 900 may be stored in the storage device 150 and/or the storage (e.g., the ROM 230, the RAM 240, etc.) as a form of instructions, and invoked and/or executed by the server 110 (e.g., the processing device 112 in the server 110 illustrated in FIG. 1, the processor 220 illustrated in FIG. 2, the CPU 340 illustrated in FIG. 3, or one or more modules in the processing device 112 illustrated in FIG. 4). In some embodiments, the instructions may be transmitted in a form of electronic current or electrical signals. The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting. In some embodiments, one or more operations of the process 900 may be similar to operation(s) of the process 800.

In 901, a responder terminal device (e.g., the responder terminal device 140) may receive an incoming call request initiated by a requester via a requester terminal device (e.g., the requester terminal device 130). In 903, the responder terminal device may determine whether the incoming call request satisfies a smart dialogue condition. In response to determining that the incoming call request does not satisfy the incoming call request, in 905, the responder terminal device may respond to the incoming call request. For example, the responder terminal device may directly communicate with the requester terminal device. As another example, a user of the responder terminal device may refuse the incoming call request (e.g., the user may directly hang up by clicking a hang-up button presented on the display device of the responder terminal device).

In response to determining that the incoming call request satisfies the smart dialogue condition, the responder terminal device may generate a dialogue request. The dialogue request may be configured to request a smart dialogue communication. The responder terminal device may transmit the dialogue request to a smart dialogue communication platform. In 907, the smart dialogue communication platform (e.g., the processing device 112) may perform the smart dialogue communication with the requester terminal device associated with the requester. More descriptions of the incoming call request, the dialogue request, and the smart dialogue communication may be found elsewhere in the present disclosure (e.g., FIGS. 5-6 and descriptions thereof).

In 909, the responder terminal device may receive real-time dialogue information associated with the smart dialogue communication. In 911, the responder terminal device may determine whether to intervene in the smart dialogue communication. In response to determining that the responder terminal device needs to intervene in the smart dialogue communication, in 913, the responder terminal device may generate prompt information and/or transmit the prompt information to the smart dialogue communication platform. The smart dialogue communication platform may convert the prompt information into reply voice information and/or transmit the reply voice information to the requester terminal device. More descriptions of the prompt information and the conversion of the prompt information may be found elsewhere in the present disclosure (e.g., FIG. 8 and descriptions thereof).

In response to determining that the responder terminal device does not intervene in the smart dialogue communication, in 915, the smart dialogue communication platform (e.g., the processing device 112) may continue performing the smart dialogue communication with the requester terminal device associated with the requester. In 917, the smart dialogue communication platform (e.g., the processing device 112) may generate a dialogue record based on the smart dialogue communication and/or transmit the dialogue record to the responder terminal device.

Figure 10:
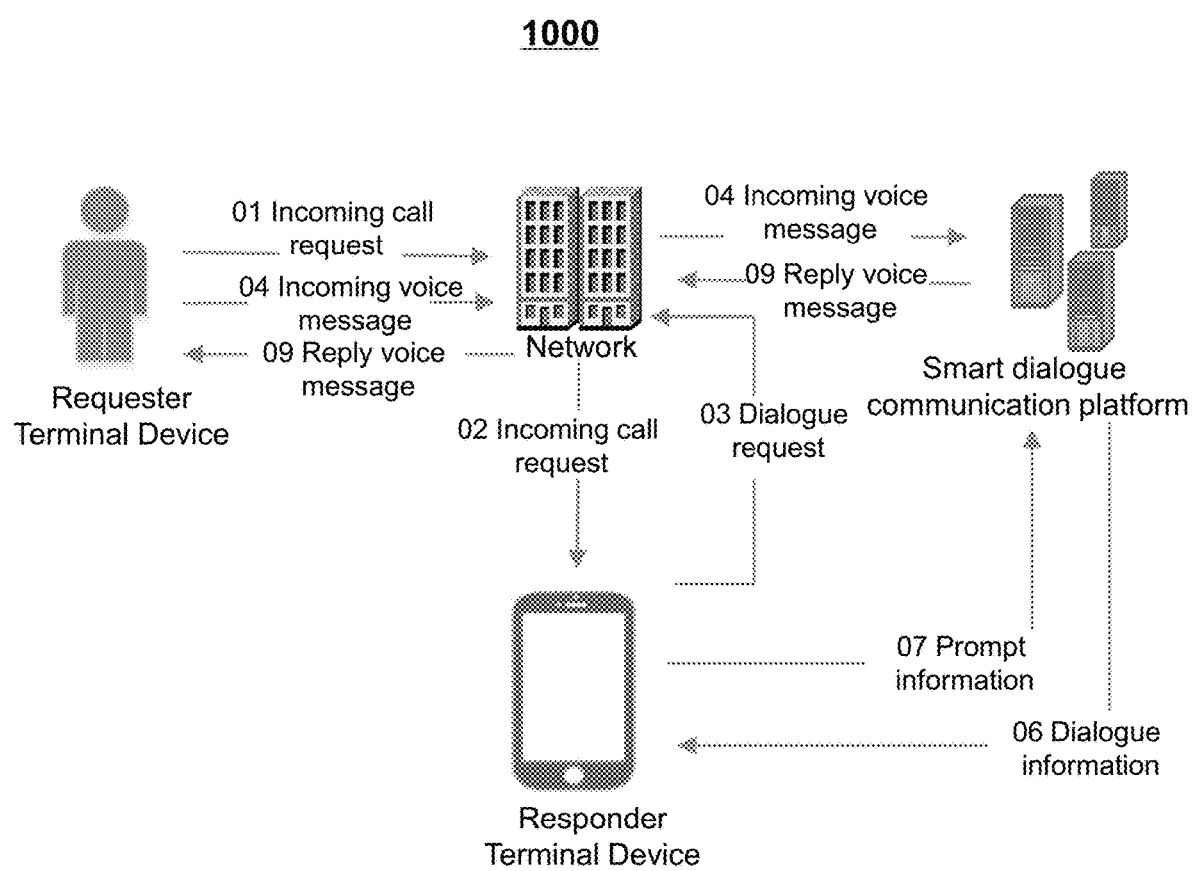
FIG. 10 is a schematic diagram illustrating an exemplary system for smart dialogue communication according to some embodiments of the present disclosure.

FIG. 10 is a schematic diagram illustrating an exemplary system for smart dialogue communication according to some embodiments of the present disclosure. It should be noted that the system is provided for illustration purposes, and are not intended to limit the scope of the present disclosure. The system may include a requester terminal device, a responder terminal device, and a smart dialogue communication platform (e.g., a smart dialogue communication robot). As shown in FIG. 10, the communication between the requester terminal device, the responder terminal device, and/or the smart dialogue communication platform may be implemented via the network (e.g., the network 120).

As shown in FIG. 10, a requester of the requester terminal device may send an incoming call request 01 via the network. A user of the responder terminal device may receive the incoming call request 02 via the network. The responder terminal device may determine whether the incoming call request 02 satisfies a smart dialogue condition. If the smart dialogue condition is satisfied, the responder terminal device may generate a dialogue request 03 configured to request a smart dialogue communication based on the incoming call request 02. The responder terminal device may transmit the dialogue request 03 to the smart dialogue communication platform via the network.

The smart dialogue communication platform may perform the smart dialogue communication with the requester terminal device via the network. In some embodiments, the smart dialogue communication platform may transmit a message (e.g., a voice message, a text message, etc.) to the requester terminal device to inform the requester terminal device that the smart dialogue communication platform is answering the incoming call request. For example, the smart dialogue communication platform may transmit a message such as "Hello, I'm a smart assistant, can I help you?" to the requester terminal device. The requester terminal device may transmit the incoming voice message 04 to the smart dialogue communication platform via the network. The smart dialogue communication platform may receive the incoming voice message 04 via the network. The smart dialogue communication platform may generate reply voice message(s) 09 based on a knowledge database (e.g., a question knowledge database, and/or an answer knowledge database, etc.) in response to the incoming voice message 04. The smart dialogue communication platform may transmit the reply voice message(s) 09 to the requester terminal device.

During the smart dialogue communication, the smart dialogue communication platform may generate and/or obtain real-time dialogue information 06, and/or transmit the real-time dialogue information 06 to the responder terminal device. The user of the responder terminal device can check the real-time dialogue information 06 and decides whether to intervene in the smart dialogue communication (e.g., whether to generate prompt information 07). If the user of the responder terminal device intervenes in the smart dialogue communication, the responder terminal device may generate the prompt information 07, and the responder terminal device may transmit the prompt information 07 to the smart dialogue communication platform. The smart dialogue communication platform may convert the prompt information 07 into reply voice message(s) 09, and transmit the reply voice message(s) 09 to the requester terminal device.

Figure 11:
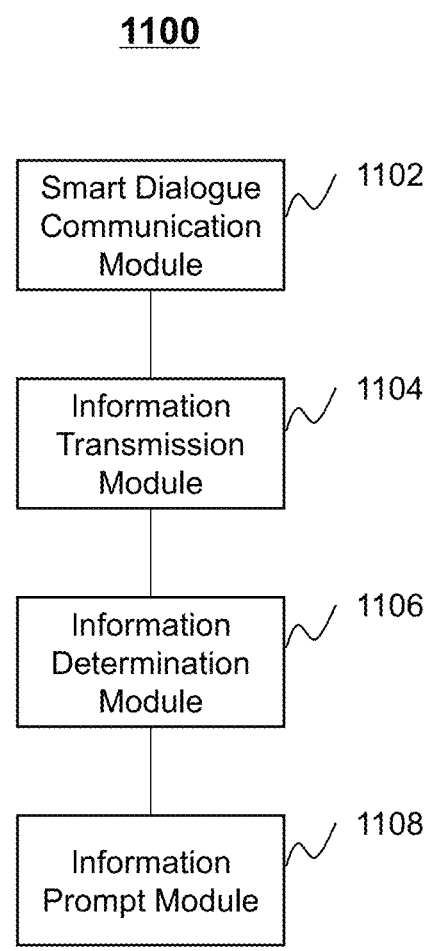
FIG. 11 is a block diagram illustrating an exemplary device for smart dialogue communication according to some embodiments of the present disclosure.

FIG. 11 is a block diagram illustrating an exemplary device for smart dialogue communication according to some embodiments of the present disclosure. The device (also referred to as a smart dialogue communication device) 1100 may be implemented on the computing device (e.g., the processor 220 of the computing device 200) as illustrated in FIG. 2, and/or the CPU 340 as illustrated in FIG. 3. As shown in FIG. 11, the device 1100 may include a smart dialogue communication module 1102, an information transmission module 1104, an information determination module 1106, and an information prompt module 1108. In some embodiments, the smart dialogue communication module 1102, the information transmission module 1104, the information determination module 1106, and the information prompt module 1108 may be implemented on a smart dialogue communication platform.

The smart dialogue communication module 1102 may be configured to perform a smart dialogue communication with a requester terminal device associated with a requester based on a dialogue request, and obtain real-time dialogue information associated with the smart dialogue communication. The information transmission module 1104 may be configured to transmit the real-time dialogue information to a responder terminal device. The information determination module 1106 may be configured to determine whether prompt information is received. The prompt information may be associated with a reply instruction provided by the responder terminal device based on the real-time dialogue information.

The device 1100 in the present disclosure may be used to perform one or more operations of process 800 as described in FIG. 8. The implementation principle and technical effects of the device 1100 may be similar to the operations illustrated in the process 800. In some embodiments, the device 1100 may further include a display device configured to display the real-time dialogue information. In some embodiments, the device 1100 may be an exemplary embodiment of the processing device 112.

Figure 12:
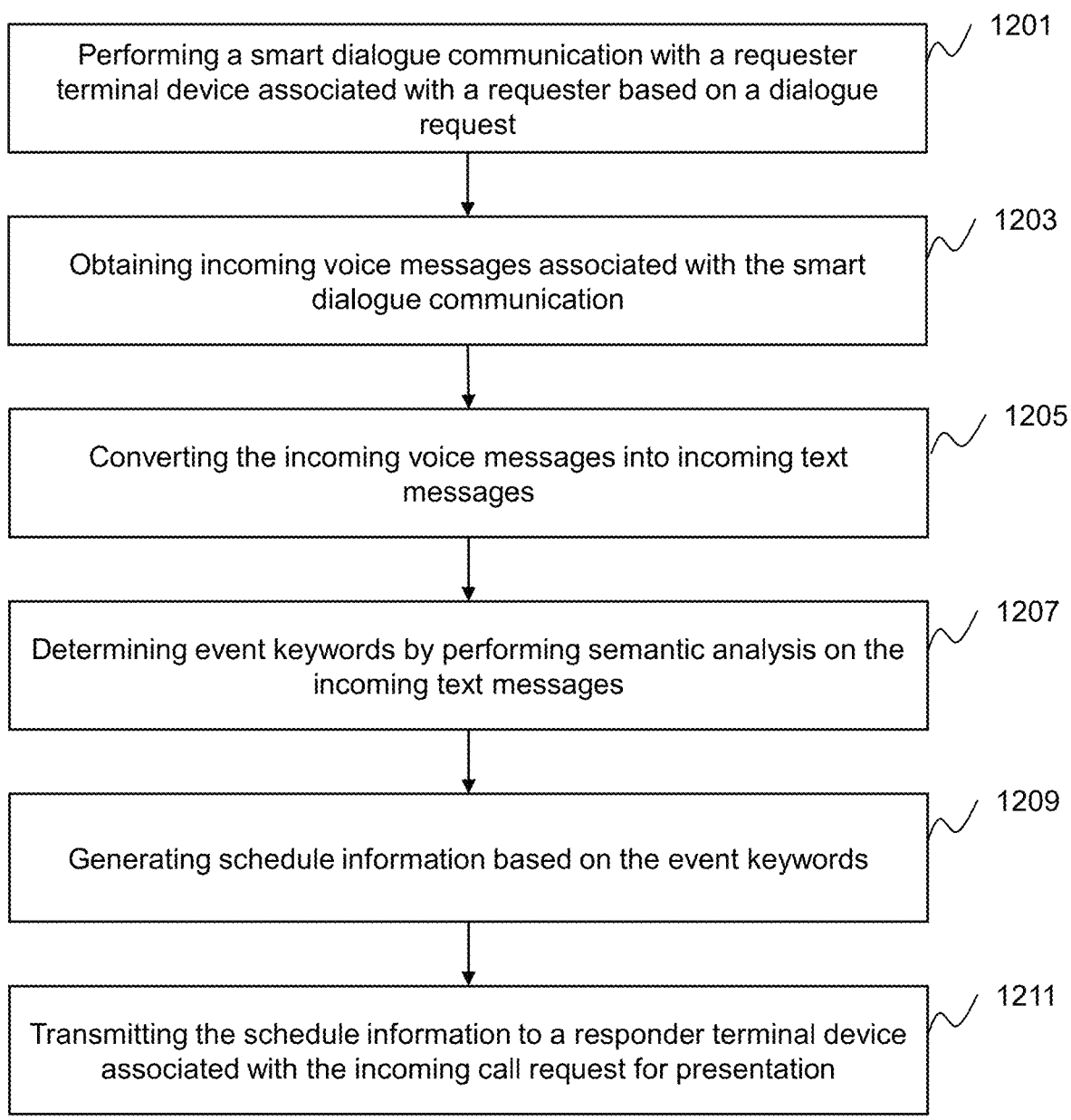
FIG. 12 is a flowchart illustrating an exemplary process for generating schedule information according to some embodiments of the present disclosure.

FIG. 12 is a flowchart illustrating an exemplary process for generating schedule information according to some embodiments of the present disclosure. At least a portion of process 1200 may be implemented on the computing device 200 as illustrated in FIG. 2 or the mobile device 300 as illustrated in FIG. 3. In some embodiments, one or more operations of the process 1200 may be implemented in the smart dialogue communication system 100 as illustrated in FIG. 1. In some embodiments, one or more operations in the process 1200 may be stored in the storage device 150 and/or the storage (e.g., the ROM 230, the RAM 240, etc.) as a form of instructions, and invoked and/or executed by the server 110 (e.g., the processing device 112 in the server 110 illustrated in FIG. 1, the processor 220 illustrated in FIG. 2, the CPU 340 illustrated in FIG. 3, or one or more modules in the processing device 112 illustrated in FIG. 4). In some embodiments, the instructions may be transmitted in a form of electronic current or electrical signals. The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting.

In 1201, the processing device 112 (e.g., the smart dialogue communication module 404) may perform a smart dialogue communication with a requester terminal device (e.g., the requester terminal device 130) associated with a requester based on a dialogue request. More descriptions of the dialogue request and the performing of the smart dialogue communication may be found elsewhere in the present disclosure (e.g., FIGS. 5-6, and 8 and descriptions thereof).

In 1203, the processing device 112 (e.g., the smart dialogue communication module 404) may obtain incoming voice messages associated with the smart dialogue communication. The incoming voice messages may include voice messages of the requester generated in the incoming call request and/or the smart dialogue communication. In some embodiments, the processing device 112 may obtain the incoming voice messages from the requester terminal device via a network (e.g., the network 120).

In 1205, the processing device 112 (e.g., the smart dialogue communication module 404) may convert the incoming voice messages into incoming text messages. In some embodiments, the processing device 112 may convert the incoming voice messages into the incoming text messages based on a speech recognition technique (also referred to as a speech to text technique). The speech recognition technique may use or include a feature parameter matching algorithm, a hidden Markov model (HMM) algorithm, an artificial neural network (ANN) algorithm, or the like, or any combination thereof. In some embodiments, the processing device 112 may convert the incoming voice messages into the incoming text messages using a speech recognition model, e.g., a Gaussian mixture model and hidden Markov model (GMM-HMM), a PyTorch-Kaldi speech recognition toolkit, etc. The incoming voice messages may be input into the speech recognition model, and the speech recognition model may generate and/or output the incoming text messages.

In 1207, the processing device 112 (e.g., the smart dialogue communication module 404) may determine event keywords by performing semantic analysis on the incoming text messages. In some embodiments, the processing device 112 may process the incoming text messages by performing word segmentation and/or annotation on the incoming text messages. For example, the processing device 112 may process the incoming text messages using a THU lexical analyzer for Chinese (THULAC) toolkit. The processing device 112 may then determine text features by performing feature extraction on the processed incoming text messages using a language model. Exemplary language models may include a generalized autoregressive pretraining for language understanding (XLNet) model, a statistical language model (e.g., N-gram), a neural network language model, a recurrent neural network language model, a neural probabilistic language model etc. For example, the processing device 112 may determine the text features by performing feature extraction on the processed incoming text messages using an XLNet model. The processed incoming text messages may be input into the language model, and the language model may generate and/or output the text features. In some embodiments, the processing device 112 may determine the event keywords by performing semantic analysis on the extracted information using a semantic analysis model. Exemplary semantic analysis models may include a transition-based neural abstract syntax parser (TRANX).

In some embodiments, the smart dialogue communication may relate to an event. For example, the requester may provide the user (or responder) with information relating to an event or request the user to deal with the event during the smart dialogue communication. The event may relate to one or more things to deal with (e.g., participate a party, attend a conference, reserve a ticket, reserve a room, etc.). In some embodiments, the event keywords may include a name of the requester, an event time, an event location, an event content, or the like, or any combination thereof. The name of the requester may refer to the name of the requester who initiates the incoming call request. The event time may refer to the time related to the event (e.g., the time of dealing with the event, the occurrence time of the event, etc.). The event location may refer to the location related to the event (e.g., the location of dealing with the event, the occurrence location of the event, etc.). The event content may refer to descriptions or details of the event. It can be understood that the above descriptions of the event keywords are merely for illustration and are not intended to limit the scope of the present disclosure. In some embodiments, the event keywords may be defined or set by the user. For example, the event keywords may include other information, such as incoming call time.

In some embodiments, to determine the event time, the processing device 112 may obtain time information by performing the semantic analysis on the incoming text messages. In some embodiments, the processing device 112 may determine whether the time information includes an absolute time. In some embodiments, the time information may include an absolute time, e.g., eight o'clock (8:00 am). In some embodiments, the time information may include a relative time, e.g., after eight hours. In response to determining that the time information includes the absolute time, the processing device 112 may designate the time information as the event time. Alternatively, in response to determining that the time information includes the relative time, the processing device 112 may determine the event time based on the time information and a system time. For example, if the time information is "after eight hours", and the system time is eight o'clock (8:00 am), then the event time may be determined as sixteen o'clock (4:00 pm).

In 1209, the processing device 112 (e.g., the smart dialogue communication module 404) may generate schedule information based on the event keywords. The schedule information may include a daily (or weekly, or monthly) schedule of the user (e.g., the responder). The schedule information may include one or more things to be done, such as participating a party, attending a conference, reserving a ticket, reserving a room, etc. In some embodiments, the schedule information may be denoted by "the name of the requester: *; the event time: *; the event location: *; the event content: *." In some embodiments, the schedule information may be denoted by any other form. In some embodiments, the items and/or the format of the schedule information may be preset by the smart dialogue communication system 100 or defined by the user of the responder terminal device.

In 1211, the processing device 112 (e.g., the transmission module 408) may transmit the schedule information to a responder terminal device (e.g., the responder terminal device 140) associated with the incoming call request for presentation (e.g., display). In some embodiments, the schedule information may be displayed on a display device of the responder terminal device.

In some embodiments, the processing device 112 or the responder terminal device may determine an emergency level of the schedule information according to a level classification rule. In some embodiments, the processing device 112 or the responder terminal device may determine a reminder time of the schedule information based on the emergency level. In some embodiments, the processing device 112 may transmit the reminder time to the responder terminal device. In some embodiments, the responder terminal device may generate a reminder at the reminder time. In some embodiments, the emergency level may include three levels: (1) urgent affairs (which need to be dealt with immediately), (2) general affairs (which can be dealt with after a time period), (3) harassing calls (which need not to be dealt with). If the emergency level is directed to urgent affairs, after the schedule information is received by the responder terminal device, the responder terminal device may immediately remind the user with an alarm. If the emergency level is directed to general affairs, the responder terminal device may generate a reminder (e.g., send out an alarm). In some embodiments, the reminder time and/or the ways of the reminder may be defined or preset by the user of the responder terminal device. In some embodiments, the reminder may be generated at the reminder time (e.g., a preset time before the event time (e.g., a day before the event time, five hours before the event time, one hour before the event time, etc.)). In some embodiments, if the emergency level is directed to harassing calls, the processing device 112 or the responder terminal device may not generate the reminder.

In some embodiments of the present disclosure, when the user is not convenient to respond to the incoming call request, the smart dialogue communication platform (e.g., the processing device 112) may perform the smart dialogue communication with the requester terminal device to obtain the incoming voice messages. The processing device 112 may convert the incoming voice messages into the incoming text messages, and determine the event keywords by performing semantic analysis on the incoming text messages. The processing device 112 may then generate schedule information based on the event keywords and/or transmit the schedule information to the responder terminal device associated with the incoming call request for display. Therefore, the omission of information and the missing of important events may be avoided, thereby improving user experiences. In some embodiments, the processing device 112 may store the schedule information instead of the voice information (or text information) generated during the smart dialogue communication in a storage of the smart dialogue communication platform, or the responder terminal device may store the schedule information instead of the voice information (or text information), thereby saving the storage space of the storage device (e.g., the storage device 150, the ROM 230, the RAM 240, the disk 270, or the storage 390, or an external storage device associated with the smart dialogue communication system 100). By generating the schedule information, the processing device 112 or the responder terminal device may obtain or identify relatively more effective information based on the smart dialogue communication, thereby avoiding information loss (e.g., avoid missing important events), providing great convenience for incoming call affair processing, and improving the user experiences.

It should be noted that the above description of the process 1200 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, before performing the smart dialogue communication, the responder terminal device may determine whether an incoming call number of the incoming call request exists in a contact list of the responder terminal device. If the incoming call number exists in the contact list, the responder terminal device may determine a name in the contact list corresponding to the incoming call number as the name of the requester. If the incoming call number does not exist in the contact list, the name of the requester may be determined based on the smart dialogue communication as described in operation 1207.

Figure 13:
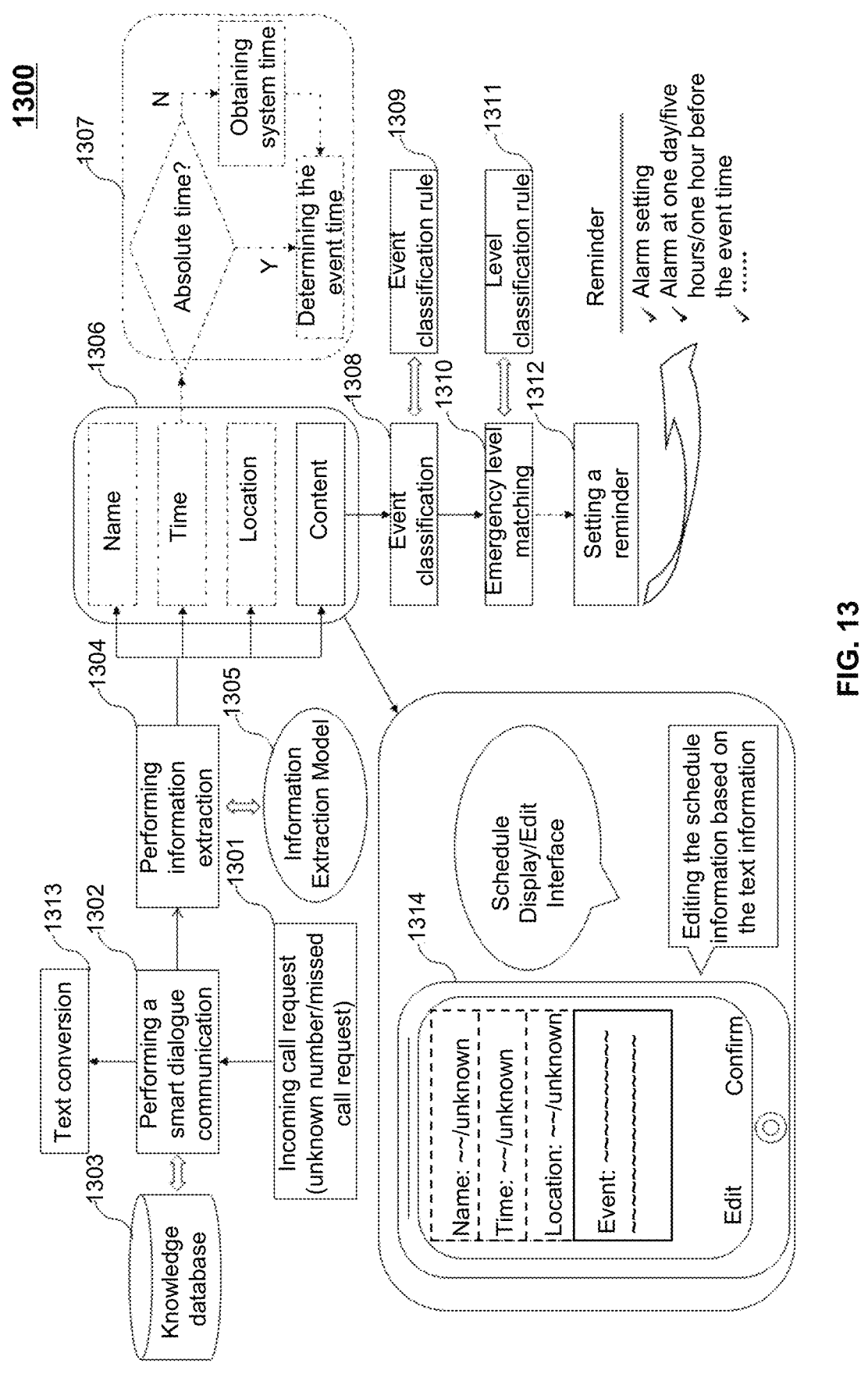

FIG. 13 is a schematic diagram illustrating an exemplary system for generating schedule information according to some embodiments of the present disclosure. It should be noted that the functions of the system are provided for illustration purposes, and are not intended to limit the scope of the present disclosure.

As shown in FIG. 13, a responder terminal device (e.g., the responder terminal device 140) may receive an incoming call request 1301 from a requester terminal device (e.g., the requester terminal device 130). In some embodiments, if the incoming call request 1301 includes an unknown or strange number (i.e., the incoming call number is unknown or strange), or the incoming call request 1301 is not answered by the responder terminal device (also referred to as missed call request), the responder terminal device may determine that the incoming call request 1301 satisfies the smart dialogue condition, and transmit the incoming call request 1301 to a smart dialogue communication platform. In 1302, the smart dialogue communication platform may perform the smart dialogue communication with the requester terminal device. In some embodiments, the smart dialogue communication platform may communicate with the requester terminal device based on a knowledge database 1303 (e.g., a question knowledge database, an answer knowledge database, etc.). In some embodiments, the smart dialogue communication platform may obtain voice information generated in the smart dialogue communication. In 1313, the smart dialogue communication platform may perform a text conversion on the voice information, i.e., the smart dialogue communication platform may convert the voice information into text information. For example, the smart dialogue communication platform may convert incoming voice messages into incoming text messages.

In some embodiments, the smart dialogue communication platform may process the incoming text messages by performing word segmentation and/or annotation on the incoming text messages. In 1304, the smart dialogue communication platform may determine text features by performing feature extraction on the processed incoming text messages using a language model 1305. The smart dialogue communication platform may then determine event keywords 1306 by performing semantic analysis on the text features using a semantic analysis model. The event keywords 1306 may include the name the requester, the event time, the event location, the event content, or the like.

If the incoming call number of the incoming call request exists in a contact list of the responder terminal device, the responder terminal device may determine a name in the contact list corresponding to the incoming call number as the name of the requester. In some embodiments, the smart dialogue communication platform or the responder terminal device may determine whether the event time is an absolute time. If the event time 1307 is an absolute time, the smart dialogue communication platform or the responder terminal device may directly confirm the event time. If the event time is not an absolute time (e.g., a relative time), the smart dialogue communication platform or the responder terminal device may obtain the system time, and/or determine the event time based on the relative time and the system time.

In some embodiments, the smart dialogue communication platform may generate the schedule information based on the event keywords and/or transmit the schedule information to the responder terminal device. In some embodiments, the smart dialogue communication platform may transmit the event keywords to the responder terminal device, and the responder terminal device may generate the schedule information based on the event keywords. In some embodiments, the responder terminal device may display the schedule information on a display device 1314. The presentation of the schedule information may be shown in FIG. 13. In some embodiments, the responder terminal device may provide a user interface to facilitate the user of the responder terminal device to edit the schedule information based on the text information converted in 1313.

In some embodiments, the smart dialogue communication platform or the responder terminal device may generate a reminder based on the schedule information. For example, in 1308, the smart dialogue communication platform or the responder terminal device may perform an event classification on the schedule information according to an event classification rule 1309. According to the event classification rule 1309, the event(s) may be classified base on a field of the event, an importance of the event, etc. In some embodiments, the smart dialogue communication platform or the responder terminal device may determine an emergency level (also referred to as emergency level matching operation 1310) according to a level classification rule 1311. In some embodiments, in 1312, the smart dialogue communication platform or the responder terminal device may set a reminder based on the emergency level. In some embodiments, the reminder may include sending out an alarm immediately; sending out an alarm at one day before the event time, five hours before the event time, one hour before the event time, or the like.

Figure 14:
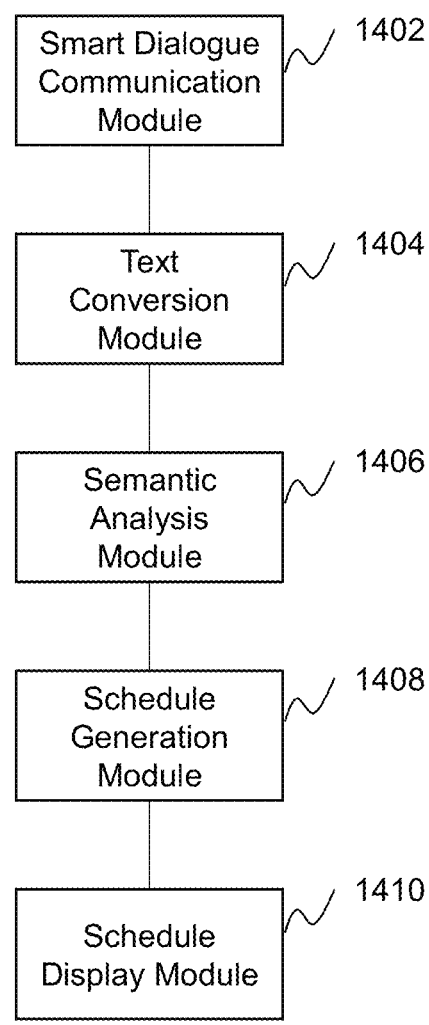
FIG. 14 is a block diagram illustrating an exemplary device for smart dialogue communication according to some embodiments of the present disclosure.

FIG. 14 is a block diagram illustrating an exemplary device for smart dialogue communication according to some embodiments of the present disclosure. The device (also referred to as a schedule generation device) 1400 may be implemented on the computing device (e.g., the processor 220 of the computing device 200) as illustrated in FIG. 2, and/or the CPU 340 as illustrated in FIG. 3. As shown in FIG. 14, the device 1400 may include a smart dialogue communication module 1402, a text conversion module 1404, a semantic analysis module 1406, a schedule generation module 1408, and a schedule display module 1410. In some embodiments, the smart dialogue communication module 1402, the text conversion module 1404, the semantic analysis module 1406, the schedule generation module 1408, and the schedule display module 1410 may be implemented on a smart dialogue communication platform.

The smart dialogue communication module 1402 may be configured to perform a smart dialogue communication with a requester terminal device associated with a requester based on a dialogue request, and/or obtain incoming voice messages associated with the smart dialogue communication. The text conversion module 1404 may be configured to convert the incoming voice messages into incoming text messages. The semantic analysis module 1406 may be configured to determine event keywords by performing semantic analysis on the incoming text messages. The schedule generation module 1408 may be configured to generate schedule information based on the event keywords. The schedule display module 1410 may be configured to transmit the schedule information to a responder terminal device associated with the incoming call request for display.

The device 1400 in the present disclosure may be used to perform one or more operations of process 1200 as described in FIG. 12. The implementation principle and technical effects of the device 1400 may be similar to the operations illustrated in the process 1200. In some embodiments, the device 1400 may be an exemplary embodiment of the processing device 112.

Figure 15:
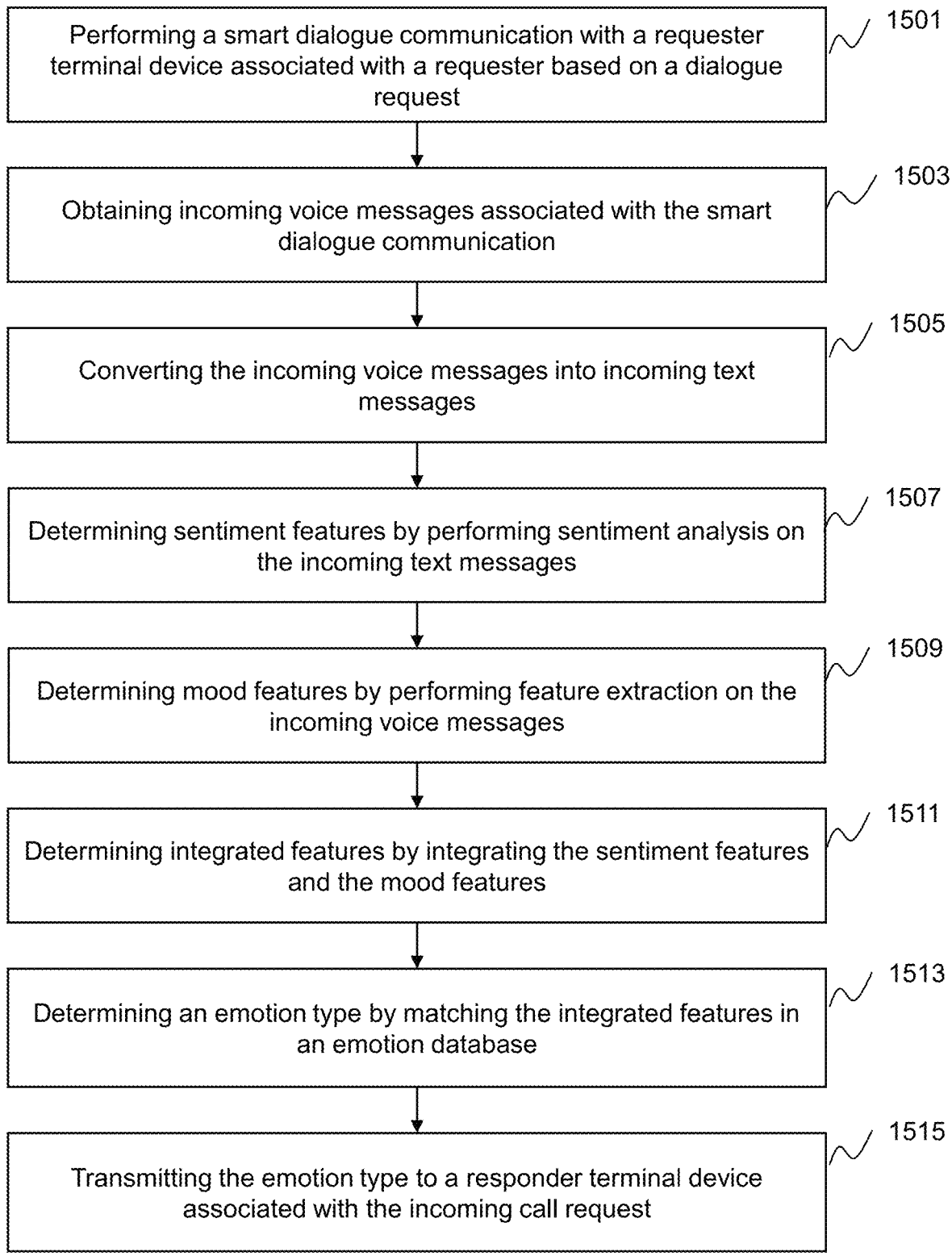
FIG. 15 is a flowchart illustrating an exemplary process for determining an emotion type of a requester according to some embodiments of the present disclosure.

FIG. 15 is a flowchart illustrating an exemplary process for determining an emotion type of a requester according to some embodiments of the present disclosure. At least a portion of process 1500 may be implemented on the computing device 200 as illustrated in FIG. 2 or the mobile device 300 as illustrated in FIG. 3. In some embodiments, one or more operations of the process 1500 may be implemented in the smart dialogue communication system 100 as illustrated in FIG. 1. In some embodiments, one or more operations in the process 1500 may be stored in the storage device 150 and/or the storage (e.g., the ROM 230, the RAM 240, etc.) as a form of instructions, and invoked and/or executed by the server 110 (e.g., the processing device 112 in the server 110 illustrated in FIG. 1, the processor 220 illustrated in FIG. 2, the CPU 340 illustrated in FIG. 3, or one or more modules in the processing device 112 illustrated in FIG. 4). In some embodiments, the instructions may be transmitted in a form of electronic current or electrical signals. The operations of the illustrated process presented below are intended to be illustrative. In some embodiments, the process 1500 may be accomplished with one or more additional operations not described, and/or without one or more of the operations discussed. Additionally, the order in which the operations of the process 1500 as illustrated in FIG. 15 and described below is not intended to be limiting.

In 1501, the processing device 112 (e.g., the smart dialogue communication module 404) may perform a smart dialogue communication with a requester terminal device (e.g., the requester terminal device 130) associated with a requester based on a dialogue request. More descriptions of the dialogue request and the performing of the smart dialogue communication may be found elsewhere in the present disclosure (e.g., FIGS. 5-6, and 8 and descriptions thereof).

In 1503, the processing device 112 (e.g., the smart dialogue communication module 404) may obtain incoming voice messages associated with the smart dialogue communication. The incoming voice messages may include voice messages of the requester generated in the incoming call request and/or the smart dialogue communication. In some embodiments, the processing device 112 may obtain the incoming voice messages from the requester terminal device via a network (e.g., the network 120).

In 1505, the processing device 112 (e.g., the smart dialogue communication module 404) may convert the incoming voice messages into incoming text messages. In some embodiments, the processing device 112 may convert the incoming voice messages into the incoming text messages based on a speech recognition technique (also referred to as a speech to text technique). The speech recognition technique may use or include a feature parameter matching algorithm, a hidden Markov model (HMM) algorithm, an artificial neural network (ANN) algorithm, or the like, or any combination thereof. In some embodiments, the processing device 112 may convert the incoming voice messages into the incoming text messages using a speech recognition model, e.g., a Gaussian mixture model and hidden Markov model (GMM-HMM), a PyTorch-Kaldi speech recognition toolkit, etc. The incoming voice messages may be input into the speech recognition model, and the speech recognition model may generate and/or output the incoming text messages.

In 1507, the processing device 112 (e.g., the smart dialogue communication module 404) may determine sentiment features by performing sentiment analysis on the incoming text messages. In some embodiments, the sentiment features may include feature words representing emotions. In some embodiments, the sentiment features may be expressed as one or more vectors. In some embodiments, the processing device 112 may perform the sentiment analysis using a sentiment analysis model. Exemplary sentiment analysis models may include an XLNet model, a bidirectional encoder representation from transformers (BERT) model, or the like, or any combination thereof. The incoming text messages may be input into the sentiment analysis model, and the sentiment analysis model may generate and/or output the sentiment features.

In 1509, the processing device 112 (e.g., the smart dialogue communication module 404) may determine mood features by performing feature extraction on the incoming voice messages. In some embodiments, the mood features may include feature words representing tones. In some embodiments, the mood features may be expressed as one or more vectors. In some embodiments, the sentiment features may indicate emotional fluctuations of the requester when the requester speaks. The mood features may indicate tone changes of the requester when the requester speaks. The processing device 112 may perform the feature extraction using a feature extraction model. Exemplary feature extraction models may include a weighted finaite-state transducer (WFST) model. The incoming voice messages may be input into the feature extraction model, and the feature extraction model may generate and/or output the mood features.

In 1511, the processing device 112 (e.g., the smart dialogue communication module 404) may determine integrated features by integrating the sentiment features and the mood features. The integrated features may include feature words representing emotions and tones of the requester. In some embodiments, the processing device 112 may directly combine the sentiment features and the mood features to generate the integrated features (e.g., an integrated vector). Alternatively, the processing device 112 may assign a first weight for the sentiment features and a second weight for the mood features, and determine the integrated features based on the sentiment features and the mood features and corresponding weights. The present disclosure considers both the sentiment features (corresponding to the incoming text messages) and the mood features (corresponding to the incoming voice messages), thereby ensuring the accuracy of emotion recognition results.

In 1513, the processing device 112 (e.g., the smart dialogue communication module 404) may determine an emotion type (of the requester) by matching the integrated features in an emotion database. The emotion type may include an emotion of the requester (e.g., happy, sad, calm, anxious, etc.), a character of the requester (e.g., extroversion, introversion, etc.), or the like. The emotion database may store a plurality of candidate emotion types. The emotion database may be stored in a storage device associated with the smart dialogue communication platform (e.g., the storage device 150, the ROM 230, the RAM 240, the disk 270, the storage 390, etc.). Alternatively, the emotion database may be stored in an external storage device, and the processing device 112 may retrieve the emotion database via a network (e.g., the network 120). The emotion database may be preset by the smart dialogue communication system 100, or self-defined by a user of the responder terminal device 140. In some embodiments, the processing device 112 may match the integrated features in the emotion database using a third semantic matching model (e.g., a deep structured semantic model (DSSM), a long short term memory deep structured semantic model (LSTM-DSSM), an enhanced LSTM for natural language inference (ESIM), an attention-based convolutional neural network for modeling sentence pairs (ABCNN), etc.). For example, the processing device 112 may input the integrated features and/or the candidate emotion types within the emotion database into the third semantic matching model. The third semantic matching model may generate and/or output a matching degree between the integrated features and a (e.g., each) candidate emotion type. In some embodiments, the processing device 112 may determine the emotion type based on the matching degree(s). For example, the processing device 112 may determine the candidate emotion type having the highest matching degree as the emotion type.

In some embodiments, if the emotion type is not obtained by matching the integrated features in the emotion database, the processing device 112 may create a new emotion type based on the integrated features, and designate the new emotion type as the emotion type. In some embodiments, the processing device 112 may update the emotion database by adding the new emotion type to the emotion database. Thus, the processing device 112 can quickly identify the emotion type of a requester when the processing device 112 receives the same or similar incoming call request from the requester.

In 1515, the processing device 112 (e.g., the transmission module 408) may transmit the emotion type to a responder terminal device (e.g., the responder terminal device 140) associated with the incoming call request. In some embodiments, the responder terminal device may display the emotion type on a display device of the responder terminal device. The display format may be preset by the smart dialogue communication system 100 or defined by the user of the responder terminal device. For example, the display format may include "the incoming call number: *; the emotion type: *; "the character of the requester: *"; the incoming call time: *." In some embodiments, if the incoming call number exists in the contact list, the display information may also include "the name of the requester: ***."

In some embodiments, the processing device 112 may generate suggestion information based on the emotion type. The suggestion information may indicate whether to respond to the incoming call request. In some embodiments, the processing device 112 may transmit the suggestion information to the responder terminal device to facilitate the user of the responder terminal device to respond to the incoming call request or the requester terminal device according to the suggestion information. Merely by way of example, if the emotion type is determined as "anxiety", the processing device 112 may generate suggestion information "call back immediately" and transmit the suggestion information to the responder terminal device. In some embodiments, the responder terminal device may display the suggestion information on the display device of the responder terminal device. In some embodiments, the responder terminal device may broadcast the suggestion information via a voice player of the responder terminal device. In some embodiments, the processing device 112 may adjust a tone pattern of the smart dialogue communication based on the emotion type, thereby improving user experiences and user friendliness.

In some embodiments of the present disclosure, the processing device 112 may perform the smart dialogue communication with the requester terminal device to obtain the incoming voice messages. The processing device 112 may convert the incoming voice messages into the incoming text messages. The processing device 112 may determine sentiment features by performing sentiment analysis on the incoming text messages, and determine mood features by performing feature extraction on the incoming voice messages. The processing device 112 may determine the integrated features by integrating the sentiment features and the mood features. The processing device 112 may determine an emotion type by matching the integrated features in an emotion database and transmit the emotion type to the responder terminal device. Thus, the user of the responder terminal device can know the emotions of the requester, and can respond to the incoming call request based on the emotions of the requester. Therefore, user experiences can be improved. In the present disclosure, the processing device 112 or the responder terminal device may obtain or identify relatively more effective information during the smart dialogue communication (such as determining the emotion type of the requester), thereby making it convenient for the user of the responder terminal device to deal with incoming call affairs based on the obtained information (such as the emotion type of the requester), and improving the user experiences.

It should be noted that the above description of the process 1500 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, operations 1507 and 1509 may be performed simultaneously. In some embodiments, operation 1509 may be performed before or after operation 1507.

Figure 16:
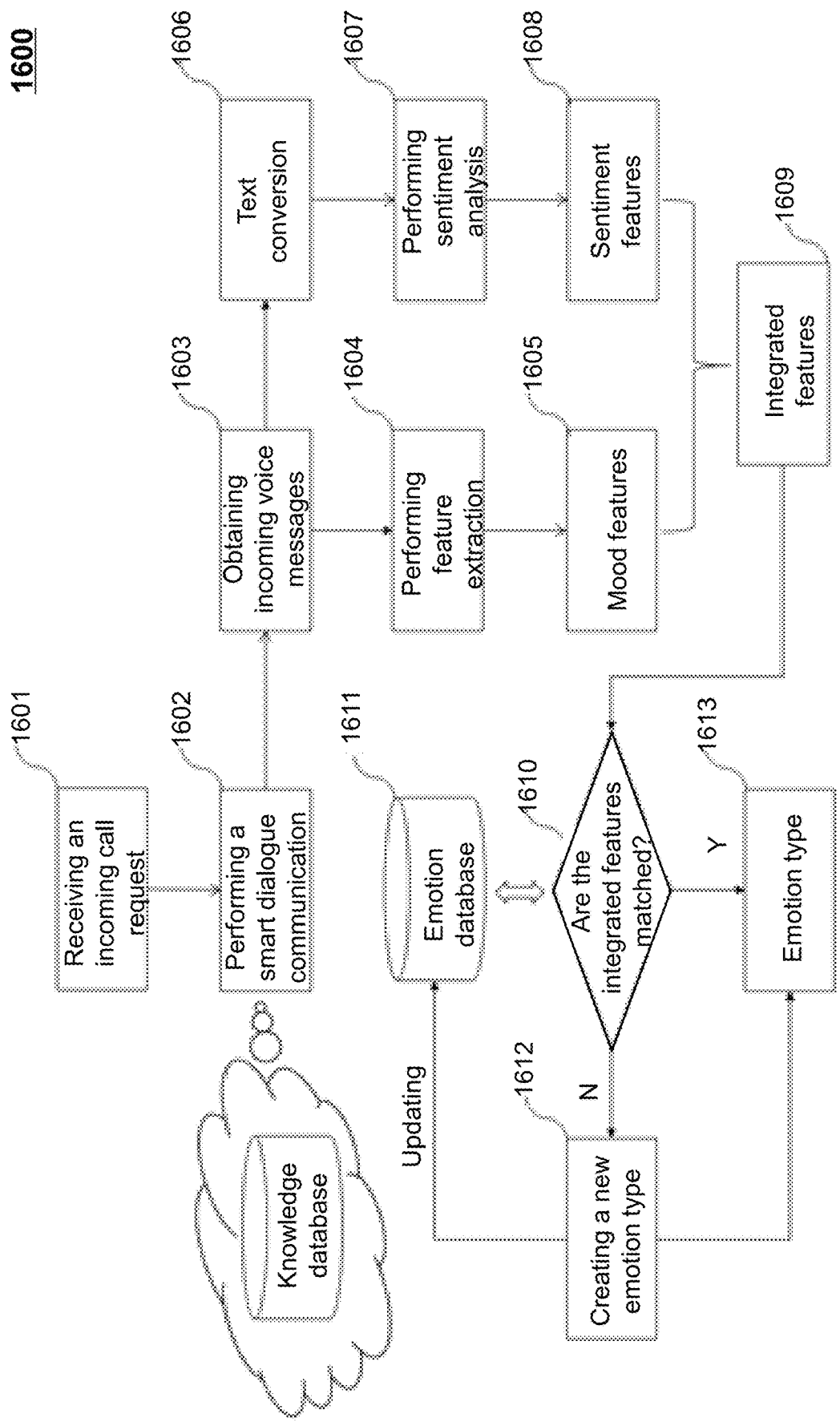
FIG. 16 is a schematic diagram illustrating an exemplary system for determining an emotion type of a requester according to some embodiments of the present disclosure.

FIG. 16 is a schematic diagram illustrating an exemplary system for determining an emotion type of a requester according to some embodiments of the present disclosure. It should be noted that the functions of the system are provided for illustration purposes, and are not intended to limit the scope of the present disclosure.

As shown in FIG. 16, in 1601, a responder terminal device (e.g., the responder terminal device 140) may receive an incoming call request from a requester terminal device (e.g., the requester terminal device 130). If the incoming call request satisfies the smart dialogue condition, the responder terminal device may transmit the incoming call request to a smart dialogue communication platform, or the responder terminal device may generate a dialogue request based on the incoming call request and transmit the dialogue request to the smart dialogue communication platform. In 1602, the smart dialogue communication platform may perform the smart dialogue communication with the requester terminal device. In some embodiments, the smart dialogue communication platform may communicate with the requester terminal device based on a knowledge database (e.g., a question knowledge database, an answer knowledge database, etc.).

In 1603, the smart dialogue communication platform may obtain incoming voice messages in the smart dialogue communication. In 1604, the smart dialogue communication platform may perform feature extraction on the incoming voice messages to determine mood features 1605 (e.g., a volume of the voice, whether the tone is hasty, etc.). In 1606, the smart dialogue communication platform may perform text conversion on the voice messages (e.g., convert the incoming voice messages into incoming text messages). In 1607, the smart dialogue communication platform may perform sentiment analysis on the incoming text messages to determine sentiment features 1608 (e.g., happy, neutral, sad, etc.). The smart dialogue communication platform may determine or generate integrated features 1609 by integrating the sentiment features and the mood features. In 1610, the smart dialogue communication platform may match the integrated features 1609 in an emotion database 1611, and determine whether the integrated features are matched with an emotion type (also referred as an emotion or character) in the emotion database. If the integrated features are matched with a candidate emotion type, the smart dialogue communication platform may determine the candidate emotion type as the emotion type 1613. If the integrated features are not matched with a candidate emotion type, in 1612, the smart dialogue communication platform may create a new emotion type and determine the new emotion type as the emotion type 1613. In some embodiments, the smart dialogue communication platform may update the emotion database by adding the new emotion type to the emotion database. In some embodiments, the smart dialogue communication platform may transmit the emotion type to the responder terminal device. The responder terminal device may display the emotion type on a display device of the responder terminal device. Merely by way of example, the display format may include "the incoming call number: \*\*\*; the emotion type: \*\*\*; the incoming call time: \*\*\*." As another example, the display format may include "the incoming call number: \*\*\*; the emotion of the requester: \*\*\*; the character of the requester: \*\*\*; the incoming call time: \*\*\*." As a further example, the display format may include "the incoming call number: \*\*\*; the name of the requester: \*\*\*; the emotion type: \*\*\*; the incoming call time: \*\*\*."

Figure 17:
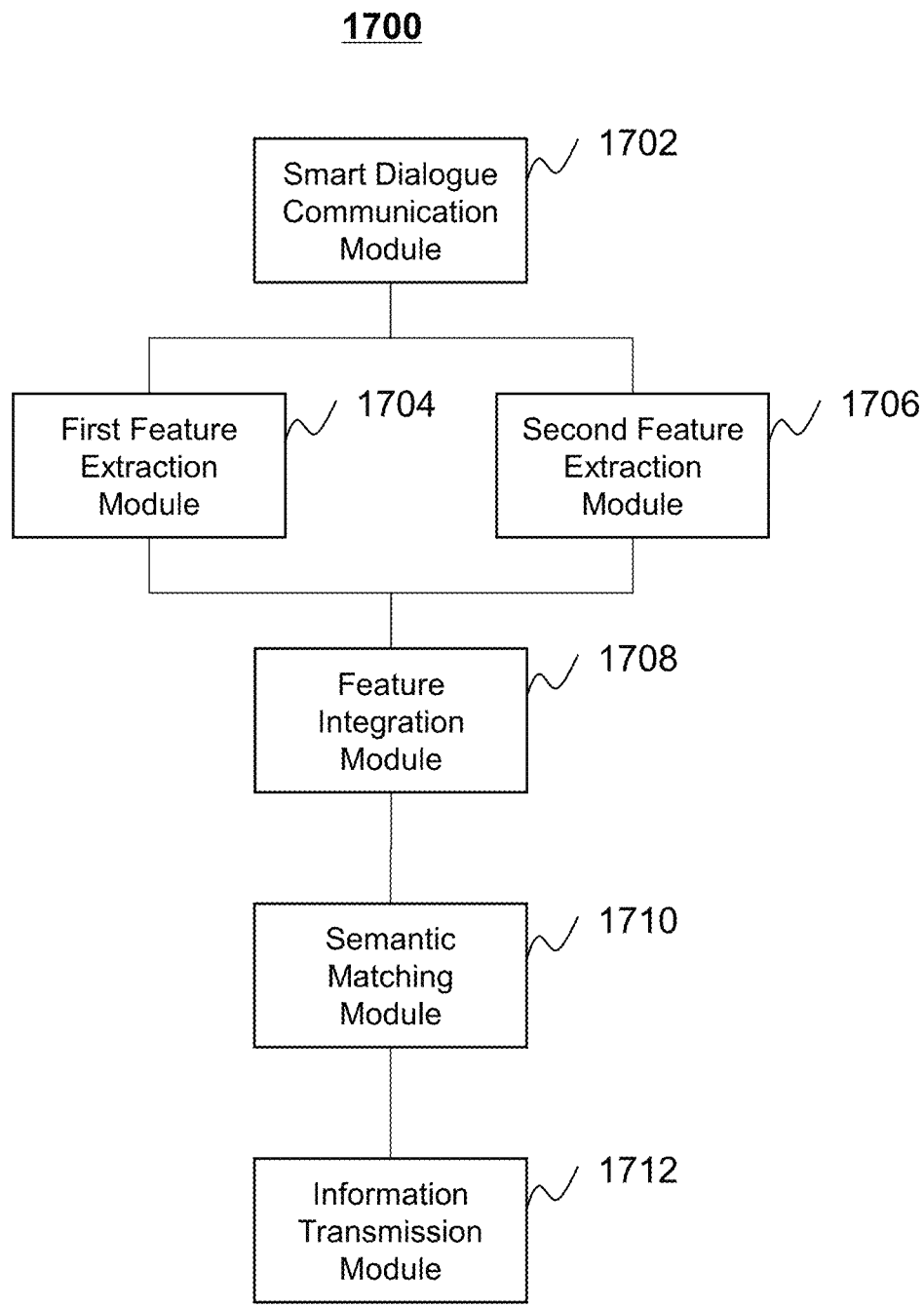
FIG. 17 is a block diagram illustrating an exemplary device for determining an emotion type of a requester according to some embodiments of the present disclosure.

FIG. 17 is a block diagram illustrating an exemplary device for determining an emotion type of a requester according to some embodiments of the present disclosure. The device (also referred to as an emotion recognition device) 1700 may be implemented on the computing device (e.g., the processor 220 of the computing device 200) as illustrated in FIG. 2, and/or the CPU 340 as illustrated in FIG. 3. As shown in FIG. 17, the device 1700 may include a smart dialogue communication module 1702, a first feature extraction module 1704, a second feature extraction module 1706, a feature integration module 1708, a semantic matching module 1710, and an information transmission module 1712. In some embodiments, the smart dialogue communication module 1702, the first feature extraction module 1704, the second feature extraction module 1706, the feature integration module 1708, the semantic matching module 1710, and the information transmission module 1712 may be implemented on a smart dialogue communication platform.

The smart dialogue communication module 1702 may be configured to perform a smart dialogue communication with a requester terminal device associated with a requester based on a dialogue request, and/or obtain incoming voice messages associated with the smart dialogue communication. The first feature extraction module 1704 may be configured to convert the incoming voice messages into incoming text messages, and/or determine sentiment features by performing sentiment analysis on the incoming text messages. The second feature extraction module 1706 may be configured to determine mood features by performing feature extraction on the incoming voice messages. The feature integration module 1708 may be configured to determine integrated features by integrating the sentiment features and the mood features. The semantic matching module 1710 may be configured to determine an emotion type by matching the integrated features in an emotion database. The information transmission module 1712 may be configured to transmit the emotion type to a responder terminal device associated with the incoming call request.

The device 1700 in the present disclosure may be used to perform one or more operations of process 1500 as described in FIG. 15. The implementation principle and technical effects of the device 1700 may be similar to the operations illustrated in the process 1500. In some embodiments, the device 1700 may be an exemplary embodiment of the processing device 112.

Figure 18A:
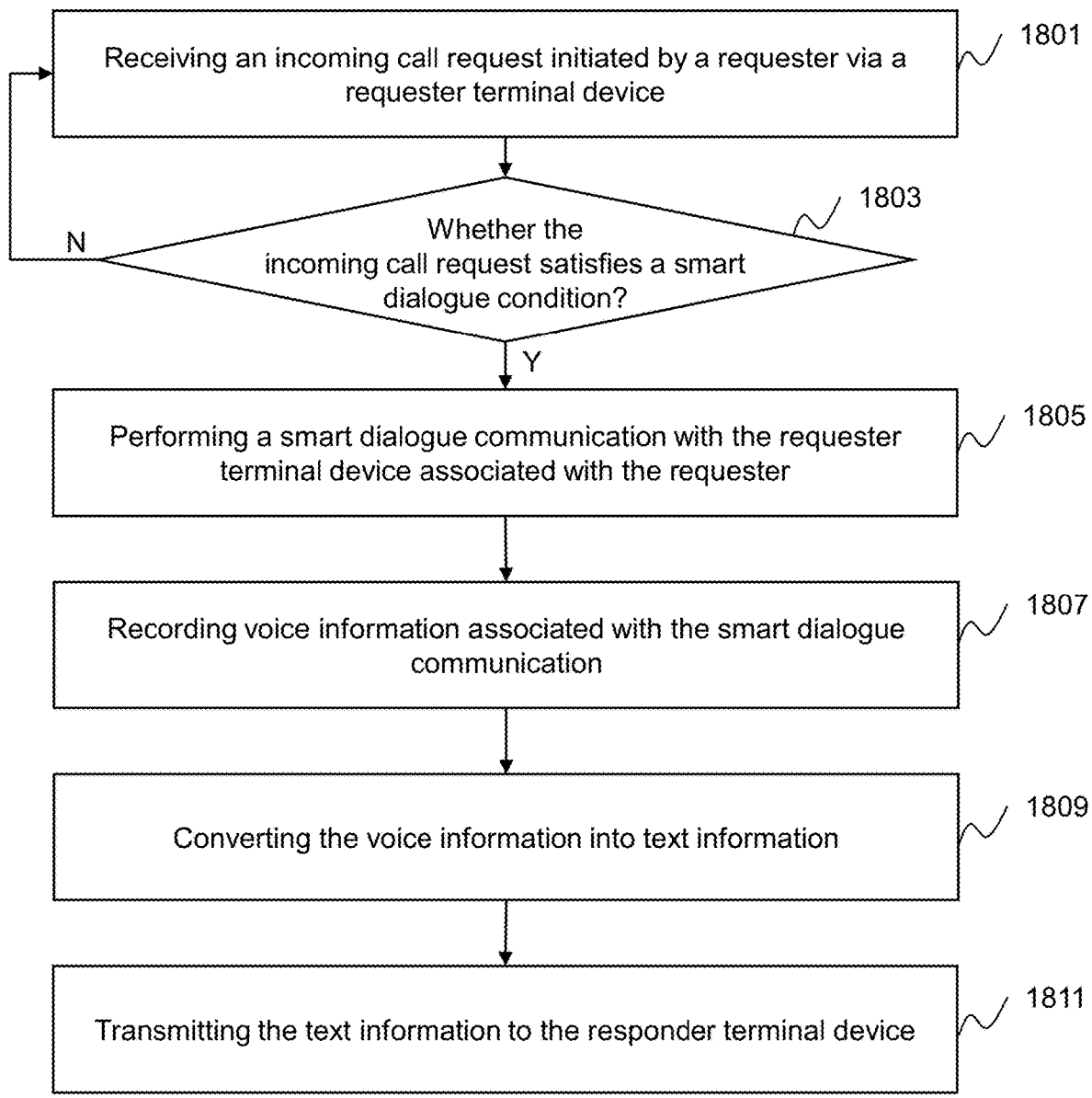
FIG. 18A is a flowchart illustrating an exemplary process for smart dialogue communication according to some embodiments of the present disclosure.

FIG. 18A is a flowchart illustrating an exemplary process for smart dialogue communication according to some embodiments of the present disclosure. At least a portion of process 1800 may be implemented on the computing device 200 as illustrated in FIG. 2 or the mobile device 300 as illustrated in FIG. 3. In some embodiments, one or more operations of the process 1800 may be implemented in the smart dialogue communication system 100 as illustrated in FIG. 1. In some embodiments, one or more operations in the process 1800 may be stored in the storage device 150 and/or the storage (e.g., the ROM 230, the RAM 240, etc.) as a form of instructions, and invoked and/or executed by the server 110 (e.g., the processing device 112 in the server 110 illustrated in FIG. 1, the processor 220 illustrated in FIG. 2, the CPU 340 illustrated in FIG. 3, or one or more modules in the processing device 112 illustrated in FIG. 4). In some embodiments, the instructions may be transmitted in a form of electronic current or electrical signals. The operations of the illustrated process presented below are intended to be illustrative. In some embodiments, the process 1800 may be accomplished with one or more additional operations not described, and/or without one or more of the operations discussed. Additionally, the order in which the operations of the process 1800 as illustrated in FIG. 18A and described below is not intended to be limiting.

In 1801, a responder terminal device (e.g., the responder terminal device 140) may receive an incoming call request initiated by a requester via a requester terminal device (e.g., the requester terminal device 130). The incoming call request may be transmitted to the requester terminal device via a network (e.g., the network 120).

In 1803, the responder terminal device (e.g., the responder terminal device 140) may determine whether the incoming call request satisfies a smart dialogue condition. If the incoming call request satisfies the smart dialogue condition, the responder terminal device may generate a dialogue request configured to request a smart dialogue communication based on the incoming call request. The responder terminal device may further transmit the dialogue request to a smart dialogue communication platform. In some embodiments, the smart dialogue condition may be associated with whether an incoming call number associated with the incoming call request exists in a contact list of the responder terminal device; whether the incoming call number exists in a blacklist of the responder terminal device; whether a requester time length of the incoming call request exceeds a time threshold (e.g., 1 minute, 2 minutes). In some embodiments, the time threshold may be a default value set by the smart dialogue communication system 100, or may be preset or adjusted by the user of the responder terminal device.

In some embodiments, the responder terminal device may determine an incoming call number based on the incoming call request, and/or determine whether the incoming call number exists in the contact list. In response to determining that the incoming call number exists in the contact list, the responder terminal device may output the incoming call number. For example, the responder terminal device may display the incoming call number to remind the user to respond to the incoming call request. In some embodiments, the user of the responder terminal device may respond to the incoming call request (e.g., answering the incoming call, refusing the incoming call). In some embodiments, before outputting (or displaying) the incoming call number, the responder terminal device may determine whether the incoming call number exists in a blacklist of the responder terminal device. In response to determining that the incoming call number exists in the blacklist, the responder terminal device may refuse the incoming call request, and/or generate or record incoming call information based on the incoming call request. The incoming call information may include information related to the requester and/or the incoming call. For example, the incoming call information may include: the incoming call number, the name of the requester, the incoming call time, the reason of being added into the blacklist, whether to be removed from the blacklist, or the like, or any combination thereof. The responder terminal device may output the incoming call information (e.g., display the incoming call information on a display device of the responder terminal device). In some embodiments, in response to determining that the incoming call number does not exist in the blacklist, the responder terminal device may directly output the incoming call number to remind the user to respond to the incoming call request. In some embodiments, after outputting (or displaying) the incoming call number, the responder terminal device may determine a request time length of the incoming call requester (in real-time). In response to determining that the request time length exceeds the time threshold, the responder terminal device may determine that the incoming call request satisfies the smart dialogue condition.

In some embodiments, in response to determining that the incoming call number does not exist in the contact list, the responder terminal device may determine that the incoming call request satisfies the smart dialogue condition. In some embodiments, before determining that the incoming call request satisfies the smart dialogue condition, the responder terminal device may determine whether the incoming call number exists in the blacklist. In response to determining that the incoming call number exists in the blacklist, the responder terminal device may refuse the incoming call request, and generate the incoming call information. The responder terminal device may output the incoming call information (e.g., display the incoming call information on a display device of the responder terminal device). In some embodiments, in response to determining that the incoming call number does not exist in the blacklist, the responder terminal device may determine that the incoming call request satisfies the smart dialogue condition.

In some embodiments, the responder terminal device may first determine whether the incoming call request exists in the blacklist. If the incoming call request exists in the blacklist, the responder terminal device may refuse the incoming call request, generate the incoming call information based on the incoming call request, and/or output the incoming call information. If the incoming call request does not exist in the blacklist, the responder terminal device may then determine whether the incoming call request satisfies the smart dialogue condition.

It should be noted that the above descriptions of the smart dialogue condition may be merely provided for illustration purposes, and be not intended to limit the scope of the present disclosure. In some embodiments, the smart dialogue condition may be set by the responder terminal device or the user of the responder terminal device. For example, the responder terminal device may set one or more specified incoming call numbers as the smart dialogue condition. When an incoming call request with a specified incoming call number is received by the responder terminal device, the responder terminal device may determine that the incoming call request satisfies the smart dialogue condition.

In 1805, the smart dialogue communication platform (e.g., the processing device 112) may perform a smart dialogue communication with the requester terminal device associated with the requester. More descriptions of the smart dialogue communication between the smart dialogue communication platform and the requester terminal device may be found elsewhere in the present disclosure (e.g., FIG. 6 and descriptions thereof). In some embodiments, during the smart dialogue communication, the smart dialogue communication platform may continuously obtain incoming voice message(s) from the requester terminal device and/or transmit reply voice message(s) to the requester terminal device.

In 1807, the smart dialogue communication platform (e.g., the processing device 112) may record voice information associated with the smart dialogue communication. In some embodiments, the voice information may refer to voice message(s) generated during the smart dialogue communication. For example, the voice information may include the incoming voice message(s) and/or the reply voice message(s). In some embodiments, the smart dialogue communication platform may store the voice information in a storage device (e.g., the storage device 150, the ROM 230, the RAM 240, the disk 270, or the storage 390, or an external storage device associated with the smart dialogue communication system 100).

In 1809, the smart dialogue communication platform (e.g., the processing device 112) may convert the voice information into the text information. In some embodiments, the processing device 112 may convert the voice information into text information based on a speech recognition technique (also referred to as a speech to text technique). More descriptions of the speech recognition technique may be found elsewhere in the present disclosure (e.g., process 603 of the process 600 and the descriptions thereof). The voice information may be input into the speech recognition model, and the speech recognition model may generate and/or output the text information.

In 1811, the smart dialogue communication platform (e.g., the processing device 112) may transmit the text information to the responder terminal device. The responder terminal device may receive the text information and/or display the text information on a display device. The user of the responder terminal device can timely check the text information.

In some embodiments of the present disclosure, the smart dialogue communication may be performed when the user is not convenient to answer the incoming call request (e.g., the user is a deaf mute). In the present disclosure, when an incoming call request is received, the responder terminal device may first determine whether the smart dialogue condition is satisfied. If the smart dialogue condition is satisfied, the smart dialogue communication may be performed, thereby saving the time of the user and improving the response efficiency. Besides, the voice information generated during the smart dialogue communication may be recorded, thereby effectively avoiding the omission of information (e.g., missing important incoming call request) and greatly improving the user experiences. In the present disclosure, a user of the responder terminal device may not need to preset call numbers for call transfer and no additional manual operation is required, thereby providing relatively high flexibility.

It should be noted that the above description regarding the process 1800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 1809 may be omitted. The smart dialogue communication platform may directly transmit the voice information to the responder terminal device. The responder terminal device may receive the voice information and broadcast the voice information via a voice player of the responder terminal device. As another example, the smart dialogue communication platform may record text information (e.g., a dialogue record including incoming text messages, question information, and/or answer information) generated based on the voice information associated with the smart dialogue communication, and/or transmit the generated text information to the responder terminal device. In some embodiments, operations 1807-1811 may be repeated during the smart dialogue communication, and a user of the responder terminal device can check the text information in real-time.

Figure 18B:
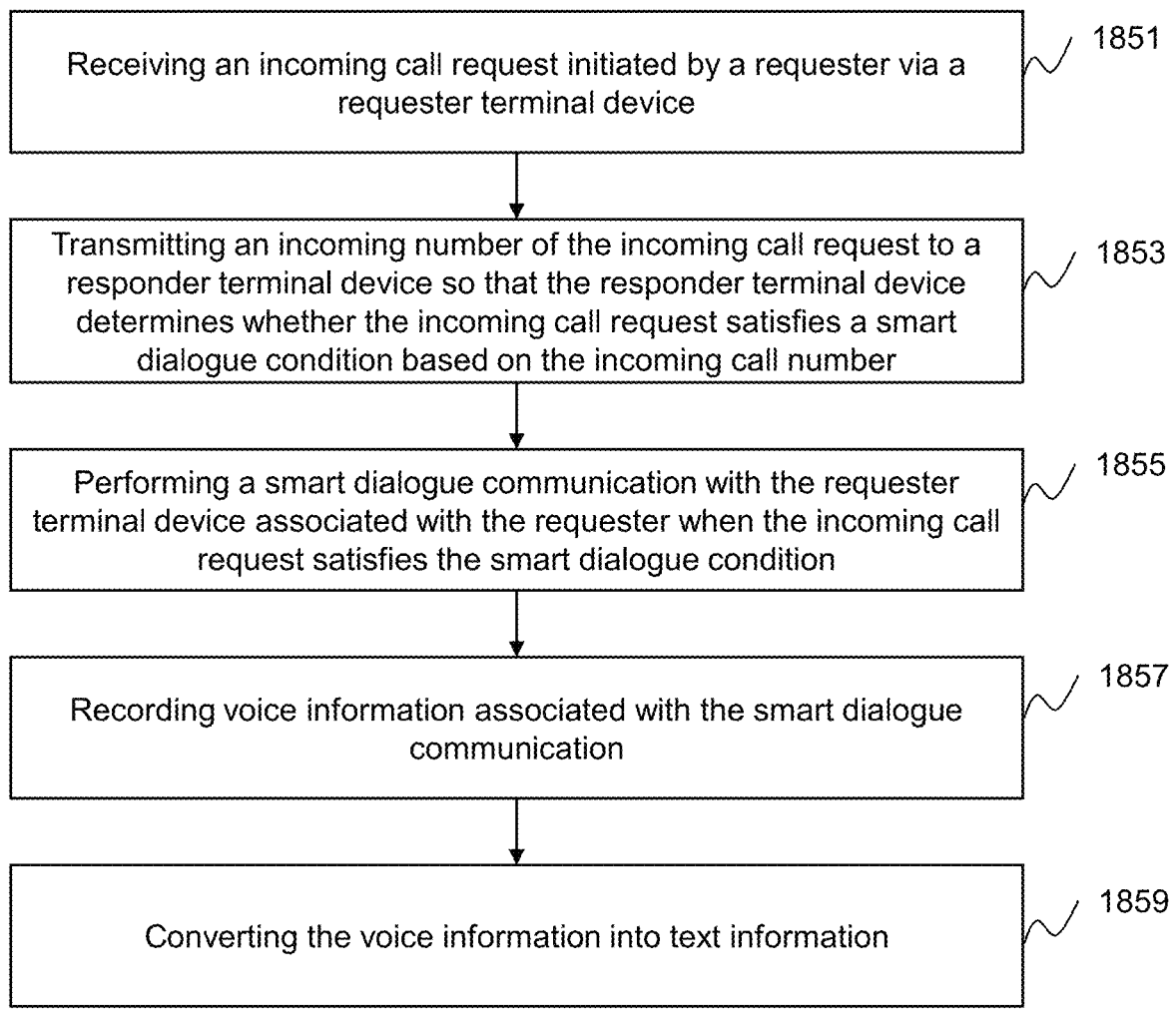
FIG. 18B is a flowchart illustrating an exemplary process for smart dialogue communication according to some embodiments of the present disclosure.

FIG. 18B is a flowchart illustrating an exemplary process for smart dialogue communication according to some embodiments of the present disclosure. At least a portion of process 1850 may be implemented on the computing device 200 as illustrated in FIG. 2 or the mobile device 300 as illustrated in FIG. 3. In some embodiments, one or more operations of the process 1850 may be implemented in the smart dialogue communication system 100 as illustrated in FIG. 1. In some embodiments, one or more operations in the process 1850 may be stored in the storage device 150 and/or the storage (e.g., the ROM 230, the RAM 240, etc.) as a form of instructions, and invoked and/or executed by the server 110 (e.g., the processing device 112 in the server 110 illustrated in FIG. 1, the processor 220 illustrated in FIG. 2, the CPU 340 illustrated in FIG. 3, or one or more modules in the processing device 112 illustrated in FIG. 4). In some embodiments, the instructions may be transmitted in a form of electronic current or electrical signals. The operations of the illustrated process presented below are intended to be illustrative. In some embodiments, the process 1850 may be accomplished with one or more additional operations not described, and/or without one or more of the operations discussed. Additionally, the order in which the operations of the process 1850 as illustrated in FIG. 18B and described below is not intended to be limiting.

In 1851, a smart dialogue communication platform (e.g., the processing device 112) may receive an incoming call request initiated by a requester via a requester terminal device. In some embodiments, the incoming call request may directly be transmitted to the smart dialogue communication other than a responder terminal device. In some embodiments, whether the incoming call request satisfies a smart dialogue condition may be determined by the smart dialogue communication platform. Alternatively, whether the incoming call request satisfies the smart dialogue condition may be determined by the responder terminal device. For example, in 1853, the smart dialogue communication platform (e.g., the processing device 112) may transmit an incoming number of the incoming call request to a responder terminal device so that the responder terminal device determines whether the incoming call request satisfies a smart dialogue condition based on the incoming call number. More descriptions of the smart dialogue condition may be found elsewhere in the present disclosure (e.g., FIG. 18 and the descriptions thereof). In some embodiments, if the incoming call request satisfies the smart dialogue condition, the responder terminal device may generate a dialogue request configured to request a smart dialogue communication based on the incoming call request. The responder terminal device may transmit the dialogue request to the smart dialogue communication platform.

In 1855, the smart dialogue communication platform (e.g., the processing device 112) may perform a smart dialogue communication with the requester terminal device associated with the requester when the incoming call request satisfies the smart dialogue condition. More descriptions of the smart dialogue communication may be found elsewhere in the present disclosure (e.g., FIG. 6 and the descriptions thereof).

In 1857, the smart dialogue communication platform (e.g., the processing device 112) may record voice information associated with the smart dialogue communication. In 1859, the smart dialogue communication platform (e.g., the processing device 112) may convert the voice information into text information. Operations 1857 and 1859 may be performed in a similar manner with operations 1807 and 1809, and the descriptions are not repeated here.

It should be noted that the above description of the process 1850 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. For example, operation 1853 may be omitted. The smart dialogue communication platform (e.g., the processing device 112) may determine whether the incoming call request satisfies the smart dialogue condition, and perform the smart dialogue communication when the incoming call request satisfies the smart dialogue condition. As another example, the process 1850 may include one or more additional operations (such as a transmission operation). For instance, in the transmission operation, the smart dialogue communication platform (e.g., the processing device 112) may transmit the text information to the responder terminal device.

Figure 19:
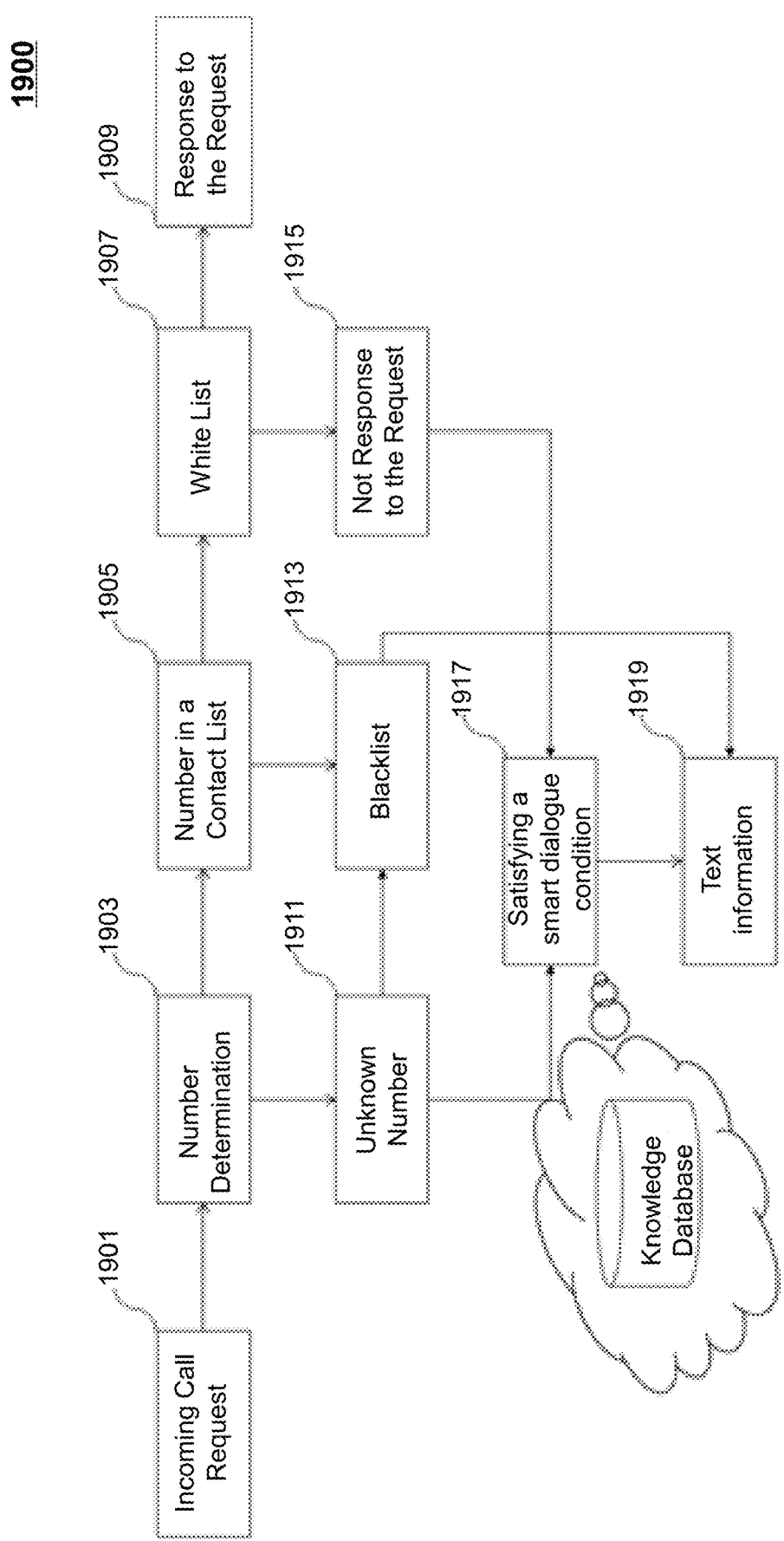
FIG. 19 is a schematic diagram illustrating an exemplary system for recording text information associated with a smart dialogue communication according to some embodiments of the present disclosure.

FIG. 19 is a schematic diagram illustrating an exemplary system for recording text information associated with a smart dialogue communication according to some embodiments of the present disclosure. It should be noted that the functions of the system are provided for illustration purposes, and are not intended to limit the scope of the present disclosure.

As shown in FIG. 19, a responder terminal device (e.g., the responder terminal device 140) may receive an incoming call request 1901 from a requester terminal device (e.g., the requester terminal device 130). In 1903, the responder terminal device may determine whether an incoming call number of the incoming call request exists in a contact list of the responder terminal device. If the incoming call number does not exist in the contact list, the responder terminal device may determine the incoming call number as an unknown number 1911 (or strange number). In some embodiments, the responder terminal device may determine whether the incoming call number exists in a blacklist of the responder terminal device. If the incoming call number exists in the blacklist 1913, the responder terminal device may refuse the incoming call request, generate incoming call information based on the incoming call request, and/or output the incoming call information. The incoming call information may include: the incoming call number, the name of the requester, the incoming call time, the reason of being added into the blacklist, whether to be removed from the blacklist, or the like, or any combination thereof. In some embodiments, the incoming call information may be displayed on a display device of the responder terminal device. If the incoming call number does not exist in the blacklist 1913, in 1917, the responder terminal device may determine that the incoming call request satisfies the smart dialogue condition.

Alternatively, if the incoming call number exists in the contact list 1905, the responder terminal device may determine whether the incoming call number exists in the blacklist 1913. If the incoming call number exists in the blacklist 1913, the responder terminal device may refuse the incoming call request, generate incoming call information based on the incoming call request, and/or output the incoming call information. In some embodiments, the incoming call information may be displayed on a display device of the responder terminal device. If the incoming call number exists in a white list 1907 of the responder terminal device, the responder terminal device may output (e.g., display) the incoming call number. In 1909, a user of the responder terminal device may respond to the incoming call request (e.g., answering the call, refusing the call, etc.). In some embodiments, in 1915, if the user does not respond to the incoming call request (e.g., the request time length exceeds a time threshold), the responder terminal device may determine that the incoming call request satisfies the smart dialogue condition in 1917.

If the incoming call request satisfies the smart dialogue condition, the response terminal device may transmit the incoming call request to a smart dialogue communication platform, or the response terminal device may generate a dialogue request based on the incoming call request and transmit the dialogue request to the smart dialogue communication platform. The smart dialogue communication platform may perform the smart dialogue communication with the requester terminal device based on a knowledge database (e.g., a question knowledge database and/or an answer knowledge database). More descriptions of the smart dialogue communication may be found elsewhere in the present disclosure (e.g., FIG. 6 and the descriptions thereof). During the smart dialogue communication, text information 1919 may be generated and/or recorded by the smart dialogue communication platform, and/or transmitted to the responder terminal device. The responder terminal device may display the text information 1919 on a display device. In some embodiments, the responder terminal device may remind the user to check the text information. The user can check the text information in real-time or after a time period.

Figure 20A:
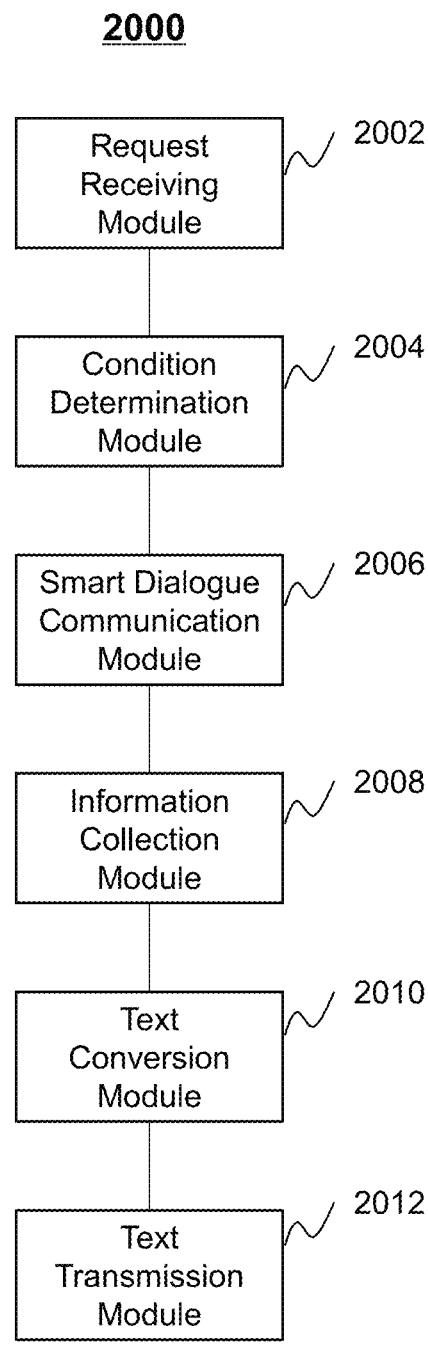
FIG. 20A is a schematic diagram illustrating an exemplary device for recording text information associated with a smart dialogue communication according to some embodiments of the present disclosure.

FIG. 20A is a schematic diagram illustrating an exemplary device for recording text information associated with a smart dialogue communication according to some embodiments of the present disclosure. The device (also referred to as a text information record device) 2000 may be implemented on the computing device (e.g., the processor 220 of the computing device 200) as illustrated in FIG. 2, and/or the CPU 340 as illustrated in FIG. 3. As shown in FIG. 20A, the device 2000 may include a request receiving module 2002, a condition determination module 2004, a smart dialogue communication module 2006, an information collection module 2008, a text conversion module 2010, and a text transmission module 2012. In some embodiments, the request receiving module 2002 and/or the condition determination module 2004 may be implemented on a responder terminal device (e.g., the responder terminal device 140). In some embodiments, the smart dialogue communication module 2006, the information collection module 2008, the text conversion module 2010, and/or the text transmission module 2012 may be implemented on a smart dialogue communication platform.

The request receiving module 2002 may be configured to receive an incoming call request initiated by a requester via a requester terminal device (e.g., the requester terminal device 130). The condition determination module 2004 may be configured to determine whether the incoming call request satisfies a smart dialogue condition. The smart dialogue communication module 2006 may be configured to perform a smart dialogue communication with the requester terminal device associated with the requester. The information collection module 2008 may be configured to record voice information associated with the smart dialogue communication. The text conversion module 2010 may be configured to convert the voice information into text information. The text transmission module 2012 may be configured to transmit the text information to the responder terminal device.

The device 2000 in the present disclosure may be used to perform one or more operations of process 1800 as described in FIG. 18A. The implementation principle and technical effects of the device 2000 may be similar to the operations illustrated in the process 1800. In some embodiments, the device 2000 may be an exemplary embodiment of the processing device 112.

Figure 20B:
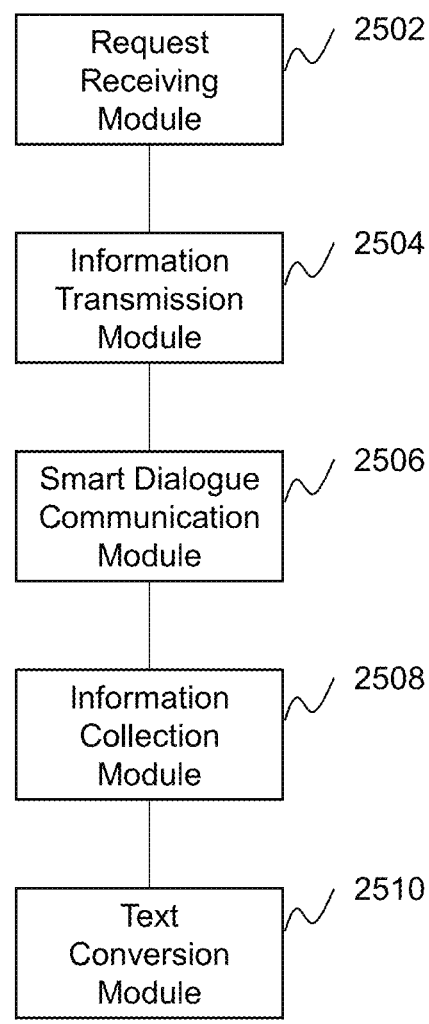
FIG. 20B is a schematic diagram illustrating an exemplary device for recording text information associated with a smart dialogue communication according to some embodiments of the present disclosure.

FIG. 20B is a schematic diagram illustrating an exemplary device for recording text information associated with a smart dialogue communication according to some embodiments of the present disclosure. The device (also referred to as a text information record device) 2500 may be implemented on the computing device (e.g., the processor 220 of the computing device 200) as illustrated in FIG. 2, and/or the CPU 340 as illustrated in FIG. 3. As shown in FIG. 20B, the device 2500 may include a request receiving module 2502, an information transmission module 2504, a smart dialogue communication module 2506, an information collection module 2508, and a text conversion module 2510. In some embodiments, the request receiving module 2502, the information transmission module 2504, the smart dialogue communication module 2506, the information collection module 2508, and the text conversion module 2510 may be implemented on a smart dialogue communication platform.

The request receiving module 2502 may be configured to receive an incoming call request initiated by a requester via a requester terminal device (e.g., the requester terminal device 130). The information transmission module 2504 may be configured to transmit an incoming number of the incoming call request to a responder terminal device so that the responder terminal device determines whether the incoming call request satisfies a smart dialogue condition based on the incoming call number. The smart dialogue communication module 2506 may be configured to perform a smart dialogue communication with the requester terminal device associated with the requester when the incoming call request satisfies the smart dialogue condition. The information collection module 2508 may be configured to record voice information associated with the smart dialogue communication. The text conversion module 2510 may be configured to convert the voice information into text information.

The device 2500 in the present disclosure may be used to perform one or more operations of process 1850 as described in FIG. 18B. The implementation principle and technical effects of the device 2500 may be similar to the operations illustrated in the process 1850. In some embodiments, the device 2000 may be an exemplary embodiment of the processing device 112.

Figure 21:
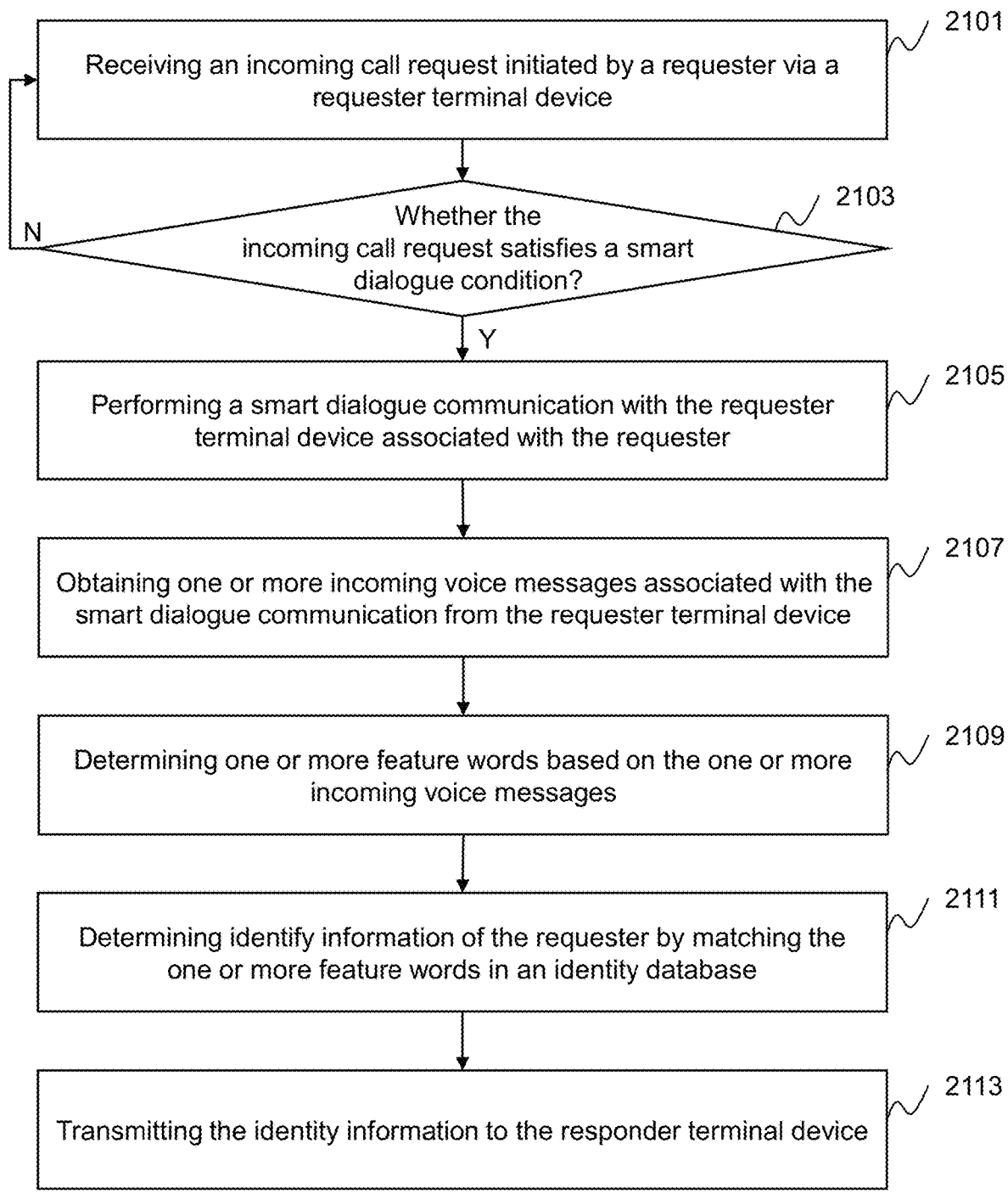
FIG. 21 is a flowchart illustrating an exemplary process for smart dialogue communication according to some embodiments of the present disclosure.

FIG. 21 is a flowchart illustrating an exemplary process for smart dialogue communication according to some embodiments of the present disclosure. At least a portion of process 2100 may be implemented on the computing device 200 as illustrated in FIG. 2 or the mobile device 300 as illustrated in FIG. 3. In some embodiments, one or more operations of the process 2100 may be implemented in the smart dialogue communication system 100 as illustrated in FIG. 1. In some embodiments, one or more operations in the process 2100 may be stored in the storage device 150 and/or the storage (e.g., the ROM 230, the RAM 240, etc.) as a form of instructions, and invoked and/or executed by the server 110 (e.g., the processing device 112 in the server 110 illustrated in FIG. 1, the processor 220 illustrated in FIG. 2, the CPU 340 illustrated in FIG. 3, or one or more modules in the processing device 112 illustrated in FIG. 4). In some embodiments, the instructions may be transmitted in a form of electronic current or electrical signals. The operations of the illustrated process presented below are intended to be illustrative. In some embodiments, the process 2100 may be accomplished with one or more additional operations not described, and/or without one or more of the operations discussed. Additionally, the order in which the operations of the process 2100 as illustrated in FIG. 21 and described below is not intended to be limiting.

In 2010, a responder terminal device (e.g., the responder terminal device 140) may receive an incoming call request initiated by a requester via a requester terminal device (e.g., the requester terminal device 130). The incoming call request may be transmitted to the requester terminal device via a network (e.g., the network 120).

In 2103, the responder terminal device (e.g., the responder terminal device 140) may determine whether the incoming call request satisfies a smart dialogue condition. If the incoming call request satisfies the smart dialogue condition, the responder terminal device may generate a dialogue request configured to request a smart dialogue communication based on the incoming call request. The responder terminal device may further transmit the dialogue request to a smart dialogue communication platform.

In some embodiments, the responder terminal device may determine an incoming call number based on the incoming call request, and/or determine whether the incoming call number exists in a contact list of the responder terminal device. In response to determining that the incoming call number exists in the contact list, the responder terminal device may determine identity information of the requester based on a preset identity recorded in the contact list (e.g., a name of the requester). In some embodiments, the responder terminal device may display the identity information of the requester via a display device (e.g., output the identity information for display). Alternatively, in response to determining that the incoming call number does not exist in the contact list, the responder terminal device may determine that the incoming call request satisfies the smart dialogue condition.

In some embodiments, before determining whether the incoming call request satisfies the smart dialogue condition, the responder terminal device may determine whether the incoming call number is labelled. In response to determining that the incoming call number is labelled, the responder terminal device may obtain the identity information of the requester based on a labelled identity associated with the incoming call number (e.g., a profession of the requester such as a seller, a customer service agent, etc.). The responder terminal device may display the identity information of the requester via a display device (e.g., output the identity information for display). Alternatively, in response to determining that the incoming call number is not labelled, the responder terminal device may determine whether the incoming call request satisfies the smart dialogue condition. More descriptions of the determination of whether the incoming call request satisfies the smart dialogue condition may be found elsewhere in the present disclosure (e.g., operation 1803 of process 1800 and the relevant descriptions thereof).

In 2105, a smart dialogue communication platform (e.g., the processing device 112) may perform a smart dialogue communication with the requester terminal device associated with the requester. More descriptions of the smart dialogue communication between the smart dialogue communication platform and the requester terminal device may be found elsewhere in the present disclosure (e.g., FIG. 6 and descriptions thereof). In some embodiments, during the smart dialogue communication, the smart dialogue communication platform may continuously obtain incoming voice message(s) from the requester terminal device and/or transmit reply voice message(s) to the requester terminal device.

In 2107, if the identity information of the requester is not identified before the smart dialogue communication, the smart dialogue communication platform (e.g., the processing device 112) may obtain one or more incoming voice messages associated with the smart dialogue communication from the requester terminal device. The incoming voice messages may include voice messages of the requester. The smart dialogue communication platform may store the incoming voice messages in a storage device (e.g., the storage device 150, the ROM 230, the RAM 240, the disk 270, or the storage 390, or an external storage device associated with the smart dialogue communication system 100). Alternatively or additionally, the smart dialogue communication platform may store the incoming voice message(s) and the reply voice message(s) in the storage device.

In 2109, the smart dialogue communication platform (e.g., the processing device 112) may determine one or more feature words based on the one or more incoming voice messages. In some embodiments, the smart dialogue communication platform may convert the incoming voice message(s) into incoming text message(s). The smart dialogue communication platform may determine the feature word(s) by performing feature extraction on the incoming text message(s), e.g., using a language model. The determination of the feature words may be similar to the determination of the text features of the incoming text message(s) as illustrated in operation 605 of process 600, and the descriptions are not repeated. More descriptions of the determination of the feature word(s) may be found elsewhere in the present disclosure (e.g., FIG. 6 and descriptions thereof). In some embodiments, the feature words may include one or more words that can indicate or imply the identity information of the requester, such as real estate sells, stocks, banking, game promotion, or the like, or any combination thereof.

In 2111, the smart dialogue communication platform (e.g., the processing device 112) may determine identity information of the requester by matching the one or more feature words in an identity database. In some embodiments, the identity database may store a plurality of identity types. In some embodiments, the identity database may be stored in a storage device associated with the smart dialogue communication platform (e.g., the storage device 150, the ROM 230, the RAM 240, the disk 270, the storage 390, etc.). Alternatively, the identity database may be stored in an external storage device, and the processing device 112 may retrieve the identity database via a network (e.g., the network 120). The identity database may be preset by the smart dialogue communication system 100, or self-defined by a user of the responder terminal device 140. In some embodiments, the smart dialogue communication platform may match the feature words in the identity database using a fourth semantic matching model (e.g., a deep structured semantic model (DSSM), a long short term memory deep structured semantic model (LSTM-DSSM), an enhanced LSTM for natural language inference (ESIM), an attention-based convolutional neural network for modeling sentence pairs (ABCNN), etc.). For example, the smart dialogue communication platform may input the feature words and the identity types within the identity database into the fourth semantic matching model. The fourth semantic matching model may generate and/or output a matching degree between the feature words and a (e.g., each) identity type. In some embodiments, the smart dialogue communication platform may determine the identity information based on the matching degree(s). For example, the smart dialogue communication platform may determine the identity type having the highest matching degree as the identity information.

In some embodiments, the identity information cannot be obtained by matching the one or more feature words in the identity database (e.g., no identity type in the identity database matches with the feature words). In such cases, the smart dialogue communication platform may create a new identity based on the feature words and determine the identity information based on the new identity. In some embodiments, to create the new identity, the smart dialogue communication platform may determine an incoming call number based on the incoming call request; obtain a number structure of the incoming call number; determine attribute information of the incoming call number based on the number structure; and/or create the new identity based on the attribute information and the one or more feature words.

In some embodiments, the incoming call number may have a specific number structure. For example, a mobile incoming call number may apply a mobile directory number (MDN) structure with a E.164 encoding form. The MDN structure may include three parts: CC+MAC+SN (H0H1H2H3ABCD), in which CC refers to the country code (e.g., 86 representing China); MAC refers to the mobile access code (e.g., 153/189 representing China Telecom); SN refers to the subscriber number; H0H1H2H3 refers to the identifier of home location register (HLR) that is associated with location; and ABCD refers to a user freedom number that is allocated by the HLR. Thus, the attribute information (e.g., location information) of the incoming call number may be determined based on the number structure. Further, the new identity may be created based on the attribute information and/or the feature words. In some embodiments, the smart dialogue communication platform may update the identity database by adding information relating to the new identity into the identity database.

In 2113, the smart dialogue communication platform (e.g., the processing device 112) may transmit the identity information to the responder terminal device. In some embodiments, the responder terminal device may display the identity information on a display device of the responder terminal device. In some embodiments, the identity information may include: the incoming call number, the identity of the requester, the incoming call time, or the like, or any combination thereof. In some embodiments, the user can decide whether to intervene in the smart dialogue communication. For example, if the identity information indicates that the incoming call request is a harassing call request, the user may send an instruction to the smart dialogue communication platform to end (or terminate) the smart dialogue communication. As another example, if the identity information indicates that the incoming call request is an important call request, the user may directly intervene in the communication with the requester via the responder terminal device. As a further example, if the identity information indicates that the incoming call request is not a harassing call request and an important call request, the user may not intervene in the smart dialogue communication.

In some embodiments of the present disclosure, the smart dialogue communication may be performed when the user is not convenient to answer the incoming call request. In the present disclosure, when an incoming call request is received, the responder terminal device may first determine whether the smart dialogue condition is satisfied. If the smart dialogue condition is satisfied, the smart dialogue communication may be performed, thereby saving the time of the user and improving the response efficiency. Besides, the identity information of the requester is identified, and the user can decide whether to intervene in the smart dialogue communication, thereby reducing or filtrating harassing calls while not missing important calls, and improving user experiences.

It should be noted that the above description regarding the process 2100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the identify information may be converted into voice information, and the responder terminal device may broadcast the identity information (e.g., voice information) via a voice player of the responder terminal device.

Figure 22:
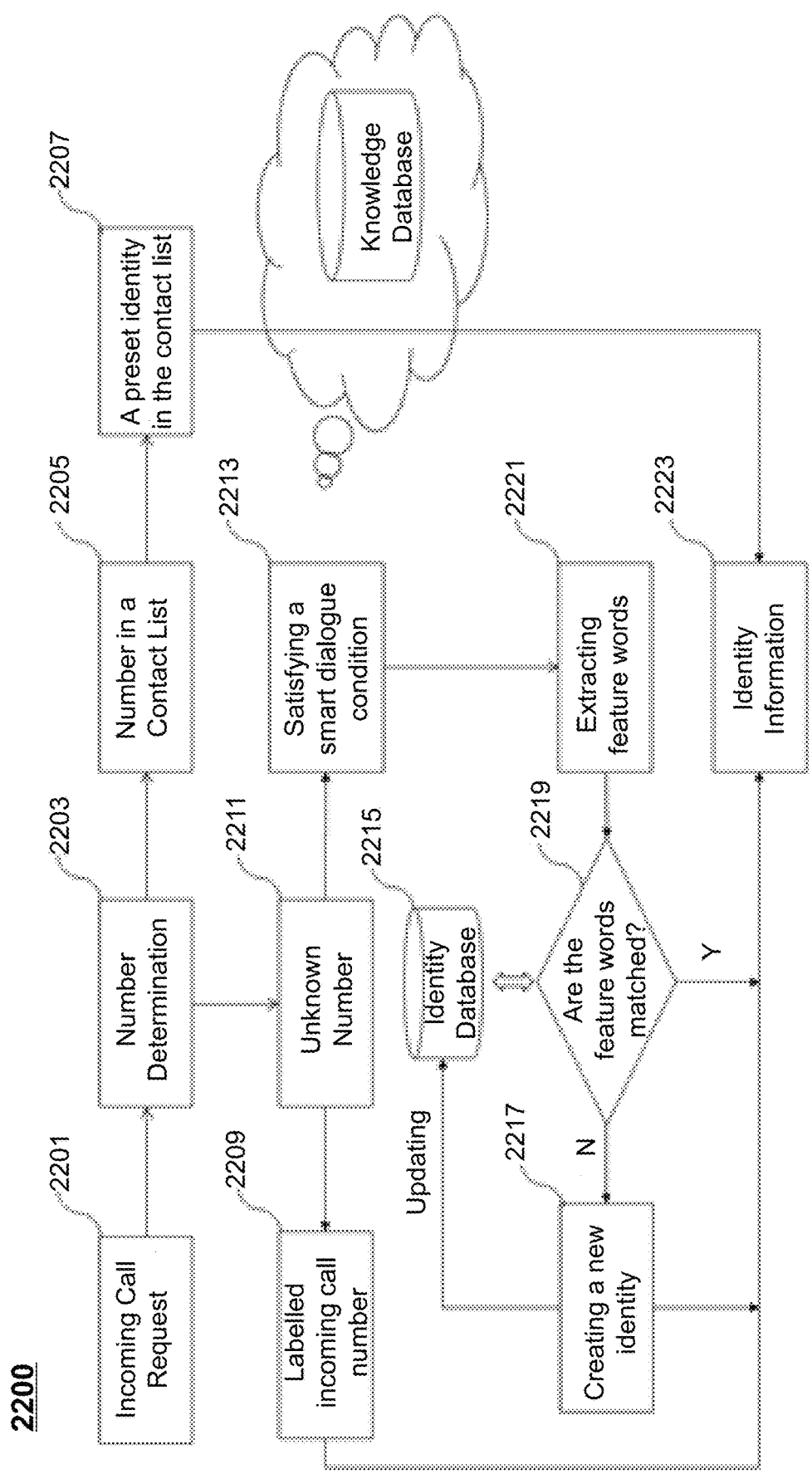
FIG. 22 is a schematic diagram illustrating an exemplary system for identifying identity information of a requester according to some embodiments of the present disclosure.

FIG. 22 is a schematic diagram illustrating an exemplary system for identifying identity information of a requester according to some embodiments of the present disclosure. It should be noted that the functions of the system are provided for illustration purposes, and are not intended to limit the scope of the present disclosure.

As shown in FIG. 22, a responder terminal device (e.g., the responder terminal device 140) may receive an incoming call request 2201 from a requester terminal device (e.g., the requester terminal device 130). In 2203, the responder terminal device may determine whether an incoming call number of the incoming call request exists in a contact list of the responder terminal device. If the incoming call number exist in the contact list 2205, the responder terminal device may identify a preset identity 2207 of the requester in the contact list, and/or determine the identity information 2223 based on the preset identity 2207 in the contact list. The responder terminal device may display the identity information 2223 via a display device (e.g., output the identity information for display). In some embodiments, the identity information 2223 may include information relating to a profession (or occupation) of the requester, a field of work of the requester, a company that the requester belongs, a position (or title) of the requester, contact information of the requester, or the like. Alternatively, if the incoming call number does not exist in the contact list, the responder terminal device may determine the incoming call number as an unknown number 2211 (or strange number).

The responder terminal device may further determine whether the incoming call number is labelled. If the incoming call number is a labelled incoming call number 2209 (e.g., including a labelled identity), the responder terminal device may determine the identity information 2223 based on the labelled incoming call number 2209 (e.g., the labelled identity). The responder terminal device may display the identity information 2223 via the display device (e.g., output the identity information for display). Alternatively, if the incoming call number is not labelled, in 2213, the responder terminal device may determine that the incoming call request satisfies the smart dialogue condition.

If the incoming call request satisfies the smart dialogue condition, the response terminal device may transmit the incoming call request to a smart dialogue communication platform. The smart dialogue communication platform may perform the smart dialogue communication with the requester terminal device based on a knowledge database (e.g., a question knowledge database and/or an answer knowledge database). More descriptions of the smart dialogue communication may be found elsewhere in the present disclosure (e.g., FIG. 6 and the descriptions thereof). During the smart dialogue communication, in 2221, the smart dialogue communication platform may obtain one or more incoming voice messages, and/or extract one or more feature words based on the one or more incoming voice messages. In 2219, the smart dialogue communication platform may match the one or more feature words in the identity database 2215. If the feature words are matched, the smart dialogue communication platform may determine the identity information 2223, and/or transmit the identity information 2223 to the responder terminal device. The responder terminal device may display the identity information 2223 via the display device (e.g., output the identity information). Alternatively, if the feature words are not matched in the identity database, in 2217, the smart dialogue communication platform may create a new identity based on the one or more feature words and/or determine the identity information 2223 based on the new identity. In some embodiments, the smart dialogue communication platform may further update the identity database by adding information relating to the new identity into the identity database 2215.

Figure 23:
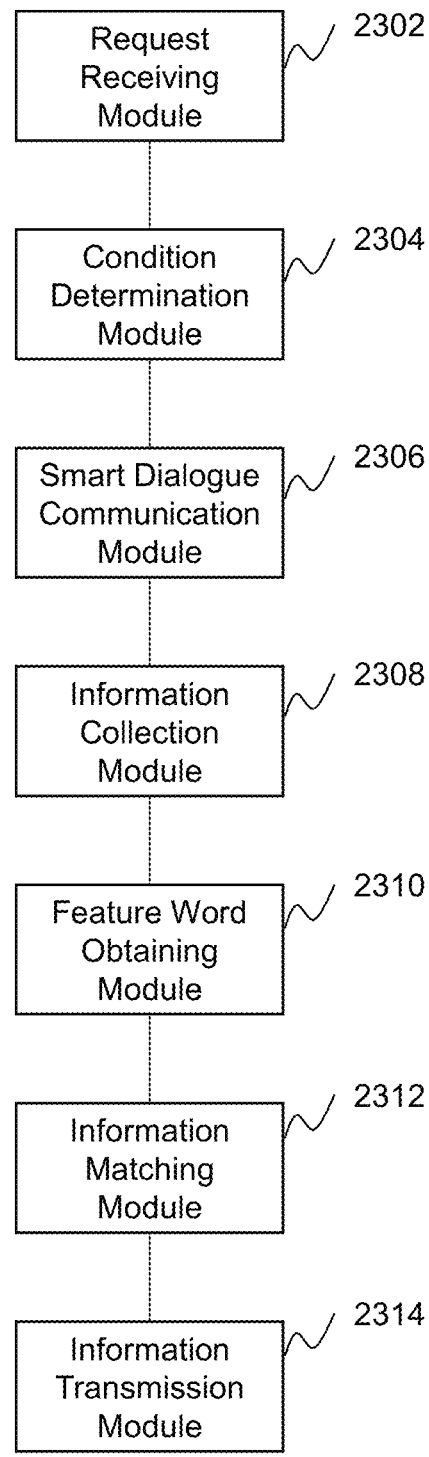
FIG. 23 is a schematic diagram illustrating an exemplary device for identifying identity information of a requester according to some embodiments of the present disclosure.

FIG. 23 is a schematic diagram illustrating an exemplary device for identifying identity information of a requester according to some embodiments of the present disclosure. The device (also referred to as an identity identification device) 2300 may be implemented on the computing device (e.g., the processor 220 of the computing device 200) as illustrated in FIG. 2, and/or the CPU 340 as illustrated in FIG. 3. As shown in FIG. 23, the device 2300 may include a request receiving module 2302, a condition determination module 2304, a smart dialogue communication module 2306, an information collection module 2308, a feature word obtaining module 2310, an information matching module 2312, an information transmission module 2314. In some embodiments, the request receiving module 2002 and/or the condition determination module 2004 may be implemented on a responder terminal device (e.g., the responder terminal device 140). In some embodiments, the smart dialogue communication module 2306, the information collection module 2308, the feature word obtaining module 2310, the information matching module 2312, and/or the information transmission module 2314 may be implemented on a smart dialogue communication platform.

The request receiving module 2302 may be configured to receive an incoming call request initiated by a requester via a requester terminal device (e.g., the requester terminal device 130). The condition determination module 2304 may be configured to determine whether the incoming call request satisfies a smart dialogue condition. The smart dialogue communication module 2306 may be configured to perform a smart dialogue communication with the requester terminal device associated with the requester. The information collection module 2308 may be configured to obtain one or more incoming voice messages associated with the smart dialogue communication. The feature word obtaining module 2310 may be configured to determine one or more feature words based on the one or more incoming voice messages. The information matching module 2312 may be configured to determine the identity information by matching the one or more feature words in an identity database. The information transmission module 2314 may be configured to transmit the identity information to the responder terminal device.

The device 2300 in the present disclosure may be used to perform one or more operations of process 2100 as described in FIG. 21. The implementation principle and technical effects of the device 2300 may be similar to the operations illustrated in the process 2100. In some embodiments, the device 2300 may be an exemplary embodiment of the processing device 112.

Figure 24:
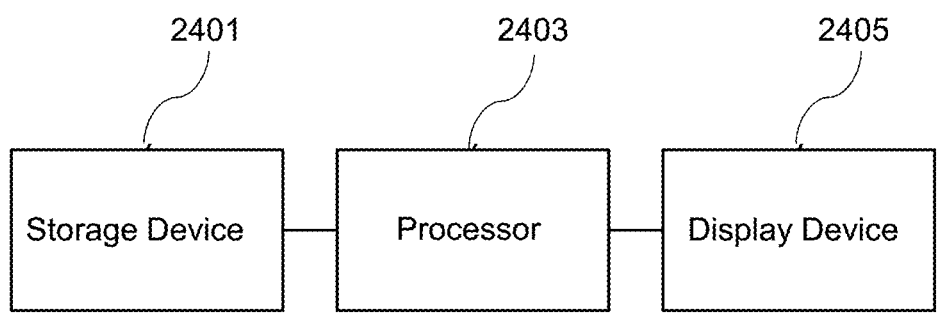
FIG. 24 is a schematic diagram illustrating an exemplary device according to some embodiment of the present disclosure.

FIG. 24 is a schematic diagram illustrating an exemplary device according to some embodiment of the present disclosure. In some embodiments, the device 2400 may include a storage device 2401 and a processor 2403. The storage device 2401 may be configured to store computer programs. The processor 2403 may be configured to execute the computer programs to implement one or more operations of the processes 500-600, 800-900, 1200, 1500, 1800, and 2100 described above. The device 2400 may further include a display device 2405. The display device 2405 may be configured to display text information (such as the schedule information, the emotion type, the identity information, the dialogue record, or the like).

The present disclosure also provides a computer-readable storage medium. The computer-readable storage medium may store computer programs. The computer programs may be executed by a processor to perform the operations of the processes 500-600, 800-900, 1200, 1500, 1800, and 2100 described above. In some embodiments, the computer-readable storage medium may include a U disk, a mobile hard disk, a read only memory (ROM), a random access memory (RAM), a magnetic disk, an optical disk, or any other medium that can store program codes.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for smart dialogue communication, comprising:
   at least one storage device including a set of instructions; and
   at least one processor in communication with the at least one storage device, wherein when executing the set of instructions, the at least one processor is configured to cause the system to perform operations including:
      performing a smart dialogue communication with a requester terminal device associated with a requester;
      recording voice information associated with the smart dialogue communication;
      converting the voice information into text information;
      determining event keywords by performing semantic analysis on the text information;
      generating schedule information based on the event keywords;
      determining an emergency level of the schedule information according to a level classification rule;
      determining a reminder time of the schedule information based on the emergency level; and
      causing a responder terminal device to generate a reminder at the reminder time.

2. The system of claim 1, wherein the smart dialogue condition is associated with at least one of:
   whether an incoming call number associated with an incoming call request relating to the smart dialogue communication exists in a contact list of the responder terminal device;
   whether the incoming call number exists in a blacklist of the responder terminal device; or
   whether a request time length of the incoming call request exceeds a time threshold.

3. The system of claim 1, wherein the at least one processor is further configured to cause the system to perform operations including:
   obtaining, from the requester terminal device, one or more first incoming voice messages associated with the smart dialogue communication;
   determining one or more feature words based on the one or more first incoming voice messages; and
   determining identity information by matching the one or more feature words in an identity database.

4. The system of claim 1, wherein performing the smart dialogue communication includes:
   obtaining, from the requester terminal device, one or more second incoming voice messages;
   converting the one or more second incoming voice messages into one or more incoming text messages;
   determining text features by performing feature extraction on at least one of the one or more incoming text messages;
   determining question information associated with the text features by matching the text features in a question knowledge database;
   obtaining answer information corresponding to the question information by matching the question information in an answer knowledge database;
   converting the answer information into at least one reply voice message; and
   transmitting the at least one reply voice message to the requester terminal device.

5. The system of claim 1, wherein the at least one processor is further configured to cause the system to perform operations including:
   determining sentiment features by performing sentiment analysis on the text information;
   determining mood features by performing feature extraction on the text information;
   determining integrated features by integrating the sentiment features and the mood features;
   determining an emotion type by matching the integrated features in an emotion database; and
   transmitting the emotion type to the responder terminal device associated with the incoming call request.

6. The system of claim 5, wherein the at least one processor is further configured to cause the system to perform operations including:
   generating suggestion information based on the emotion type, the suggestion information being associated with whether to respond to an incoming call request relating to the smart dialogue communication; and
   transmitting the suggestion information to the responder terminal device.

7. The system of claim 1, wherein the at least one processor is further configured to cause the system to perform operations including:
   determining whether prompt information is received, the prompt information being associated with a reply instruction provided by the responder terminal device; and
   in response to determining that the prompt information is received,
      converting the prompt information into a reply voice message; and
      transmitting the reply voice message to the requester terminal device.

8. The system of claim 7, wherein before performing the smart dialogue communication, the at least one processor is further configured to cause the system to perform operations including:

determining whether an answer instruction corresponding to an incoming call request relating to the smart dialogue communication is received from the responder terminal device; and in response to determining that the answer instruction is not received, performing the smart dialogue communication.

9. The system of claim 1, wherein the at least one processor is further configured to cause the system to perform operations including:

transmitting the schedule information to the responder terminal device for display.

10. The system of claim 1, wherein the determining the event keywords by performing semantic analysis on the text information includes:

processing the text information by performing word segmentation and annotation on the text information;

determining text features by performing feature extraction on the processed text information using a language model; and determining the event keywords by performing semantic analysis on the text features using a semantic analysis model.

11. The system of claim 10, wherein the determining the event keywords includes:

obtaining time information by performing the semantic analysis on the text information;

determining whether the time information includes an absolute time; and in response to determining that the time information includes the absolute time, designating the time information as an event time; or in response to determining that the time information includes no absolute time, determining the event time based on the time information and a system time.

12. The system of claim 1, wherein the at least one processor is further configured to cause the system to perform operations including:

receiving, from the responder terminal device, a dialogue request configured to request the smart dialogue communication, wherein the dialogue request is associated with an incoming call request that is initiated by the requester via the requester terminal device and satisfies a smart dialogue condition determined by the responder terminal device.

13. A method for smart dialogue communication, comprising:

performing a smart dialogue communication with a requester terminal device associated with a requester;

recording voice information associated with the smart dialogue communication;

converting the voice information into the text information;

determining event keywords by performing semantic analysis on the text information;

generating schedule information based on the event keywords;

determining an emergency level of the schedule information according to a level classification rule;

determining a reminder time of the schedule information based on the emergency level; and causing a responder terminal device to generate a reminder at the reminder time.

14. The method of claim 13, wherein the smart dialogue condition is associated with at least one of:

whether an incoming call number associated with an incoming call request relating to the smart dialogue communication exists in a contact list of the responder terminal device;

whether the incoming call number exists in a blacklist of the responder terminal device; or whether a request time length of the incoming call request exceeds a time threshold.

15. The method of claim 13, further comprising:

obtaining, from the requester terminal device, one or more first incoming voice messages associated with the smart dialogue communication;

determining one or more feature words based on the one or more first incoming voice messages; and determining identity information by matching the one or more feature words in an identity database.

16. The method of claim 13, wherein performing the smart dialogue communication includes:

obtaining, from the requester terminal device, one or more second incoming voice messages;

converting the one or more second incoming voice messages into one or more incoming text messages;

determining text features by performing feature extraction on at least one of the one or more incoming text messages;

determining question information associated with the text features by matching the text features in a question knowledge database;

obtaining answer information corresponding to the question information by matching the question information in an answer knowledge database;

converting the answer information into at least one reply voice message; and transmitting the at least one reply voice message to the requester terminal device.

17. The method of claim 13, further comprising:

determining sentiment features by performing sentiment analysis on the text information;

determining mood features by performing feature extraction on the text information;

determining integrated features by integrating the sentiment features and the mood features;

determining an emotion type by matching the integrated features in an emotion database; and transmitting the emotion type to the responder terminal device associated with an incoming call request relating to the smart dialogue communication.

18. The method of claim 13, wherein the determining the event keywords by performing semantic analysis on the text information includes:

processing the text information by performing word segmentation and annotation on the text information;

determining text features by performing feature extraction on the processed text information using a language model; and determining the event keywords by performing semantic analysis on the text features using a semantic analysis model.

19. The method of claim 18, wherein the determining the event keywords includes:

obtaining time information by performing the semantic analysis on the text information;

determining whether the time information includes an absolute time; and in response to determining that the time information includes the absolute time, designating the time information as an event time; or in response to determining that the time information includes no absolute time, determining the event time based on the time information and a system time.

20. A non-transitory readable medium, comprising at least one set of instructions for smart dialogue communication, wherein when executed by at least one processor of an electrical device, the at least one set of instructions directs the at least one processor to perform a method, the method comprising:

performing the smart dialogue communication with the requester terminal device associated with the requester;

recording voice information associated with the smart dialogue communication;

converting the voice information into the text information;

determining event keywords by performing semantic analysis on the text information;

generating schedule information based on the event keywords;

determining an emergency level of the schedule information according to a level classification rule;

determining a reminder time of the schedule information based on the emergency level; and causing a responder terminal device to generate a reminder at the reminder time.

* * * * *